US011666179B2

(12) United States Patent
Mogil et al.

(10) Patent No.: US 11,666,179 B2
(45) Date of Patent: Jun. 6, 2023

(54) INSULATED CONTAINER ASSEMBLY WITH THERMAL STORAGE ACCOMMODATION

(71) Applicant: CALIFORNIA INNOVATIONS INC., Toronto (CA)

(72) Inventors: Melvin Mogil, North York (CA); William Kearns, Brampton (CA); Rick Stephens, Chicago, IL (US); Christopher Edwards, Nepean (CA); Elizabeth Mitchell, Toronto (CA)

(73) Assignee: CALIFORNIA INNOVATIONS INC.

( * ) Notice: Subject to any disclaimer, the term of this patent is extended or adjusted under 35 U.S.C. 154(b) by 544 days.

(21) Appl. No.: 15/915,743

(22) Filed: Mar. 8, 2018

(65) Prior Publication Data

US 2018/0192824 A1    Jul. 12, 2018

Related U.S. Application Data

(63) Continuation-in-part of application No. 15/091,189, filed on Apr. 5, 2016.

(51) Int. Cl.
*F25D 3/00* (2006.01)
*A47J 41/00* (2006.01)
(Continued)

(52) U.S. Cl.
CPC ........... *A47J 41/0066* (2013.01); *A45C 3/001* (2013.01); *A45C 7/0068* (2013.01);
(Continued)

(58) Field of Classification Search
CPC ............... A47J 41/0066; A47J 41/0088; A47J 41/0044; A45C 3/001; A45C 7/0068;
(Continued)

(56) References Cited

U.S. PATENT DOCUMENTS 2,289,254 A   10/1940   Eagles
4,211,091 A    7/1980   Campbell
(Continued)

FOREIGN PATENT DOCUMENTS

CH       670150 A5    5/1989
FR      2851034 B1    1/2006

OTHER PUBLICATIONS

European Search Report, dated Nov. 7, 2019, issued in corresponding European Patent Application No. EP 17778500.3.
(Continued)

*Primary Examiner* — Jonathan Bradford
(74) *Attorney, Agent, or Firm* — Ostrolenk Faber LLP

(57) ABSTRACT

A container assembly has a soft-sided insulated wall structure. It has one or more internal chambers in which to place objects to be kept cool or warm. A first closure member governs access to the container assembly. The wall structure includes one or more accommodations in which to place a warming or cooling element, such as an ice pack. The accommodations in the outside walls are externally accessible without opening the main chamber, and have their own closure, and may be insulated. The inside is a thin web through which to transfer heat. An internal partition divides the container assembly into two chambers. The partition may have a thermal storage element. The container may be a collapsible foldable bag; a tote bag; back pack or a non-collapsible lunch box. The thermal storage elements may have a flat disk shape. The disks slide sideways into place in the respective accommodations.

23 Claims, 41 Drawing Sheets

(51) Int. Cl.
  *A45C 11/20* (2006.01)
  *F25D 3/08* (2006.01)
  *A45F 3/04* (2006.01)
  *A45C 7/00* (2006.01)
  *A45C 3/00* (2006.01)
  *B65D 81/38* (2006.01)
  *A45C 13/10* (2006.01)
  *A45C 13/02* (2006.01)

(52) U.S. Cl.
  CPC ............ *A45C 7/0077* (2013.01); *A45C 11/20* (2013.01); *A45C 13/02* (2013.01); *A45C 13/103* (2013.01); *A45C 13/1046* (2013.01); *A45F 3/04* (2013.01); *A47J 41/0044* (2013.01); *A47J 41/0088* (2013.01); *B65D 81/3893* (2013.01); *F25D 3/00* (2013.01); *F25D 3/08* (2013.01); *F25D 2303/0821* (2013.01); *F25D 2331/801* (2013.01)

(58) Field of Classification Search
  CPC ..... A45C 7/0077; A45C 13/02; A45C 13/103; A45C 13/1046; A45C 11/20; A45F 3/04; B65D 81/3893; B65D 81/389; F25D 3/08; F25D 3/005; F25D 2331/801; F25D 2303/0821
  See application file for complete search history.

(56) References Cited

U.S. PATENT DOCUMENTS

| | | | |
|---|---|---|---|
| 4,311,022 A | 1/1982 | Hall | |
| 4,324,111 A | 4/1982 | Edwards | |
| 4,509,645 A | 4/1985 | Hotta | |
| 4,517,815 A | 5/1985 | Basso | |
| 4,537,313 A | 8/1985 | Workman | |
| 4,679,242 A | 7/1987 | Brockhaus | |
| 4,741,176 A | 5/1988 | Johnson et al. | |
| 4,819,793 A * | 4/1989 | Willard | A45C 3/04 383/110 |
| 4,831,842 A | 5/1989 | Kelley et al. | |
| 4,892,226 A | 1/1990 | Abtahi | |
| D328,550 S | 8/1992 | Mogil et al. | |
| D335,957 S | 6/1993 | Cantrell et al. | |
| 5,237,838 A | 8/1993 | Merritt-Munson | 62/457.2 |
| 5,313,807 A | 5/1994 | Owen | 62/457.3 |
| 5,361,603 A | 11/1994 | Merritt-Munson | |
| 5,403,095 A | 4/1995 | Melk | |
| 5,490,396 A | 2/1996 | Morris | |
| 5,562,228 A | 10/1996 | Ericson | |
| D375,629 S | 11/1996 | Chen | |
| D382,771 S | 8/1997 | Mogil | |
| D382,772 S | 8/1997 | Mogil | |
| D387,249 S | 12/1997 | Mogil | |
| 5,857,778 A | 1/1999 | Ells | |
| 5,865,314 A * | 2/1999 | Jacober | A61J 1/165 150/117 |
| D408,225 S | 4/1999 | Hodosh | |
| 5,904,230 A | 5/1999 | Peterson | |
| 5,974,826 A | 11/1999 | Baldwin et al. | |
| 6,027,249 A | 2/2000 | Bielinski | |
| 6,068,402 A | 5/2000 | Freese et al. | |
| 6,092,661 A | 7/2000 | Mogil | |
| 6,116,045 A | 9/2000 | Hodosh et al. | |
| D435,342 S | 12/2000 | Mogil | |
| 6,213,268 B1 | 4/2001 | Dancyger | |
| 6,234,677 B1 | 5/2001 | Mogil | |
| 6,238,091 B1 | 5/2001 | Mogil | |
| D446,937 S | 8/2001 | Mogil | |
| 6,422,032 B1 | 7/2002 | Greene | |
| 6,474,095 B1 | 11/2002 | Chan | |
| 6,925,834 B2 | 8/2005 | Fuchs | |
| 7,682,080 B2 | 3/2010 | Mogil | |
| 7,721,566 B1 | 5/2010 | Wilken | |
| 8,043,004 B2 | 10/2011 | Mogil | |
| 8,096,442 B2 | 1/2012 | Ramundi | |
| 8,209,995 B2 | 7/2012 | Kieling et al. | |
| 9,271,553 B2 | 3/2016 | Ponx | |
| 9,254,022 B2 | 9/2016 | Meldeau et al. | |
| 2003/0024960 A1 | 2/2003 | Greenstein et al. | |
| 2005/0198992 A1 * | 9/2005 | Mogil | A45C 11/20 62/457.7 |
| 2007/0237432 A1 | 10/2007 | Mogil | |
| 2009/0032153 A1 * | 2/2009 | Burnett | A45C 5/005 150/106 |
| 2009/0095757 A1 | 4/2009 | Ramundi | |
| 2009/0184143 A1 | 7/2009 | Witt et al. | |
| 2009/0301511 A1 * | 12/2009 | Vinci | A45C 11/008 132/316 |
| 2010/0089929 A1 | 4/2010 | Ramundi | |
| 2015/0253056 A1 * | 9/2015 | Richardson | A45C 11/20 62/457.2 |

OTHER PUBLICATIONS

Chinese Search Report—English Translation, dated Mar. 5, 2020, issued in corresponding Chinese Patent Application No. 201780031143.0.

* cited by examiner

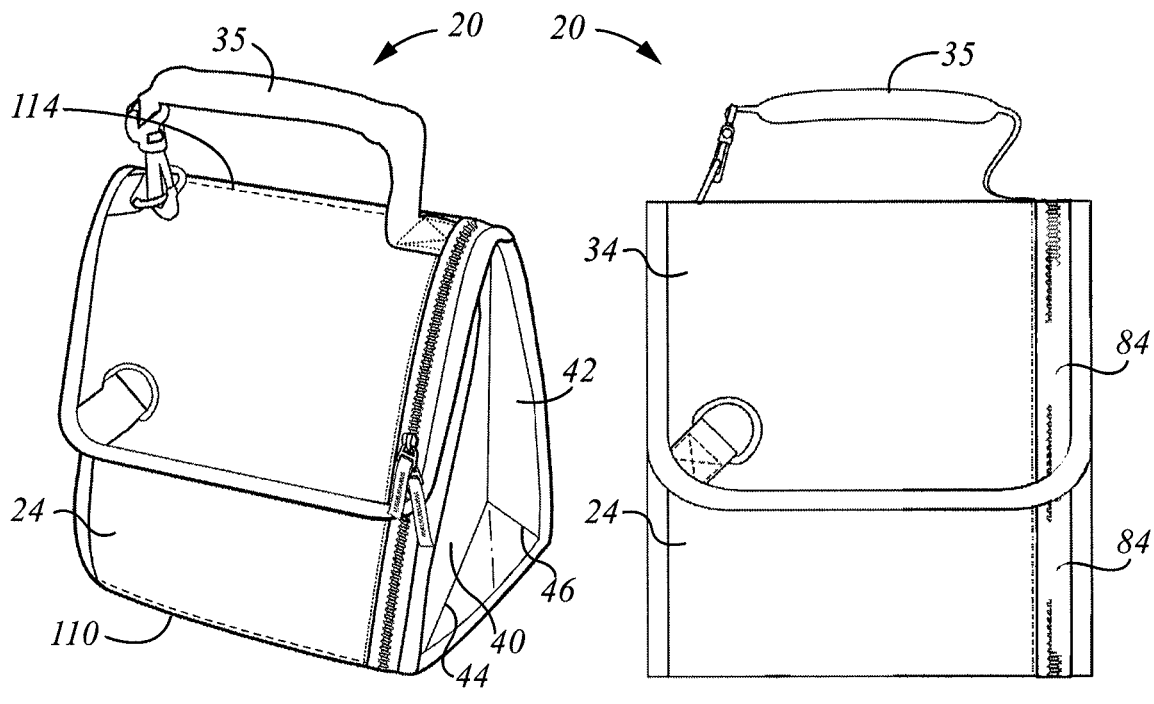
FIG. 1b
FIG. 1d
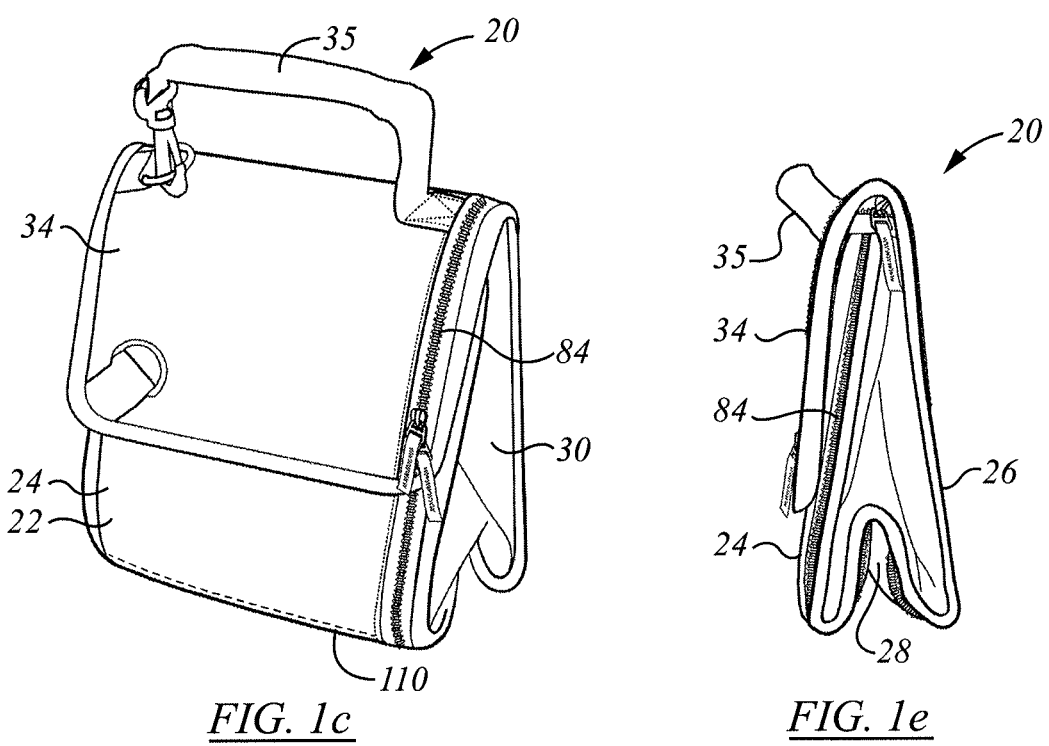
FIG. 1c
FIG. 1e

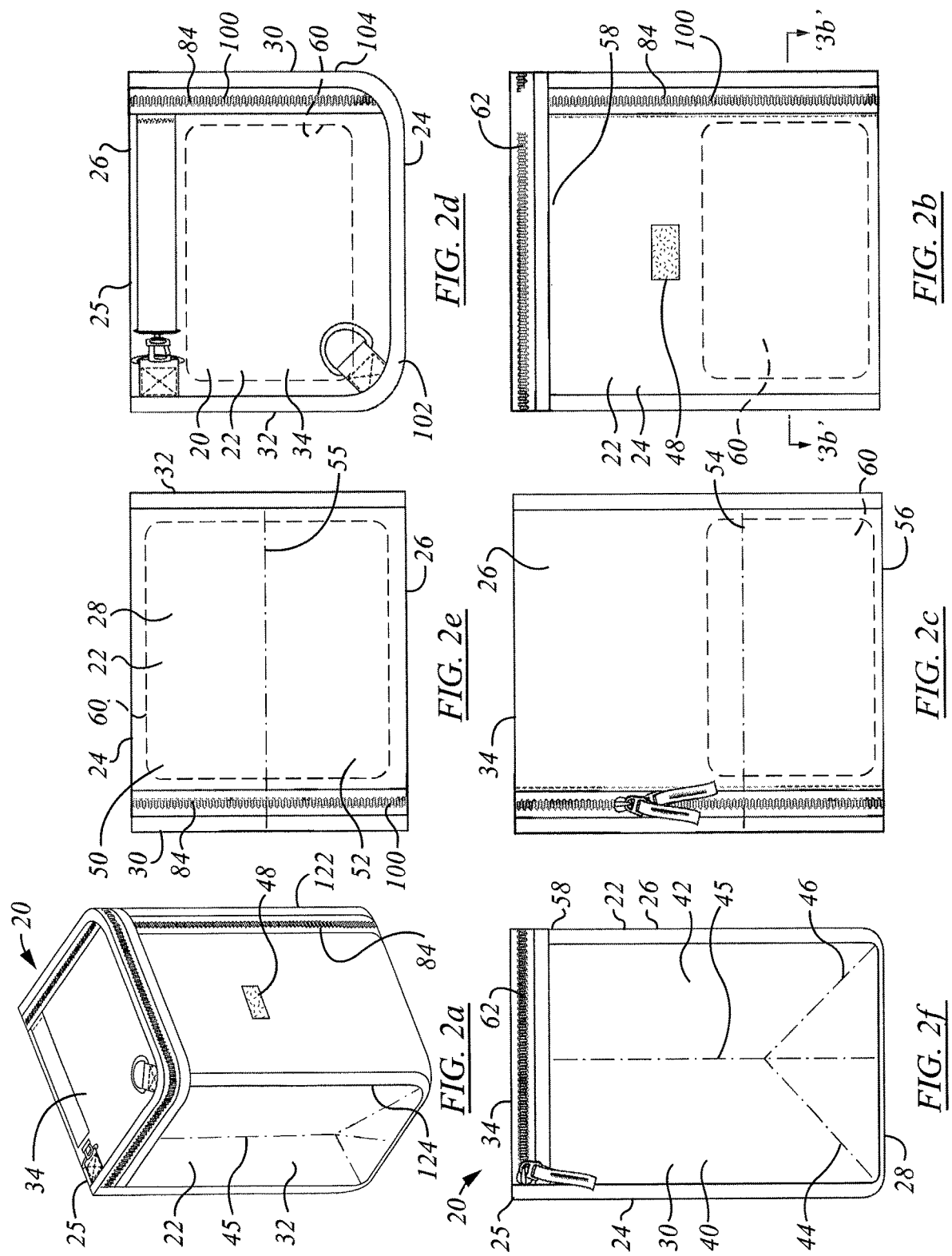

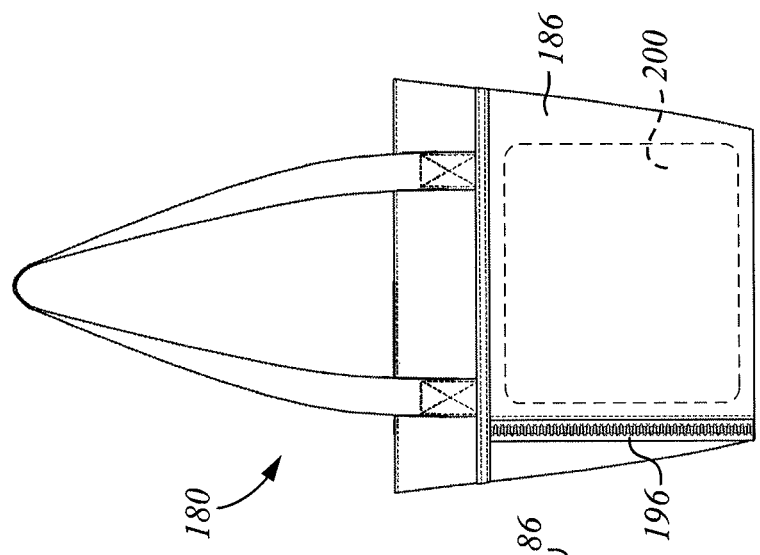
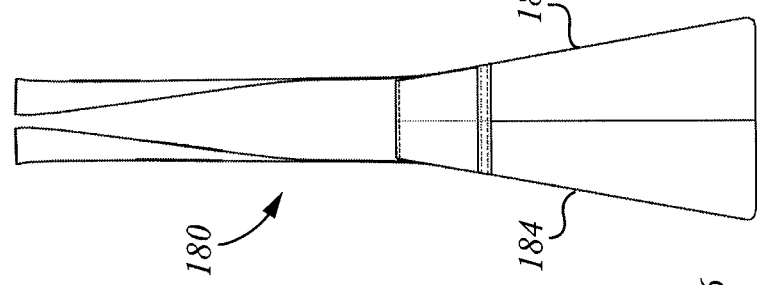
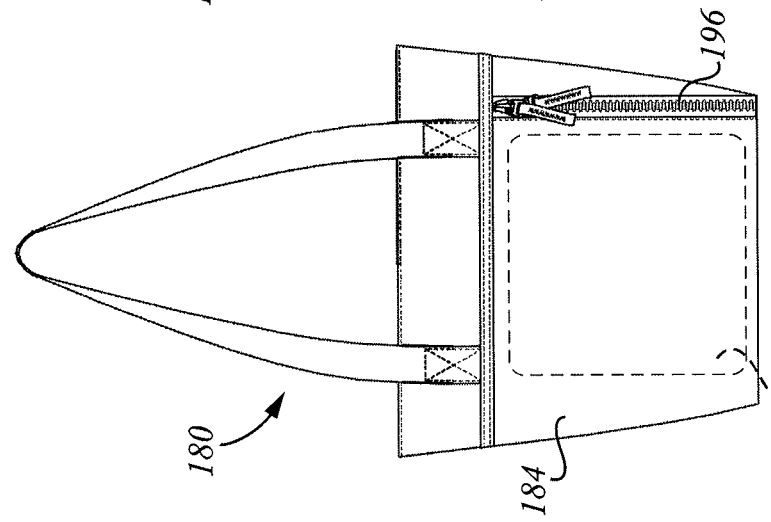
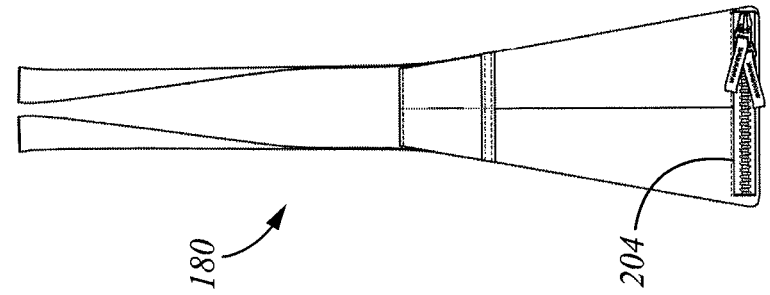
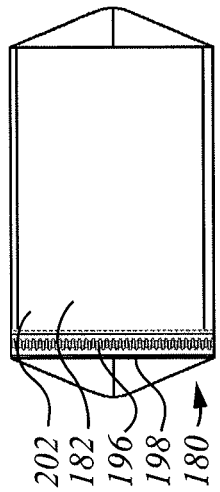
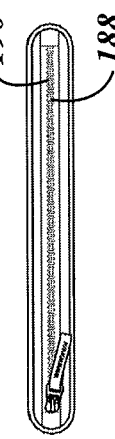

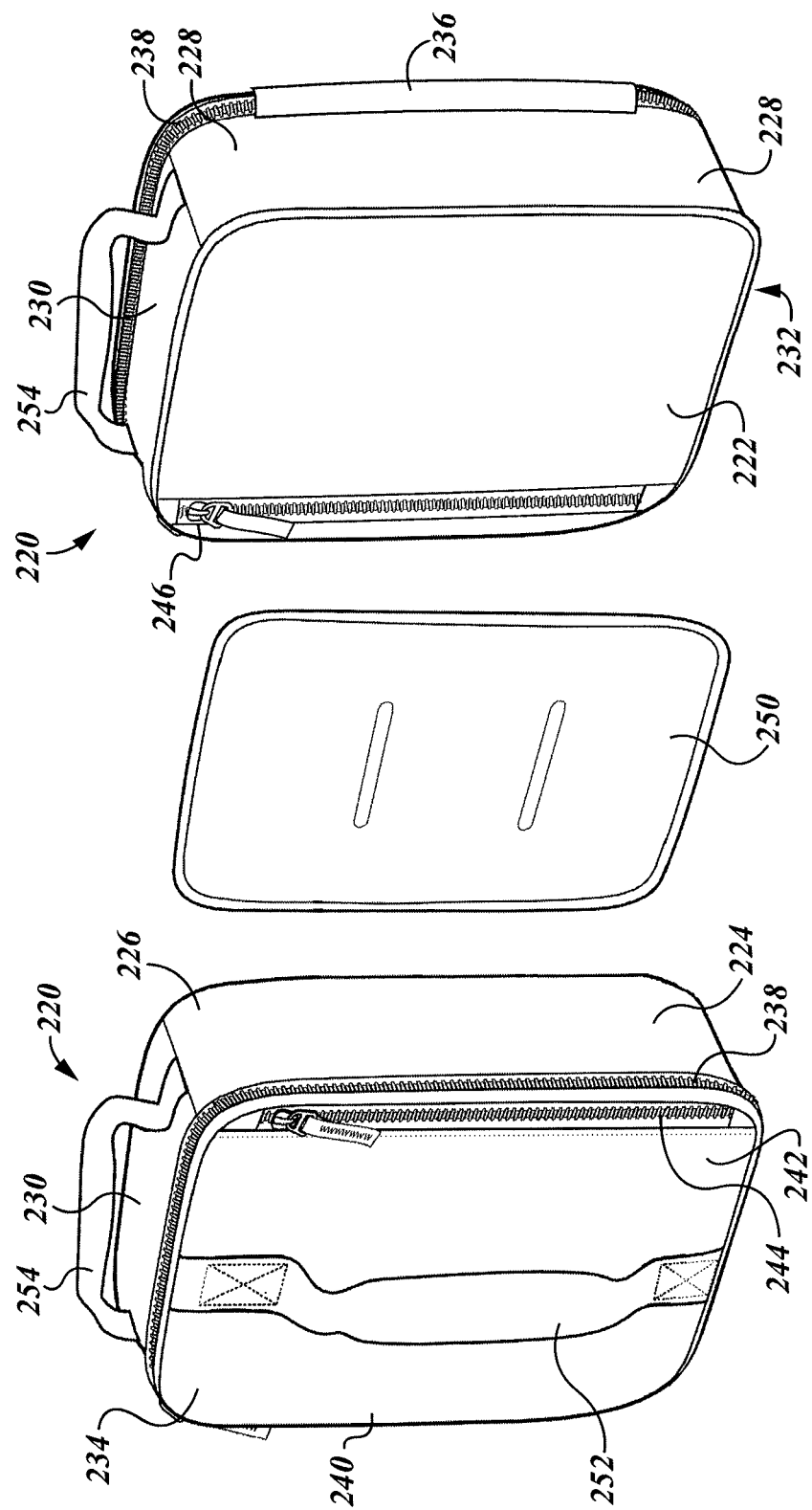

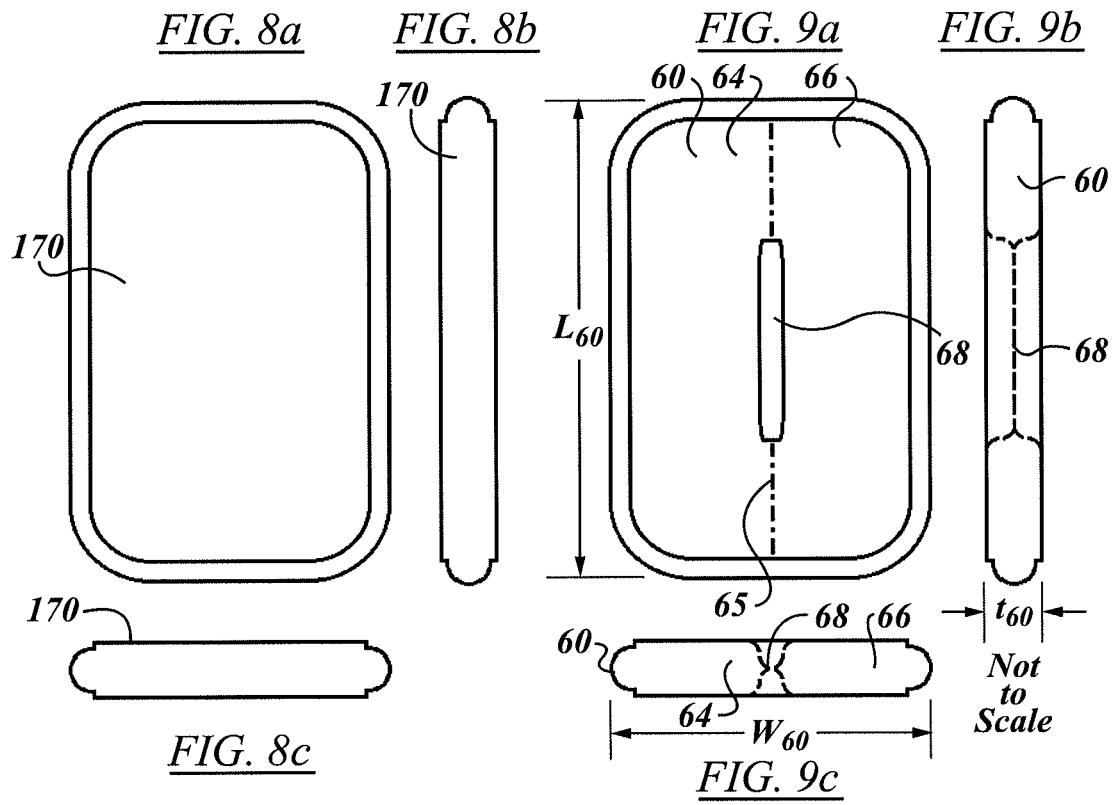
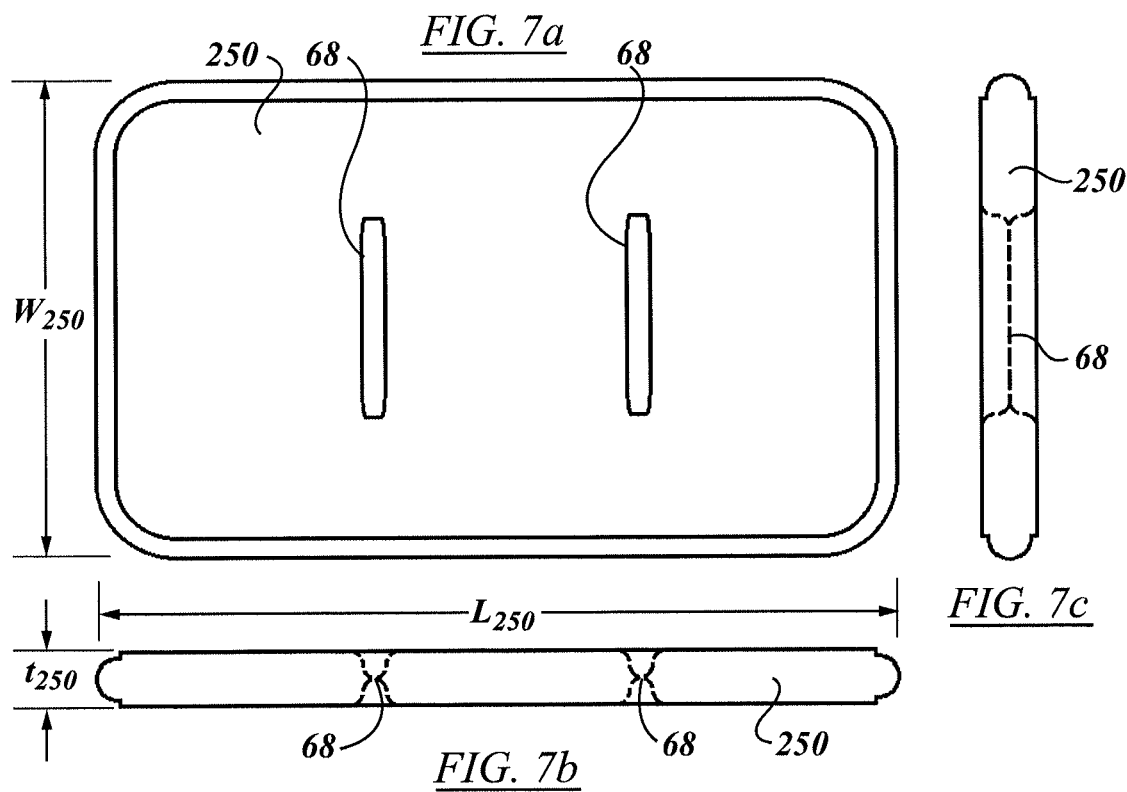

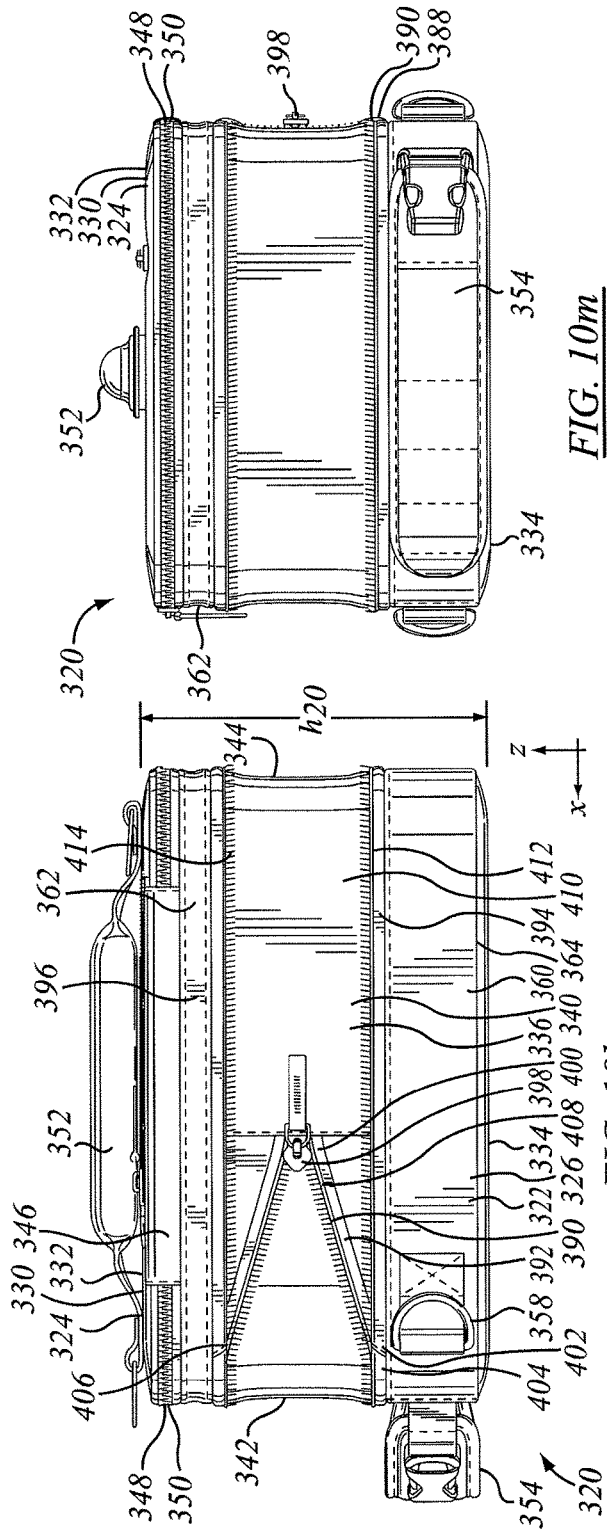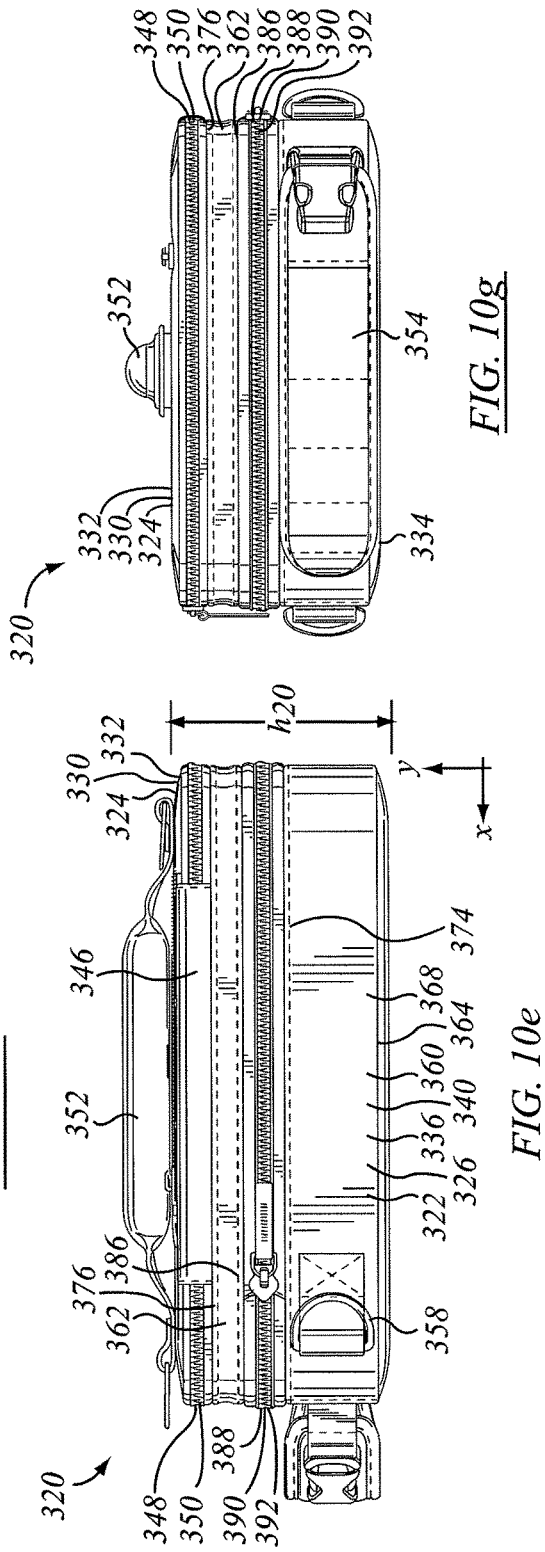

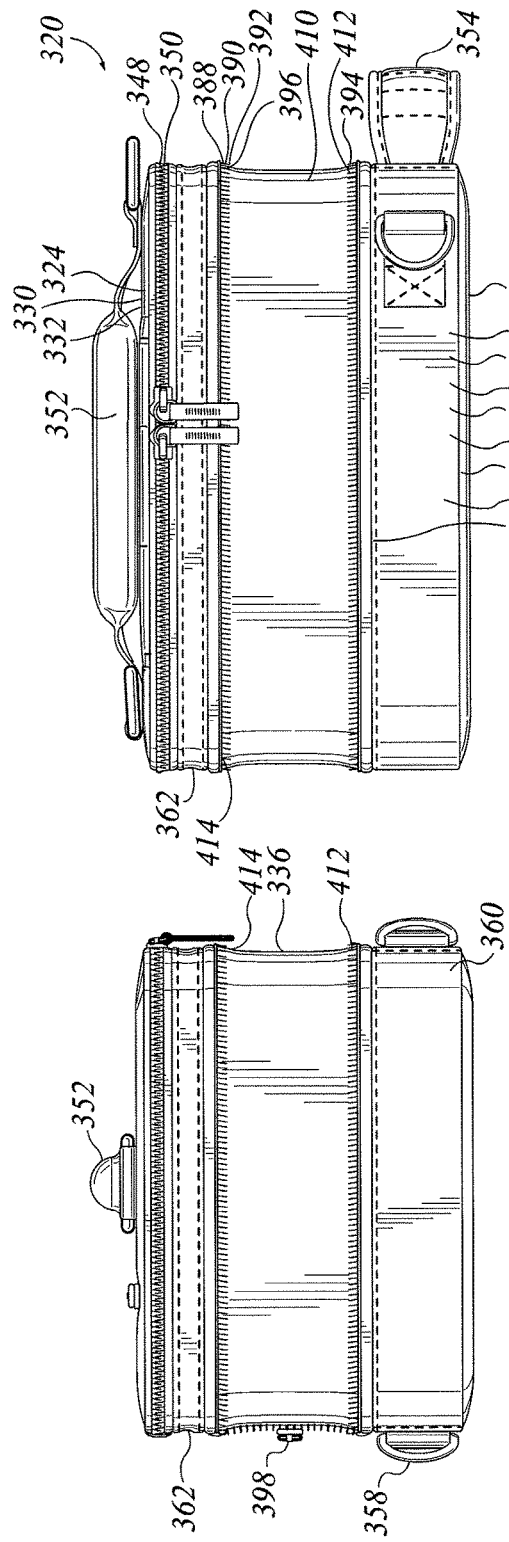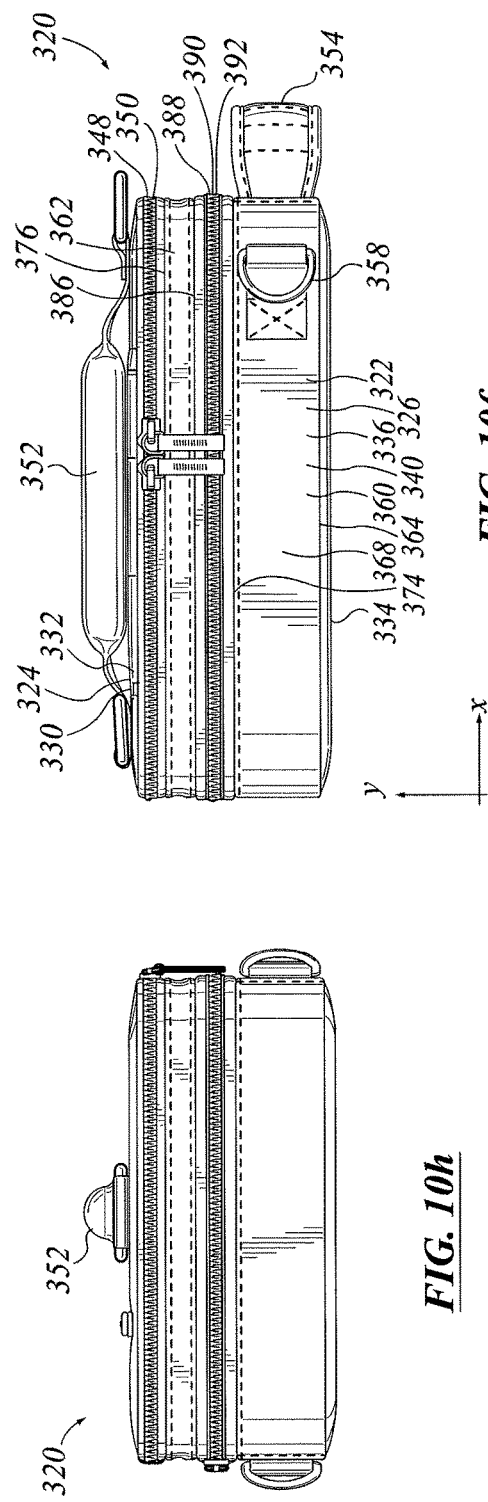

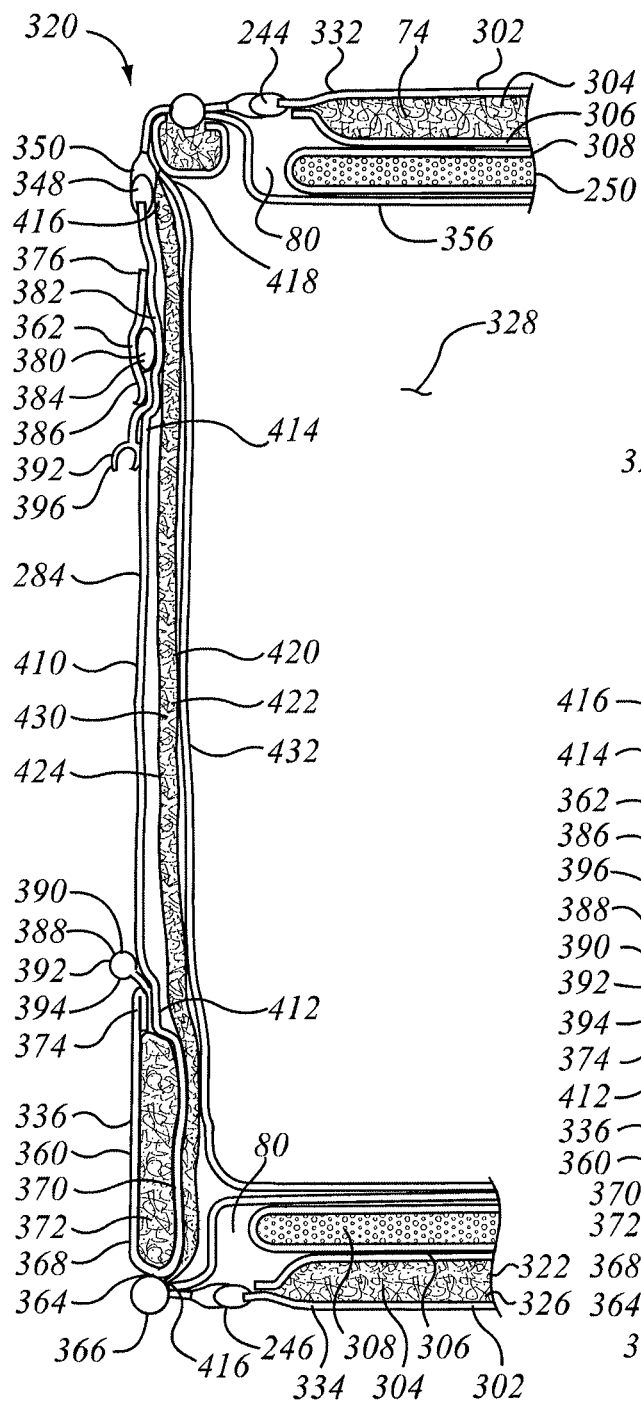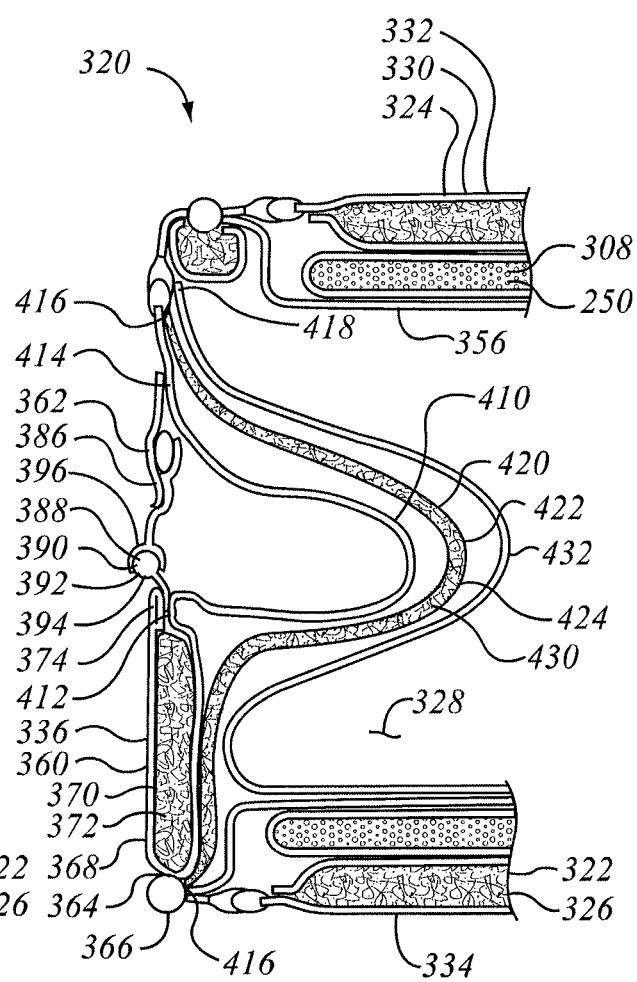
FIG. 11b
FIG. 11a

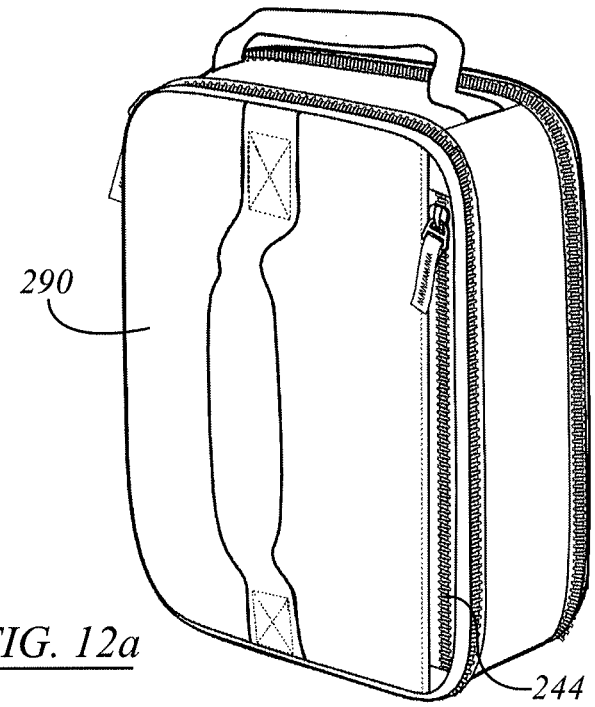
FIG. 12a
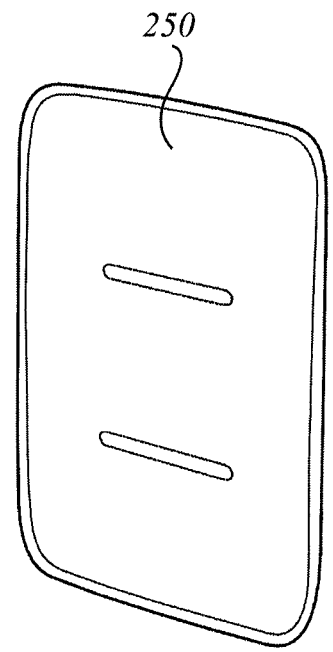
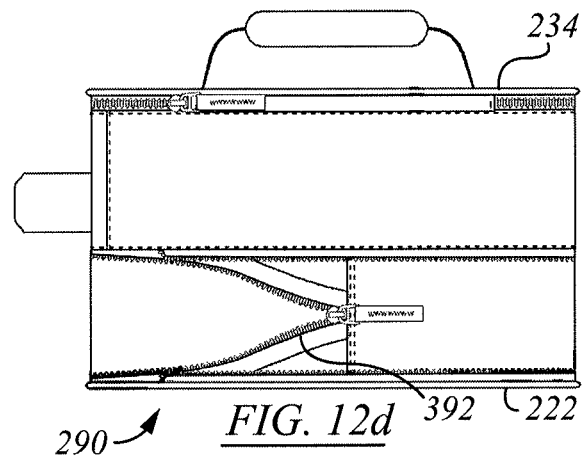
FIG. 12d
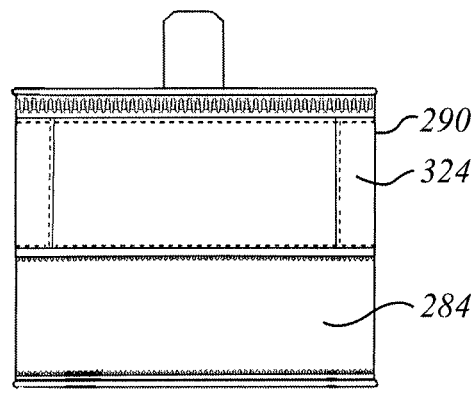
FIG. 12e
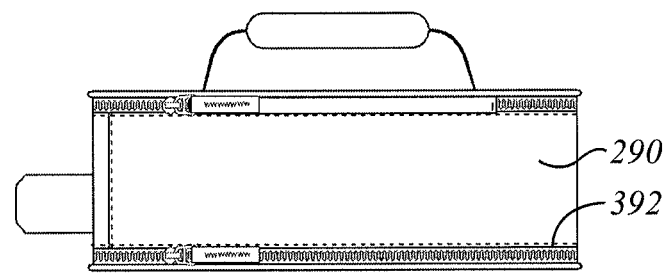
FIG. 12b
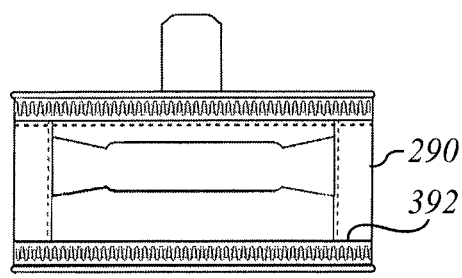
FIG. 12c

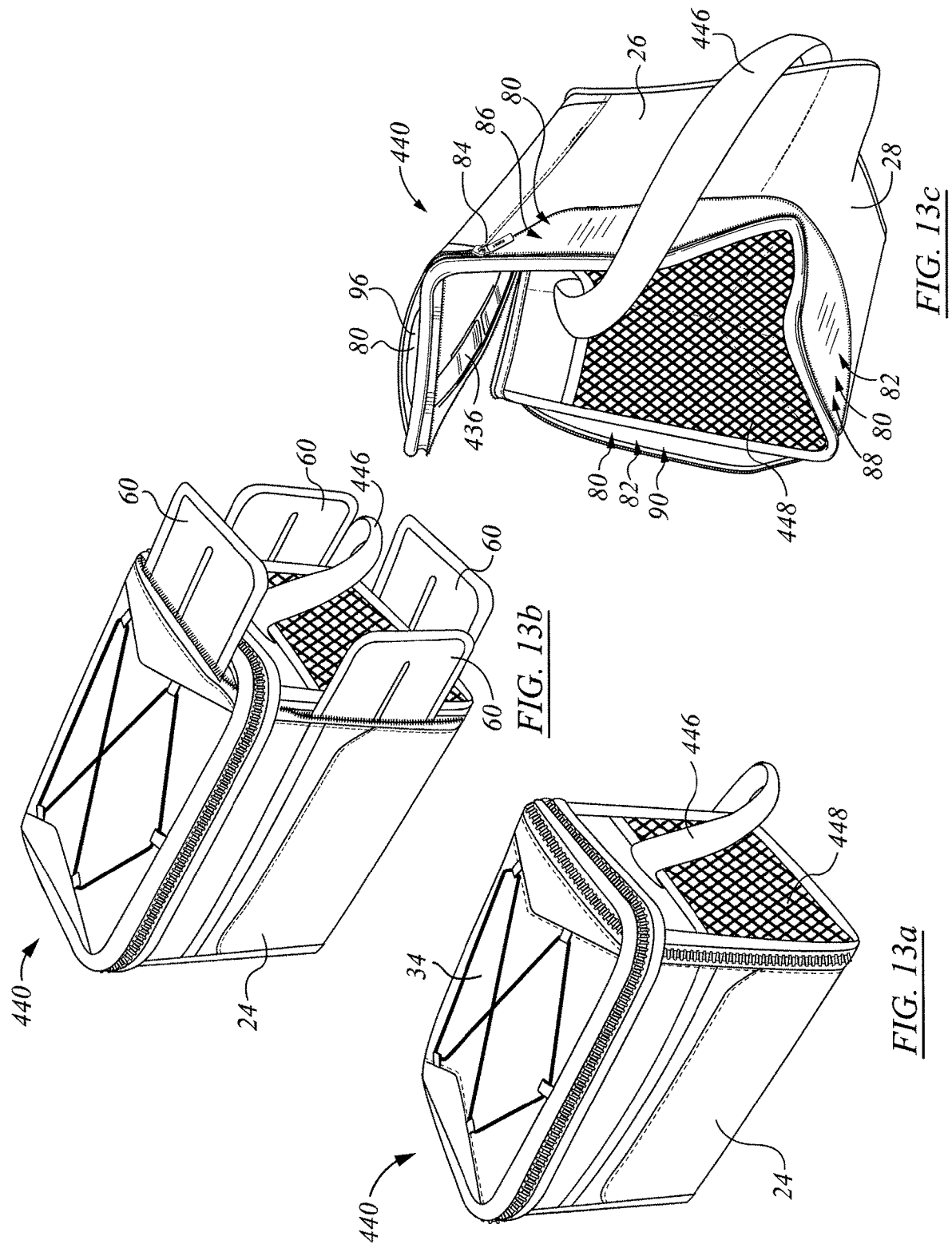

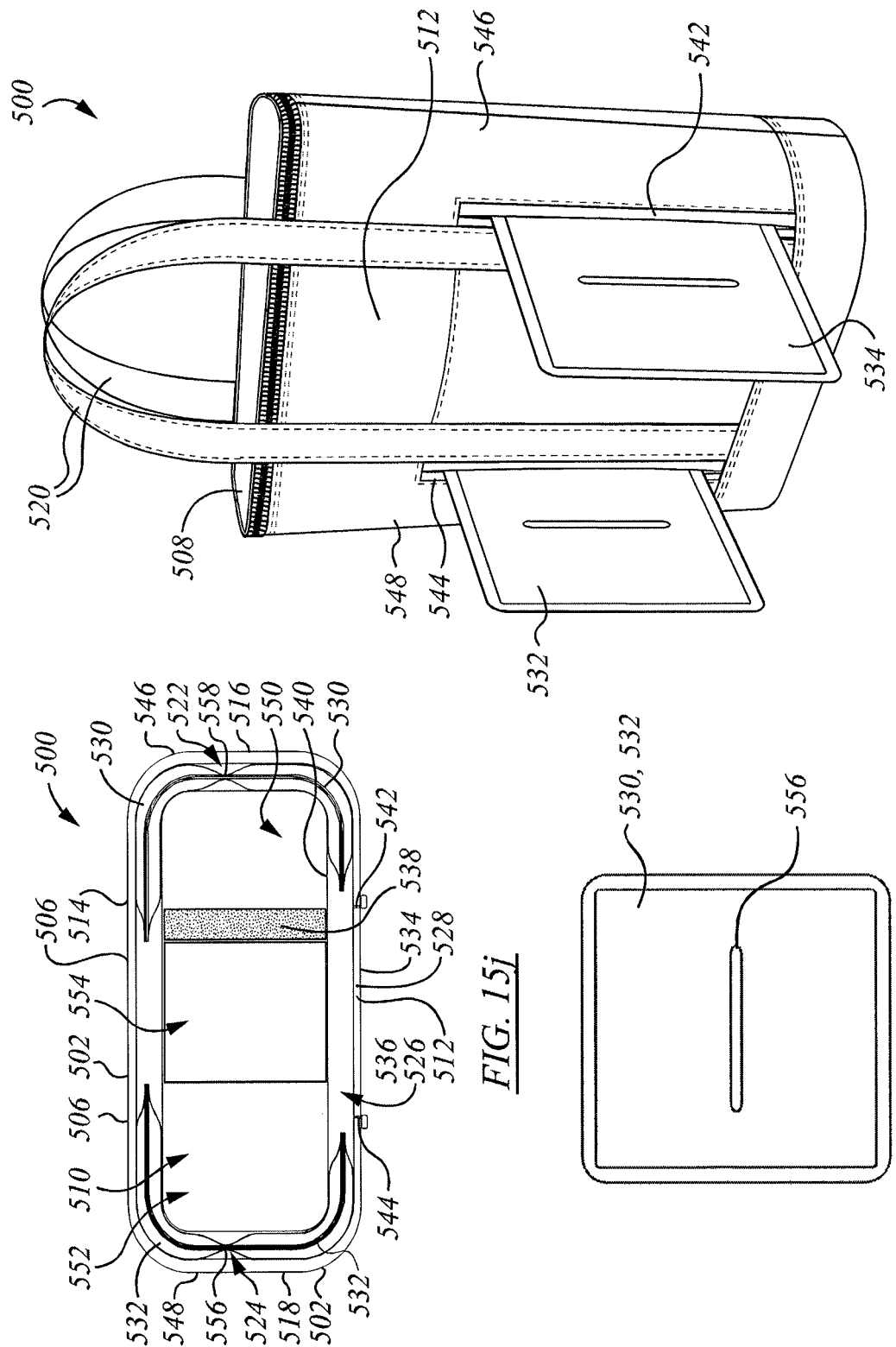

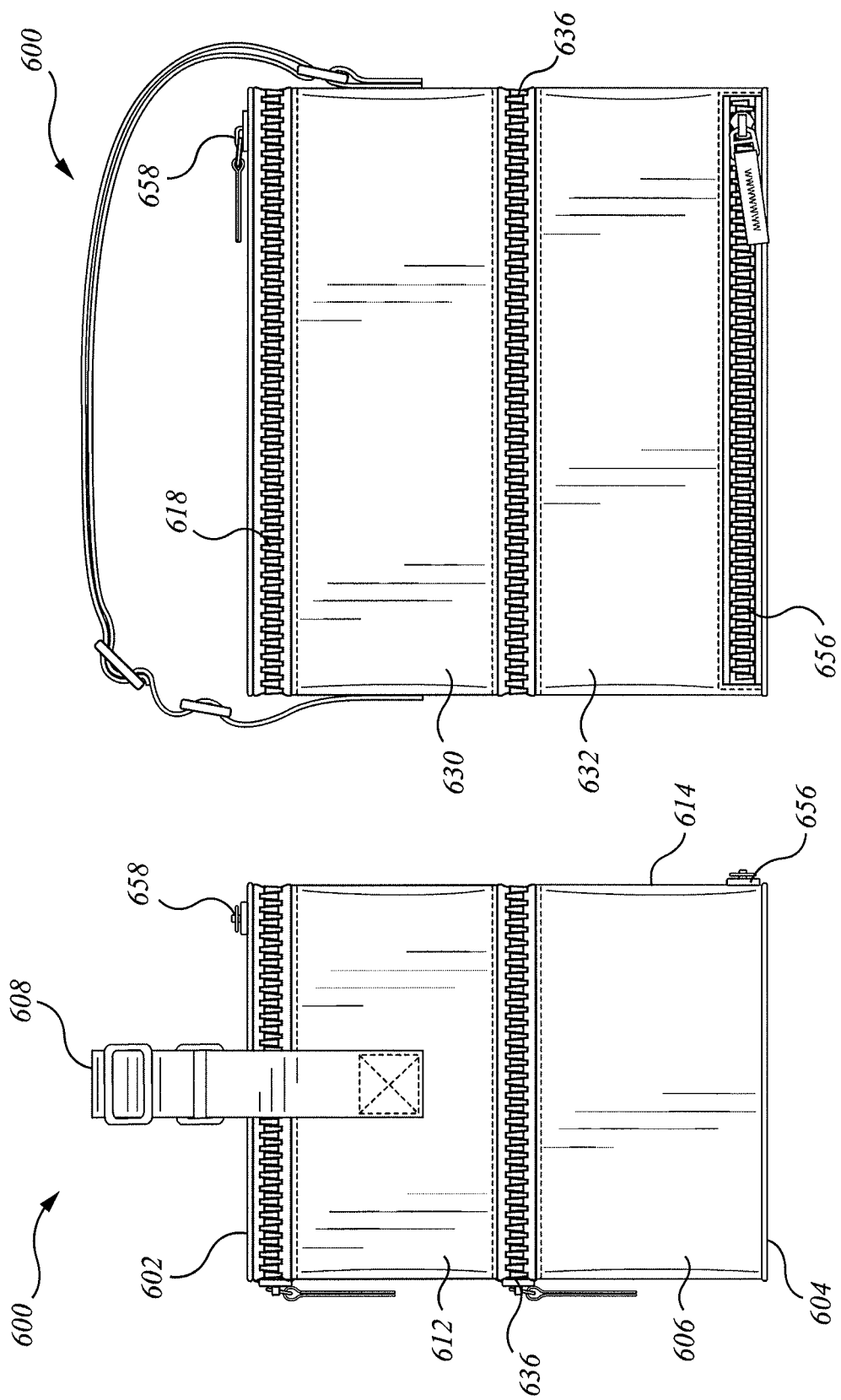

INSULATED CONTAINER ASSEMBLY WITH THERMAL STORAGE ACCOMMODATION

CROSS-REFERENCE TO RELATED APPLICATION

The present application is a continuation-in-part application of U.S. patent application Ser. No. 15/091,189, filed Apr. 5, 2016, the content of which is incorporated herein by reference.

FIELD OF THE INVENTION

This invention relates to the field of portable insulated containers.

BACKGROUND OF THE INVENTION

Insulated containers have become popular for carrying either articles that may best be served cool, such as beverages or salads, or warm, such as appetizers, and so on. Often such containers are used for carrying children's lunches as when at school.

Soft-sided insulated containers have the advantage of being relatively light, and so therefore relatively easily carried, and relatively forgiving in terms of imparting damage to the objects placed within them. However, it may be desirable to obtain the insulative benefit of a soft-sided insulated container, in combination with a thermal storage member, such as an ice pack or gel pack, or heating pack, as may be. Sometimes these containers may by used to carry lunches, which may include a sandwich, fruit, carrot and celery sticks, a drink, cookies, and so on. However, cooling packs (as they most normally may be) tend to present a number of convenience and use issues. The present inventor provides a thermal storage package for use in conjunction with a container that may tend to address these issues.

SUMMARY OF THE INVENTION

In an aspect of the invention there is a container assembly. In one embodiment it has a soft-sided insulated wall structure defining therewithin a chamber in which to receive objects. The wall structure has a first closure operable to govern access to the chamber. The wall structure includes a first region. The first region has at least a first accommodation defined therein next to the chamber in which to receive at least a first thermal storage member. The accommodation has a second closure. The second closure permits passage therethrough of at least the first thermal storage member, whereby the thermal storage member may be positioned in the accommodation without opening the first closure member of the chamber.

In a feature of that aspect of the invention, the container is a soft-sided insulated container. In another feature the container is a collapsible soft-sided insulated container. In a further feature, the container has a wall section having an outer layer and an inner layer. The inner layer is a membrane and the outer layer includes a layer of thermal insulation. In still another feature, the container has at least a second accommodation, and has first and second gel-packs for fitting in the first and second accommodations, the gel packs being interchangeable. In still another feature, it has a gel pack for seating in the accommodation, the gel pack having the form of a substantially flat panel. In another feature, the second closure includes a tracked fastener movable between open and closed positions. In still another feature, the container assembly is expandable. In still another feature the container assembly is a non-collapsible lunch box. In a further alternate feature, the container assembly is a tote bag or a back pack.

In another feature, the container includes at least the first thermal storage member. The first thermal storage member has a span, a width, and a through thickness. The through-thickness is smaller than each of the span and the width. The thermal storage member has a heat transfer interface defined by the span and the width. The accommodation has a face against which the heat transfer interface is opposed, thereby to engage in heat transfer with the chamber. The second closure member, when open, defines an opening to accommodate a face defined by the through-thickness and one of the span and the width. The thermal storage member is slidable through the opening to seat in the accommodation. In another feature, the container assembly includes at least the first thermal storage member. The second closure defines a slot. The first thermal storage member has a large face that faces the chamber. The thermal storage member has a small face that permits the thermal storage member to slip through the slot into the accommodation.

In another aspect of the invention there is a soft-sided insulated container having an insulated chamber therewithin. The container has at least a first externally-accessible gel pack slot into which to seat a first gel pack in a position to cool the chamber, external access to the gel pack slot being independent of access to the insulated chamber.

In a feature of that aspect of the invention, the container is collapsible. In another feature, the container is a foldable bag. In another feature, the container has at least a second gel pack slot having external access. In another feature, the container has at least first and second gel-packs mountable within the first and second gel pack slots, and the first and second gel packs are interchangeable. In still another feature, the insulated container has a wall structure, the wall structure including an inner layer and an outer layer, the inner layer being a membrane, and an outer layer, the outer layer including a layer of thermal insulation. In yet another feature, the inner membrane is one of (a) transparent; and (b) translucent.

In a further feature, the container has a first, substantially flat panel, the gel pack slot is formed in the panel, and the gel pack slot has an opening running along an edge of the panel to permit a first gel pack to be moved into the first gel pack slot in a transverse manner relative to the panel, whereby the gel pack slot is a side-entry gel pack slot. In another feature, the soft-sided insulated container has a front wall, a rear wall, a bottom wall, and side walls; in an empty condition of the container the side walls fold to permit the front wall to lie next to the rear wall. In yet another feature, the container includes at least the first gel pack slot and a second gel pack slot. The first gel pack slot being defined in one of: (a) the front wall; (b) the rear wall, of each of the first gel pack and the second gel pack.

In another feature, the container includes at least the first gel pack. The gel pack has a span, a width, and a through thickness. The through-thickness is smaller than each of the span and the width. The gel pack has a side face defined by the span and the width. The gel pack has and end defined by (a) the through-thickness and (b) one of the span and the width. The chamber has a wall that has an accommodation defined therein, the externally accessible slot defining an entrance to the accommodation. When the slot is open, the gel pack is slidable end-wise there-through to seat in the accommodation. In another feature, the container assembly includes at least the first thermal storage gel pack. The first thermal storage gel pack has a large face that, when installed, faces the chamber. The first thermal storage gel pack has a small face that permits the thermal storage member to slip through the slot.

In another aspect of the invention, there is an insulated container assembly. It has an insulated wall structure having a chamber defined therein in which to place objects. The container assembly has a first closure movable to govern access to the chamber. The insulated wall structure has a non-planar accommodation defined therein. The non-planar accommodation has an external access separate from the first closure member.

In a feature of that aspect, the insulated wall structure is a soft-sided insulated wall structure. In another feature, the accommodation is segregated from the chamber. In a further feature, the wall structure includes a heat transfer interface member defining a common wall of the chamber and the accommodation. In still another feature, the wall structure includes a layer of insulation outboard of the accommodation. In yet another feature, the accommodation defines an arcuate path, and the container assembly includes at least a first thermal storage member, the thermal storage member is bendable to follow the arcuate path. In still another feature, at least the first thermal storage member is articulated.

In another aspect of the invention there is a soft-sided insulated container assembly. It has a soft-sided insulated wall structure having a top wall panel, a bottom wall panel, and a peripheral sidewall extending between the bottom wall panel and the top wall panel. The top wall panel has an inner membrane and insulation outside the inner membrane. The bottom wall panel having an inner membrane and insulation outside the inner membrane. A partition located intermediate the top wall panel and the bottom wall panel within the soft-sided insulated container assembly. The top wall panel has a first slot formed within the top wall panel between the inner membrane and the insulation of the top wall panel, the first slot being externally accessible when the insulated container assembly is closed. The bottom wall panel has a second slot formed within the bottom wall panel between the inner membrane and the insulation of the bottom wall panel, the second slot being externally accessible when the insulated container assembly is closed. The partition having a third slot formed therein. At least a first thermal storage member, the first thermal storage member being sideways slidable into at least one of the first slot, the second slot, and the third slot.

In a feature of that aspect, the container assembly includes a first chamber portion and a second chamber portion. The partition divides the first chamber portion from the second chamber portion. In another feature, the partition defines a bottom wall panel of the first chamber portion and a top wall panel of the second chamber portion. In still another feature, the peripheral wall has a closure intermediate the top wall panel and the bottom wall panel, and the peripheral wall is hinged. When the peripheral wall closure is open the first chamber portion is movable relative to the second chamber portion between a first position and a second position. In the first position of the first chamber access to the second chamber is obstructed. In the second position of the first chamber access to the second chamber is open. In the second position of the first chamber the third slot is accessible.

In another feature, the soft-sided insulated peripheral wall has an upper portion and a lower portion. The partition defines a bottom wall panel of the first chamber portion. The partition, the upper portion of the soft-sided insulated peripheral wall and the top panel cooperate to define a first six sided box. The top wall panel defines a lid of the first six-sided box, the lid being movable between an open position and a closed position relative to the upper portion of the soft-sided insulated peripheral wall to govern access to the first chamber portion. The first six sided box is movable between an open position and a closed position relative to the lower portion of the soft-sided insulated peripheral wall to govern access to the second chamber portion. In an additional feature, the third slot is defined on an underside of the partition. In another feature, the upper portion of the soft-sided insulated peripheral wall is hingedly mounted to the lower portion of the soft-sided insulated peripheral wall. In still another feature, the first thermal storage member is sideways slidable into the first slot; and the soft-sided insulated container assembly includes a second thermal storage member that is sideways slidable into the second slot of the bottom wall panel, and a third thermal storage member that is sideways slidable into the third slot. In another feature, the first thermal storage member is a rectangular sided gel pack. In another feature, the first chamber portion and the second chamber portion are the same size.

In another feature, the soft-sided insulated peripheral wall has an upper portion and a lower portion, the upper portion being hingedly movable relative to the lower portion. The container assembly includes a first chamber portion and a second chamber portion. The partition divides the first chamber portion from the second chamber portion. The partition, the upper portion of the soft-sided insulated peripheral wall and the top wall panel cooperate to define the first chamber portion. The lower portion of the soft-sided insulated peripheral wall and the bottom wall panel cooperate to define the second chamber portion. The first chamber portion is movable to govern access to the second chamber portion. The partition is movable between an open position and a closed position relative to the first chamber portion. In still another feature, the top wall of the first chamber portion is movable between an open position and a closed position relative to the first chamber portion. When the first chamber portion is in a closed position relative to the second chamber portion the first chamber portion is accessible by opening the top wall. When the first chamber portion is moved to an open position relative to the second chamber portion the first chamber portion is accessible by opening the partition.

In another aspect of the invention there is a soft-sided insulated container assembly. It has a soft-sided insulated wall structure defining a chamber therewithin in which to receive objects, the wall structure having a first closure operable to govern access to the chamber. The wall structure includes an inner layer, an outer layer and a layer of insulation located between the inner layer and the outer layer. The wall structure including a first region. The first region has at least a first accommodation defined therein between the insulation and the inner layer next to the chamber in which to receive at least a first thermal storage member. The accommodation has a second closure. The second closure permits sideways sliding passage of at least the first thermal storage member therethrough into the accommodation. The accommodation is separated from the chamber. The second closure is externally accessible when the chamber is closed.

In a feature of that aspect, the container has an upper chamber and a lower chamber. Each of the upper chamber and the lower chamber has one of the accommodations and one of the externally accessible second closures. The upper chamber is movable relative to the lower chamber. A third thermal storage element accommodation is located between the upper chamber and the lower chamber when the upper chamber is stacked upon the lower chamber.

The features of the aspects of the invention may be mixed and matched as appropriate without need for multiplication and repetition of all possible permutations ad combinations.

BRIEF DESCRIPTION OF THE DRAWINGS

These and other aspects and features of the invention may be more readily understood with the aid of the illustrative Figures below, showing an example, or examples, embodying the various aspects and features of the invention, provided by way of illustration, and in which:

FIG. 1b is a perspective view of the soft-sided insulated container assembly of FIG. 1a in a partially full condition, with thermal storage access openings closed;

FIG. 1c is a perspective view of the container of FIGS. 1a and 1b in a folded or collapsed condition;

FIG. 1d is a front view of the folded container assembly of FIG. 1c;

FIG. 1e is a left-hand side or end view of the folded container assembly of FIG. 1c;

FIG. 2a is an isometric view of the soft-sided insulated container assembly of FIG. 1a in an expanded, unfolded, or filled condition;

FIG. 2b is a front view of the container assembly of FIG. 2a;

FIG. 2c is a rear view of the container assembly of FIG. 2a;

FIG. 2d is a top view of the container assembly of FIG. 2a;

FIG. 2e is a bottom view of the container assembly of FIG. 2a;

FIG. 2f is a side view of the container assembly of FIG. 2a;

FIG. 3c is a view similar to FIG. 3a of an alternate embodiment of soft-sided insulated container to that of FIG. 3a;

FIG. 5a is a perspective view of an alternative, tote-bag, configuration of soft-sided insulated container assembly to that of FIG. 1a;

FIG. 5b is a front view of the container assembly of FIG. 5a;

FIG. 5c is a rear view of the container assembly of FIG. 5a;

FIG. 5d is a side or end view of the container assembly of FIG. 5a;

FIG. 5e is a bottom view of the container assembly of FIG. 5a;

FIG. 5f is a view at the main closure of the container assembly of FIG. 5a;

FIG. 5g is an alternate side of end view of the container assembly of FIG. 5a;

FIG. 6a is a perspective view of an alternate embodiment of soft-sided insulated container assembly to that of FIG. 1a in a lunch-box configuration, taken from in front, to one side, and slightly above;

FIG. 6b shows the lunch box of FIG. 6a as viewed on the opposite diagonal;

FIG. 6c is a front view of the lunch box of FIG. 6a;

FIG. 6d is a rear view of the lunch box of FIG. 6a;

FIG. 6e is a side view of the lunch box of FIG. 6a;

FIG. 6f is a top view of the lunch box of FIG. 6a;

FIG. 7a is a plan view of a thermal storage element for the lunch box of FIG. 6a;

FIG. 7b is a long-side view of the element of FIG. 7a;

FIG. 7c is a short-side, or end, view of the element of FIG. 7a;

FIG. 8a is a plan view of a thermal storage element for use with insulated container assemblies such as those of FIGS. 1a, 4a, and 5a;

FIG. 8b is a long-side view of the element of FIG. 8a;

FIG. 8c is a short-side, or end, view of the element of FIG. 8a;

FIG. 9a is a plan view of an alternate thermal storage element for use with soft-sided insulated container assemblies such as those of FIGS. 1a and 4a;

FIG. 9b is a long-side view of the element of FIG. 9a;

FIG. 9c is a short-side, or end, view of the element of FIG. 9a;

FIG. 10c is a top or front view of the lunch box of FIG. 10a;

FIG. 10d is a bottom or rear view of the lunch box of FIG. 10a;

FIG. 10e is a right side view of the lunch box of FIG. 10a in a retracted position;

FIG. 10f is a left side view of the lunch box of FIG. 10a in a retracted position;

FIG. 10g is a top short end view of the lunch box of FIG. 10a in a retracted position;

FIG. 10h is a bottom short end view of the lunch box of FIG. 10g;

FIG. 10k is a right side view of the lunch box of FIG. 10e as expanded;

FIG. 10l is a left side view of the lunch box of FIG. 10f as expanded;

FIG. 10m is a top short end view of the lunch box of FIG. 10g as expanded;

FIG. 10n is a short end view of the lunch box of FIG. 10h as expanded;

FIG. 11a is a cross-section of the retracted container assembly of FIG. 10a;

FIG. 11b is a cross-section of the expanded container assembly of FIG. 10i;

FIG. 12a is a perspective view of an alternate, expandable, embodiment of lunch box to that of FIG. 10a;

FIG. 12b is a side view of the lunch box of FIG. 12a in a retracted position;

FIG. 12c is a top view of the lunch box of FIG. 12a in a retracted position;

FIG. 12d is a side view of the lunch box of FIG. 12a in an expanded condition or position;

FIG. 12e is a bottom view of the lunch box of FIG. 12a as expanded;

FIG. 13a shows an isometric view of an insulated soft-sided container that is an alternate embodiment to that of FIG. 1a;

FIG. 13b is view similar to FIG. 13a showing thermal storage elements in a partially inserted condition;

FIG. 13c is an end view of the container of FIG. 13a similar to FIG. 3a;

FIG. 13f is a side view of the folded container of FIG. 13a;

FIG. 14d is a front view of the container of FIG. 14a;

FIG. 14e is a rear view of the container of FIG. 14a;

FIG. 14f is a top view of the container of FIG. 14a;

FIG. 14g is a bottom view of the container of FIG. 14a;

FIG. 15a is a front side perspective view of a further alternate embodiment of soft-sided insulated container to that of FIG. 1a;

FIG. 15b is a rear side perspective view of the alternate embodiment of FIG. 15a;

FIG. 15c is a front side perspective view of the insulated container assembly of FIG. 15a showing the insertion of two thermal storage elements;

FIG. 15d is a front view of the container assembly of FIG. 15a;

FIG. 15e is a rear view of the container of FIG. 15a;

FIG. 15f is a top view of the container of FIG. 15a;

FIG. 15g is a bottom view of the container of FIG. 15a;

FIG. 15j is a cross-sectional view of the container of FIG. 15a taken on section 15j-15j of FIG. 15d;

FIG. 16a is a plan view of a bendable thermal storage element for the container of FIG. 15a;

FIG. 16b is an alternate tri-folding bendable thermal storage element for the container of FIG. 15a;

FIG. 16c is an alternate four-part folding bendable thermal storage element for the container of FIG. 15a;

FIG. 18a shows sideways insertion of a thermal storage gel pack member into an externally accessible slot in the top wall panel of the container of FIG. 17a;

FIG. 19a is a right hand side view of the container assembly of FIG. 17a;

FIG. 19b is a front view of the container of FIG. 19a;

FIG. 19c is a left hand view of the container FIG. 19a;

FIG. 19d is a rear view of the container of FIG. 19a;

FIG. 19e is a top view of the container of FIG. 19a; and

FIG. 19f is a bottom view of the container of FIG. 19a.

DETAILED DESCRIPTION

Figure 1A:
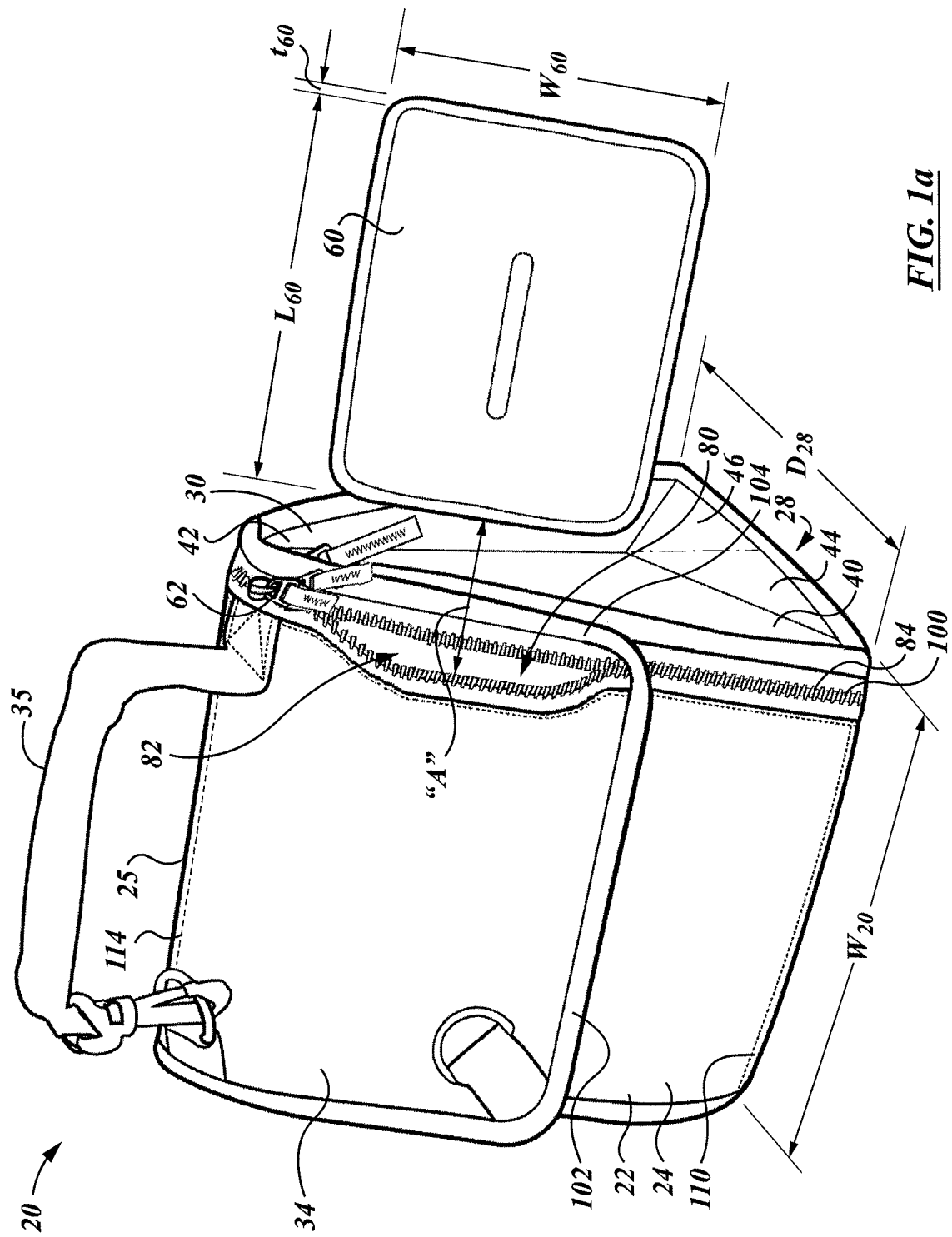
FIG. 1a shows a perspective view from in front, to one side and above an example of an embodiment of a collapsible soft-sided insulated container assembly showing an externally accessible thermal storage member access opening and a thermal storage member for placement in that opening.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are substantially to scale, except where noted otherwise, such as in those instances in which proportions may have been exaggerated in order more clearly to depict certain features of the invention.

For the purposes of this description, it may be that a Cartesian frame of reference may be employed. In such a frame of reference, the long, or largest, dimension of an object may be considered to extend in the direction of the x-axis, the base of the article, where substantially planar, may be considered to extend in an x-y plane, and the height of the article may be measured in the vertical, or z-direction. In other contexts, the z-direction may be the through thickness of a substantially planar panel where the major dimensions lie in the x- and y-directions. The largest container panels herein may be designated arbitrarily as either the front and rear sides, or top and bottom sides, faces, or portions of the container. Similarly, the closure member, or opening is arbitrarily designated as being at the top, and the base panel is designated as being at the bottom, as these terms may be appropriate for the customary orientation in which the objects may usually be found, sold, or employed, notwithstanding that the objects may be picked up and placed on one side or another from time to time at the user's choice. It should also be understood that, within the normal range of temperatures to which human food and human touch is accustomed, although the term cooler, or cooler container, or cooler bag, may be used, such insulated structures may generally also be used to aid in keeping food, beverages, or other objects either warm or hot as well as cool, cold, or frozen.

In this specification reference is made to insulated containers. The adjective "insulated" is intended to be given its usual and normal meaning as understood by persons skilled in the art. It is not intended to encompass single layers, or skins, of conventional webbing materials, such as Nylon (t.m.), woven polyester, canvas, cotton, burlap, leather, paper and so on, that are not otherwise indicated as having, or being relied upon to have, particular properties as effective thermal insulators other than in the context of being provided with heat transfer resistant materials or features beyond that of the ordinary sheet materials in and of themselves. Following from Phillips v. AWH Corp., this definition provided herein is intended to supplant any dictionary definition, and to prevent interpretation in the US Patent Office (or any other Patent Office) that strays from the customary and ordinary meaning of the term "insulated". The Applicant also explicitly excludes cellophane, waxed paper, tin foil, paper, or other single use disposable (i.e., not intended to be re-used) materials from the definition of "washable".

Similarly, this description may tend to distinguish various embodiments of hard shell containers from soft-sided containers. In the jargon of the trade, a soft-sided cooler, or bag, or container, is one that does not have a substantially rigid, high density exoskeleton. A typical example of a container having a hard exoskeleton is one having a molded shell, e.g., of ABS or polyethylene, or other common types of molded plastic. Rather, a soft-sided container may tend not to be substantially rigid, but may rather have a skin that is flexible, or crushable, or sometimes foldable. By way of an example, which is not intended to be exhaustive, comprehensive, exclusive or limiting, a soft-sided cooler may have an outer skin, a layer of insulation, and an internal skin, both the internal and external skins being of some kind of webbing, be it a woven fabric, a nylon sheet, or some other membrane. The layer of insulation, which may be a sandwich of various components, is typically a flexible or resilient layer, perhaps of a relatively soft and flexible foam. In some examples, a soft-sided container may still be a soft-sided container. It may include a substantially rigid liner, or may include one or more battens (which may be of a relatively hard plastic) concealed within the soft-sided wall structure more generally, or where hard molded fittings may be used either at a container rim or lip, or to provided a base or a mounting point for wheels, but where the outside of the assembly is predominantly of soft-sided panels. Once again, this commentary is intended to forestall the adoption by the US Patent Office, (or any other Patent Office), of an interpretation of the term "soft-sided" that diverges from the ordinary and customary meaning of the term as understood by persons of ordinary skill in the art in the industry, and as used herein.

FIGS. 1a-1e, 2a-2f, and 3a illustrate a container assembly, indicated generally as 20. Container assembly 20 is a soft-sided insulated container, and may be a collapsible soft-sided insulated container. That is, container assembly 20 may be a folding bag or sack, as indicated in the collapsed and folded views of FIGS. 1b-1e. The bag, or container assembly, 20, may have a wall structure indicated generally as 22. Wall structure 22 may be a soft-sided insulated wall structure. Wall structure 22 may include a front wall panel 24, a rear wall panel 26, a bottom wall panel 28 a left-hand side wall panel 30 and a right hand side wall panel 32. It may also include a further wall panel or member, or extension, such as may have the form of a closure member, or top wall however it may be called, and which is identified as, lid 34. The front, rear, left hand and right hand side wall panels may be arranged about the periphery of the base or bottom wall panel such that they co-operate to define five sides of an open topped-box or chamber, that chamber being indicated in FIG. 3b generally as 36. The entire structure may have a carrying handle, 35, which may be suitably located at an upper portion of structure 22 such as at the juncture of the lid 34 and the rear wall panel 26. The carrying handle may have a releasable handle clip, that may permit the handle to snap to a mating ring fitting either across the bag on the ridge of the hinge (e.g., when empty), or diagonally across lid 34 (e.g., such that the handle will be above the center of the enclosure when full, so that the bag may tend to hang "square").

Wall structure 22 may fold in the manner of a paper bag. That is the left and right hand side wall panels 30, 32 may be bi-folding along their vertical centerline, as at 45, to have folding portions 40, 42, which may be trapezoidal; and a triangular bottom fold, or folds, 44, 46. On folding, bottom wall panel 28 may fold into two halves, as at 50, 52 along central fold line 55. When the bag folds, the front and rear walls move toward each other.

It may be that in either a partially full condition, as in FIGS. 1a and 1b, or fully collapsed condition, as in FIGS. 1c, 1e, and 1d, lid 34 may reach over, and over-fold, the upper margin 58 of from wall panel 24, such that lid 34 lies flat against front wall panel 24. Front wall panel 24 may have a releasable securement 48, such as may have the form of a fabric hook-and-eye patch such as sold under the trade mark "Velcro". Similarly the inside margin of lid 34 may have a mating releasable securement such as may be a mating hook-and-eye fastener patch 38, seen in FIG. 3a, also such as may be "Velcro". Releasable fasteners 48 and 38 mate to secure lid 34 in the folded-down configuration. In the Figures such as FIGS. 1e, and 2f, other than the presence of the accommodation access closure member, the right hand view is the same as the left-hand view except of opposite hand. The rear view of the collapsed embodiments is the same as the rear view of FIG. 2c of the partially expanded or fully expanded conditions. These additional views are not shown to avoid duplication.

When the container is full, as shown in FIGS. 2a-2f, it may have a generally rectangular or cubic, six-sided, box shape, in which the bottom, front, rear, left and right walls form five sides of an open-topped box, and lid 34 defines a closure member that is hingedly attached to the upper margin of rear wall panel 26, as at 25, and releasably secured about the remainder of the upper lip or rim, or margin of the side wall panels 30, 32 and front panel 24 container walls by a releasable securement 62. Releasable securement 62 may be a tracked fastener, and may have the form of a zipper. Lid 34 is thereby releasably securable, and is movable between first and second positions (i.e., closed and open) to govern access to chamber 36.

In terms of construction, front wall panel 24, bottom wall panel 28, rear wall panel 26 and lid 34 may all be formed from a continuous strip of material, or layers of materials, as may be described below. Left and right hand side wall panels 30, 32 may then be sewn or otherwise secured to the side margins of the larger strip of panel components.

It may be that container assembly 20 has one or more removable thermal storage members 60. Thermal storage members 60 may be pouches containing phase changing exothermic material, or may contain a phase changing brine that may be frozen and function as an ice-pack. The term "ice pack" is hereafter used generically either for such a pouch that provides cooling or heating. Cooling may be understood to be typical, and may be taken as the most common default.

In the embodiments herein, it may be that thermal storage members 60 are substantially flat. Although they may be in some instances bent or curved, they may also be substantially planar, having an arc-length, or span, or breadth, or a height $L_{60}$ (e.g., in the x-direction) and a span or arc length, or depth, or width $W_{60}$ (e.g., in the y-direction) that are of generally the same order of magnitude, and a through-thickness $t_{60}$ (e.g., in the z-direction) that is much smaller than either the width or height. The dimension in the x-direction is, for example, somewhat smaller than the width $W_{20}$ of container assembly 20 generally, to fit the space between left and right hand side wall panels 30, 32. The dimension $W_{60}$ in the y-direction may correspond to, and be somewhat less than, the front-to-back dimension of bottom wall panel 28. Member 60 may be thought of as a rectangular disc or wafer, or lozenge, like a rectangular or square relatively thick pancake. It has a big face defined by the x-direction and y-direction major surface, which is typically the largest face of the gel pack. It also has a small face or small faces defined by the through thickness and either one of the x-direction or y-direction large dimensions. The small face fits or slips, or slides, or squeezes, however it may be expressed, through the externally accessible opening or slot in the side face of the unit. Once the gel pack is in the accommodation, the large face provides the large heat transfer interface surface that contacts the inside wall membrane and provides cooling (or heating) to the objects in the chamber. The direction of insertion can be thought of as being cross-wise to the direction of dominant heat transfer, the one being an end-wise motion in a direction generally lying in the plane or surface, or arc length, of the object, and the other being generally normal to the large face.

Although member 60 shown in FIG. 1a is not illustrated as a folding embodiment, thermal storage member 60 may be bi-folding, e.g., as shown in the embodiment of FIGS. 9a-9c, such as having a first thermal storage portion 64 and a second thermal storage portion 66 joined by a flexible intermediate portion such as a living hinge 65. The hinge may not run the full length, but may leave a portion by which gel can communicate between the portions. There may also be a central weld shown at the oval depression 68. Not that the thickness $t_{60}$ shown in FIG. 9b is exaggerated relative to the embodiment of FIG. 1a. In proportion, it would be about half as thick as shown, and might typically be about 3/8"-1/2" (10-13 mm), whereas in a typical lunch bag, the bag width $L_{20}$ might be about 8" (20 cm) and the bag bottom panel depth, $D_{28}$, might be about 6" (15 cm).

It may be desired for container assembly 20 to have multiple accommodations for such thermal storage members 60 as may be. It may also be desirable for such thermal storage members to be removable, so that they may, for example, be placed in the freezer over-night to solidify the cooling pack gel, or brine, as may be. They may then be put in the container the next day to keep the student's lunch cold or cool. That is, by being removable it is necessary only to put the cooling packs, members 60, in the freezer, rather than the entire, rather more bulky, bag structure 22. It may also be that the user may wish to remove or introduce the cooling pack without necessarily opening the main container, i.e., chamber 36.

Figure 3A:
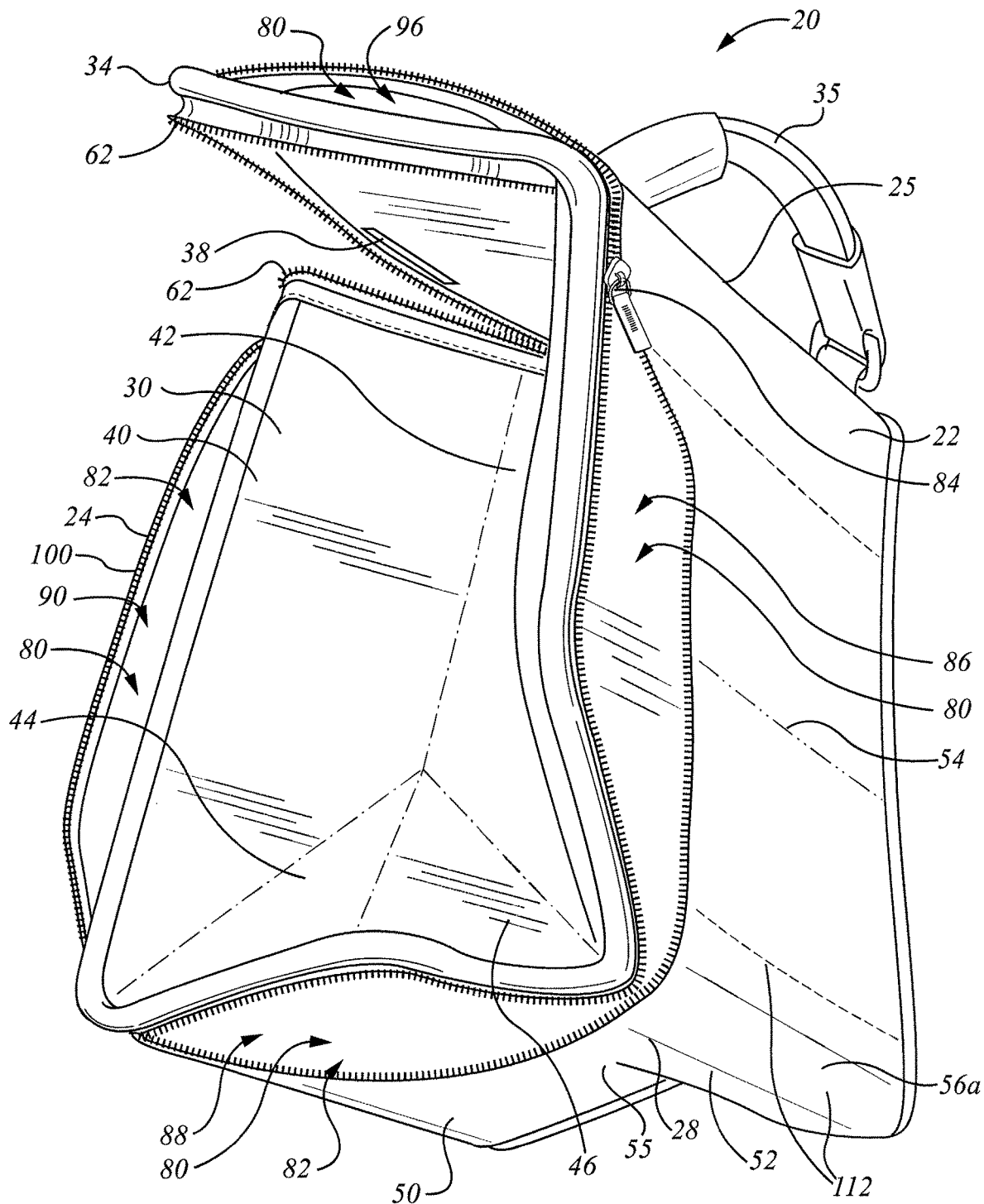
FIG. 3a is a perspective view of the container assembly of FIG. 1a with the thermal storage accommodations open to permit access.
Figure 3B:
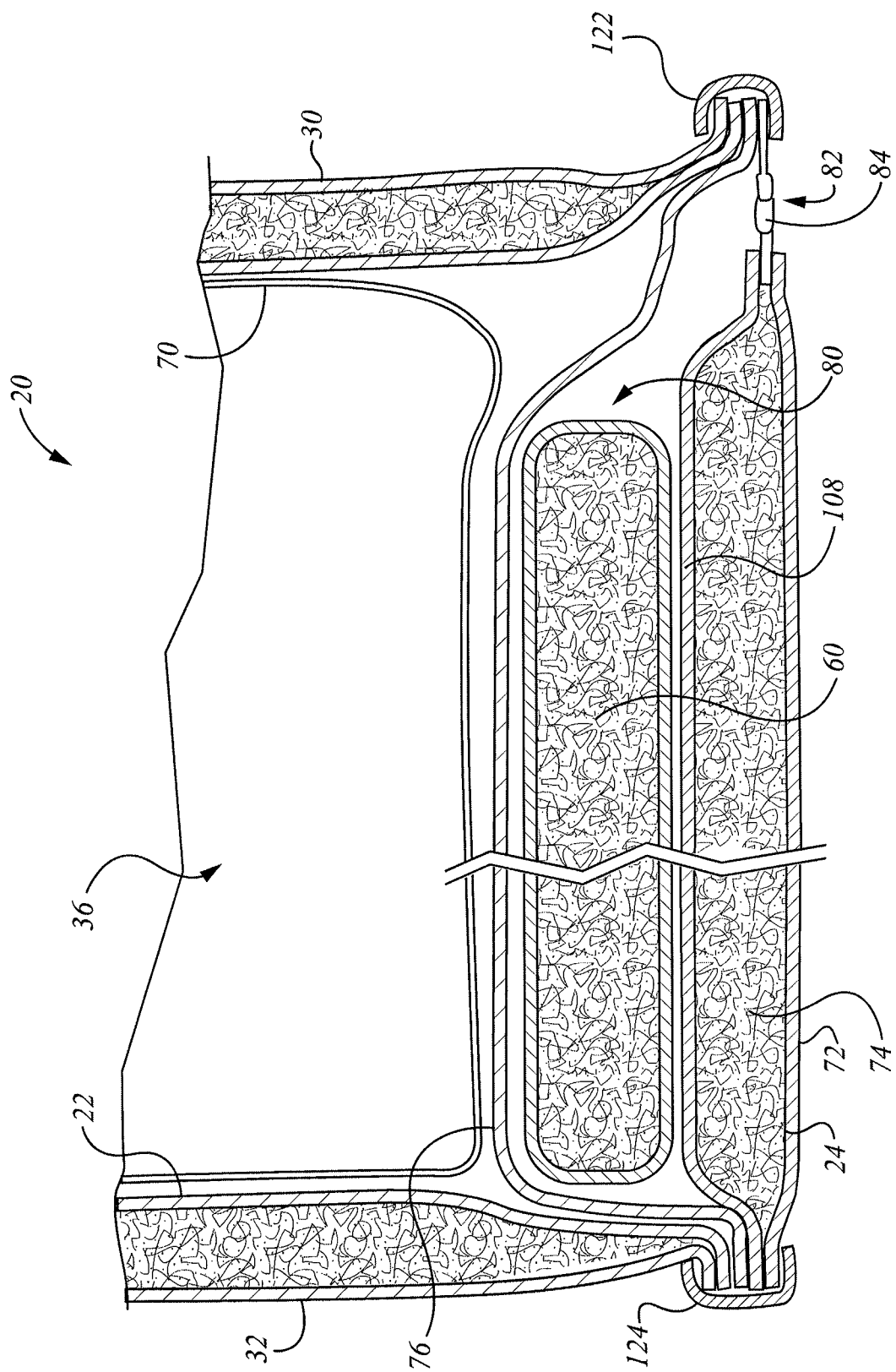
FIG. 3b is a sectional view of the wall construction of the soft-sided insulated container assembly of FIG. 1a taken on section '3b-3b' of FIG. 2b.

To that end, wall structure 22 may have several layers as seen in FIG. 3b. While FIG. 3b is of a section of front wall panel 24, it is intended to be generic in respect of front, bottom, rear, and top wall panels. There may be an external skin 72, a layer of thermal insulation, 74, and an internal skin 76. External skin 72 may be a woven or other fabric skin. Thermal insulation 74 may be an open-cell or closed-cell foam. Internal skin 76 may be a PVC or other sheet, and may be opaque. It may be that internal skin 76 is part of an internal liner 70 of container assembly 20 more generally, that internal liner 70 being secured to the inside of container assembly 20 about the upper rim of chamber 36 more generally. Liner 70 may be a seamless liner. Internal skin 76 may be separate from liner 70. Wall structure 22 may have an accommodation 80 defined outwardly of skin 76. Accommodation 80 may be located inwardly of insulation 74. That is, accommodation 80 may be a pouch or pocket or lodging defined between insulation 74 and the internal web or skin 76. In FIG. 3b, the thickness of Skins 72, 76, and liner 70 have been disproportionately exaggerated for the purposes of illustration and easy understanding. They are actually thin webs, having a thickness of perhaps 0.1-0.25 mm or 3-10 mils. The outer skin may be a woven nylon cloth. It may be a scuff or abrasion resistant cloth and may have an 800 denier or 1050 denier, or similar grade or thickness. By contrast, the thermal storage element and the insulation may each be 3/8" (1 cm) thick (+/−).

Figure 3C:
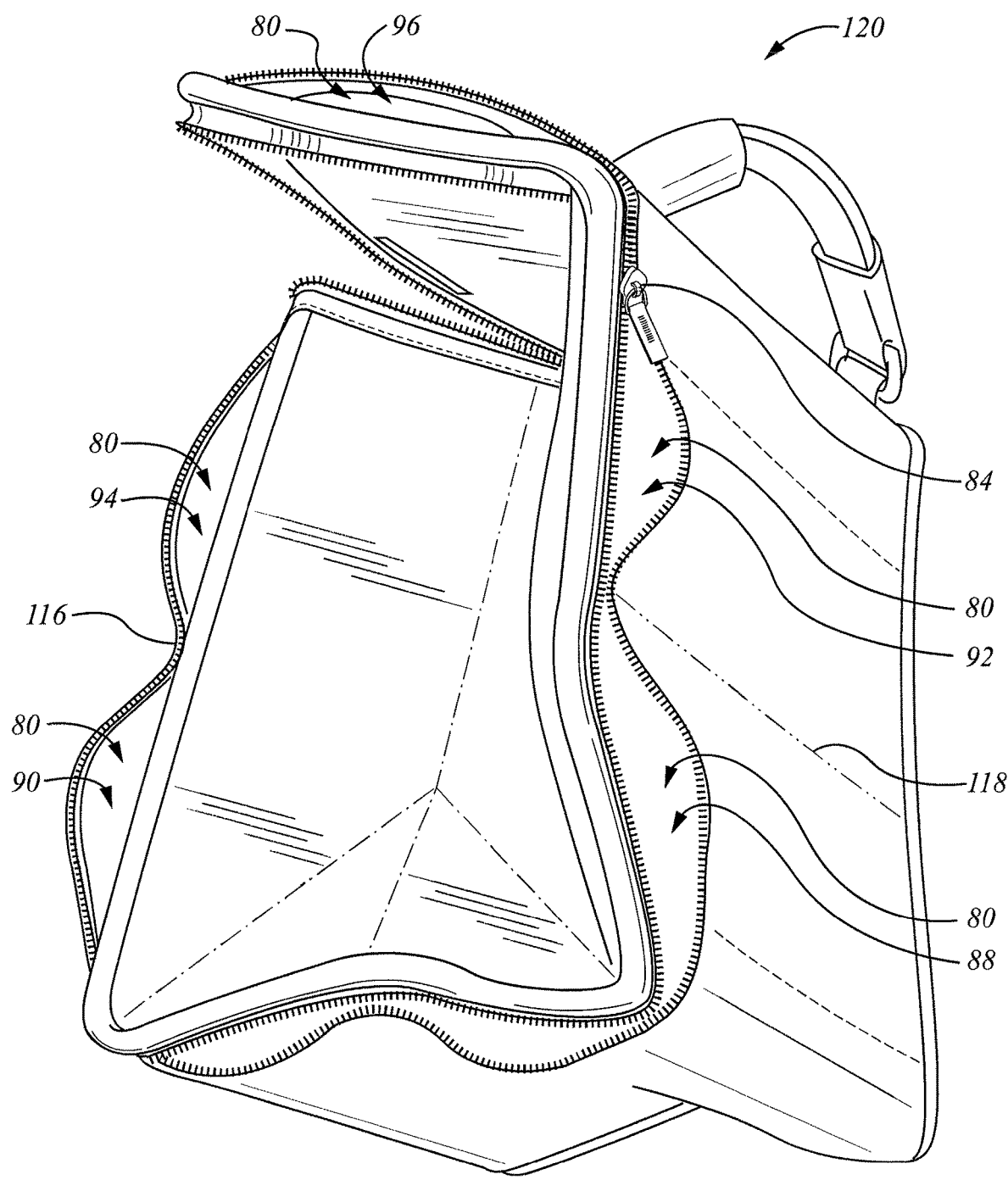
Figure 3D:
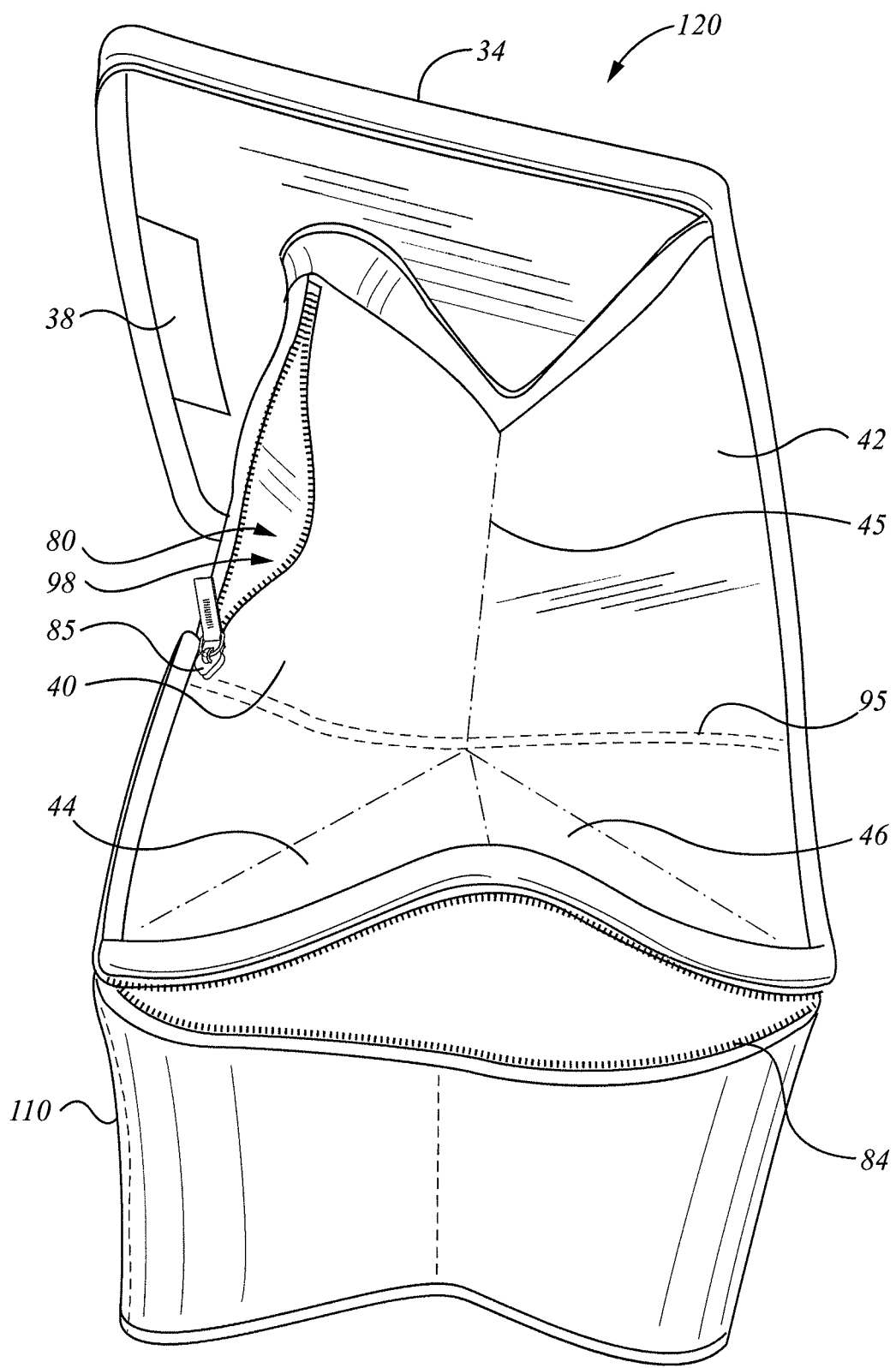
FIG. 3d is a view of an alternate embodiment of the soft-sided insulated container of FIG. 3a showing bottom and side access for cooling elements.
Figure 4A:
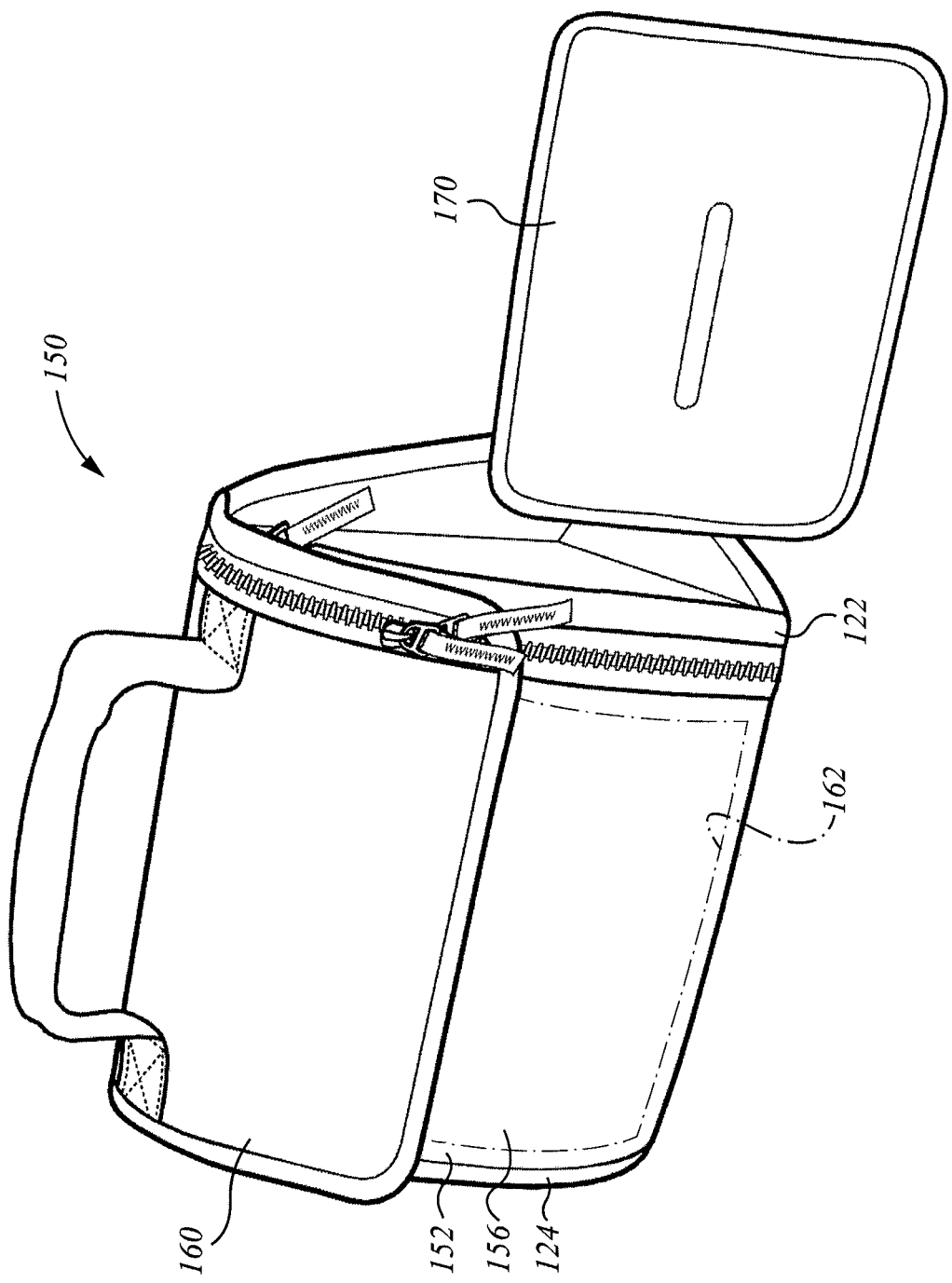
FIG. 4a is a perspective view of an alternate collapsible soft-sided insulated container assembly to that of FIG. 1a in a partially expanded position or condition of a lunch sack that is generally triangular in side-view.
Figure 4B:
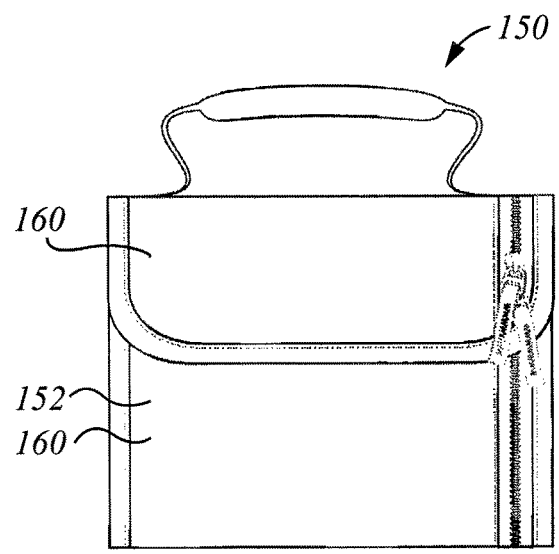
FIG. 4b is a front view of a thermal storage member for the container assembly of FIG. 4a in the partially expanded condition.
Figure 4E:
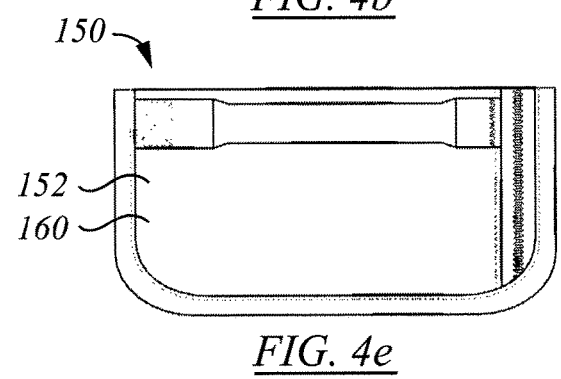
FIG. 4e is a top view of the container assembly of FIG. 4c.
Figure 4F:
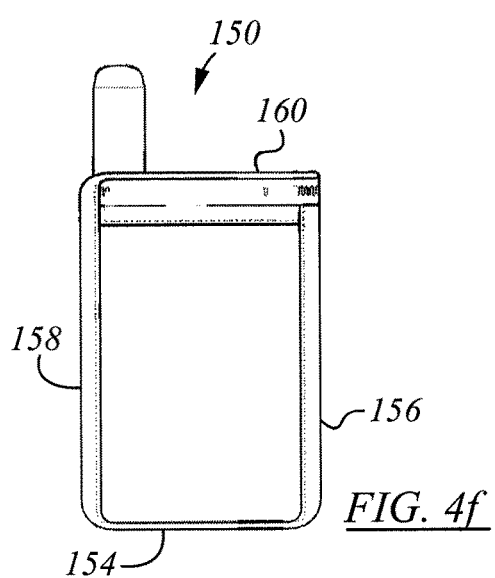
FIG. 4f is a side view of the container assembly of FIG. 4c.
Figure 4D:
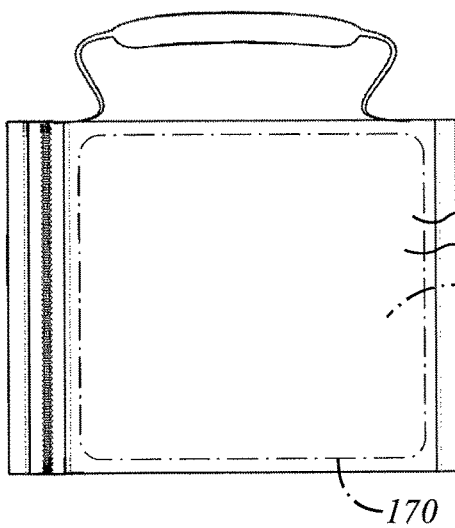
FIG. 4d is a rear view of the container assembly of FIG. 4c.
Figure 4C:
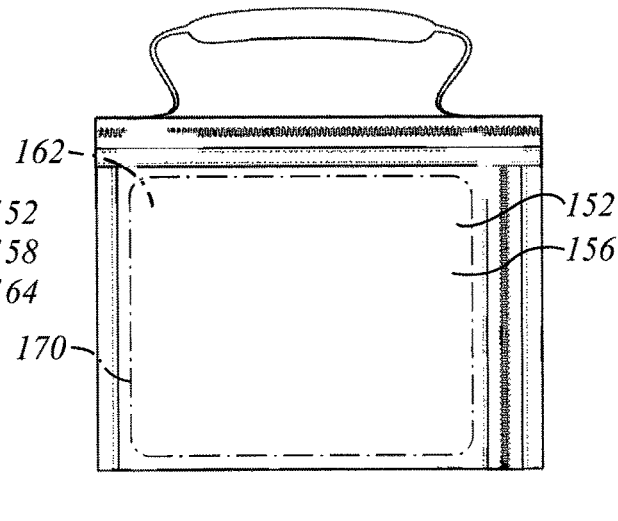
FIG. 4c is a front view of the soft-sided insulated container assembly of FIG. 4a in a fully expanded position or configuration.

Accommodation 80 may have an opening 82. Opening 82 may be in the external wall portion, or portions, of wall structure 22. Access to accommodation 80 through opening 82 may be governed by a closure, or closure member 84, which may be a tracked fastener, such as a zipper or male and female mating plastic strips. Wall structure 22 may include several examples of accommodation 80, such as indicated as bottom wall accommodation 88, rear wall accommodation 86, and front wall accommodation 90. Both rear wall accommodation 86 and front wall accommodation 90 may be first or lower accommodations. In an alternate embodiment, as shown in FIG. 3c, a container assembly 120, which is otherwise similar to container assembly 20, may have both lower accommodations, 86 and 90, and respective rear and front upper accommodations 92, 94. In that instance the upper and lower pockets, or pouches, or accommodations, may be segregated from each other as by a divider, such as a welded or stitched seam, or by an internal web or partition. An accommodation 96 may be formed in lid 34. As shown in the alternate embodiment of FIG. 3d, container assembly 20 may alternatively, or additionally, have an accommodation, or accommodations, 98 formed in the left and right hand side wall panels 30, 32 above the level of the lower triangular folding portions or gussets 44, 46. Such a pocket or accommodation 98 may have a generally horizontal lower bound 95 such as may be defined by a seam, be it welded or stitched, or an internal web, as may be, and may have a separate access opening, governed by a separate closure member, in this case shown as zipper 85. In an expanded position or condition, member 60, as frozen, need not be bi-folding when installed. However, if the bag is to be folded while member 60 is in place, a bi-folding member, or two separate members, may be used in accommodation 98 instead.

The bottom wall accommodation could also be a double accommodation, and the various configurations may be mixed and matched as may suit. It is not necessary that the front and back (or bottom and lid) panels have the same number of thermal member accommodations, or that every wall panel have any such accommodation. However it may be convenient for the front and back wall panels to be substantially the same.

In this instance closure member 84 may be a zipper 100 that has a root near or at the distal or free margin 102 of lid 34. Zipper 100 may then run along the side margin 104 (it being arbitrary which whether the left or right) of lid 34 and continuing on along that side margin downwardly along rear wall panel 26, forwardly along bottom wall panel 28, and upwardly again along the side margin of front wall panel 24, terminating at, or relatively near the top margin 58 of front wall panel 24. While one single zipper 100 is described in respect of this embodiment, in an alternate embodiment, individual, separate zippers could instead be used for each of the lid, rear wall, bottom and front wall segments.

Like member 60, accommodation 80 may be generally flat and thin, and opening 82 and closure member 84 may be correspondingly formed as a slot or slit or high-aspect-ratio opening where the length of the slot is more than five times, possibly much more than five times, its width, into which a correspondingly substantially flat thermal storage member 60 may be introduced in a sideways, sliding motion in the direction admitting its smallest profile cross-section, that direction being indicated by arrow 'A' in FIG. 1a. That is, the width of the slot corresponds to, or admits, the thickness, $t_{60}$, while the length of the slot admits one or the other of the length or width of the thermal storage member.

By way of example, accommodation 90 of front wall panel 24 may, for the purposes of description, be considered to lie in a substantially upright or vertical plane, with the x-direction being the direction of insertion into (or, conversely, retraction from) accommodation 90, the y-direction being the up-and-down direction, and the z-direction being the through-thickness direction of front wall panel 24. In this example, the large dimensions of both the pocket and the cooling pack are in the x and y directions, and the thin direction is in the z-direction. In essence, each pocket opens along an edge, or side, at a slit that is large enough to admit the substantially flat cooling pack when it is slid sideways (in the x-direction) through the opening (which is a slot having a height in the y direction and a width in the through-thickness z-direction). That is, the cooling pack enters the slot with its smallest end or face or edge leading, and the slot is sized to receive it. When in place, though, the largest or major face of the cooling pack faces, or fronts on, or lies against, the face of the interior skin or web 76, and, by heat transfer through web 76, may tend to cool (or warm, as may be) objects contained within chamber 36. So, in summary, the cooling pack is installed (and removed) by sideways motion in the direction of its smallest end face, and cooling occurs e.g., by conduction, through its largest face. Insertion of thermal storage member 60 into any of accommodations 80 is similar to slipping an LP into its cover sleeve, or slipping a CD-Rom or DVD into a DVD player slot. The direction of insertion is largely perpendicular to the direction of desired heat transfer. Expressed differently, the access opening slot is sized to accommodate a small, side face of the thermal storage member, while the largest face of the accommodation, and of largest facial area of the thermal storage member, face toward the objects to be cooled.

Since each accommodation 80 is externally accessible, there is no need to open lid 34 to install or to remove the cooling (or heating) pack. Rather, the cooling or heating pack may be inserted, or removed, independently of access to chamber 36. The installed position of member 60 is indicated by the phantom outline in FIGS. 2b, 2c, 2d, and 2e.

For example, the user may prepare a school lunch the night before, place the lunch in chamber 36, and then place container assembly 20, without its cooling packs, in the refrigerator. At the same time the flat and relatively compact cooling packs, namely thermal storage members 60, may be placed in the freezer to solidify. The next morning, thermal storage members 60, (however many there may be), may be taken out of the freezer and introduced into the respective externally accessible accommodations 80 to keep the contents of chamber 36 of container assembly 20, or 120, cool (or warm), without having to open the main lid 34 or otherwise disturb the contents of chamber 36. In summary, then, container assembly 20 has one or more externally accessible cooling pack accommodations. The accommodation is, or accommodations are, slots defining sideways sliding entry-ways formed along an edge or margin of wall structure and of the accommodation. The cooling (or heating) packs insert sideways, i.e., cross-wise to the body of the bag, through the slots and into the accommodations.

Accommodation 80, in whichever panel or wall or region of wall structure 22 it may be, may lie inboard of thermal insulation 74, such that the path of least resistance to heat transfer is toward chamber 36, or, equivalently, the path of heat transfer through the insulation has greater resistance than the path of heat transfer to the interior of chamber 36. Moreover, there may be a web or skin, or fabric, or sheet 108 lying on, or forming, the outside wall of accommodation 80, so as to form a smooth surface between insulation 74 and the outside wall of accommodation 80. It may be that sheet 108 has a reflective surface, such as a metallic or metallicised reflective surface facing toward accommodation 80, and, when in use, toward and thermal storage member 60 place in accommodation 80.

The entry of accommodation 80 is defined by 82. The far end of each accommodation 80 may be defined by the junction of inside skin 76 with external skin 72 at the opposite side margin of the container assembly, where the wall panels are joined together, typically by sewing inside the vertical binding edge strips, as at 122, 124 on the left and right hand margins of the bag respectively. The other two sides or edges, or boundaries of accommodation 80 which run parallel, or generally parallel, to the direction of insertion, may be defined by lines of stitching. The lines of stitching may also define the lines of folding of container assembly 20 as at 110 at the junction of front wall panel 24 with bottom wall panel 28; as at 112 at the junction of rear wall panel 26 with bottom wall panel 28; or at 114 the top of rear wall panel 26 at the transition to lid 34, effectively as a flap that folds in the manner of a fabric hinge. There may also be stitching or welding at a mid-level height as at 116 in front wall panel 24 or 118 in rear wall panel 26 where there is more than one thermal storage member accommodation in either or both of front wall panel 24 and rear wall panel 26. There need not be as many as six or eight (if also in the side wall panels) such accommodations 80, and the number of ice packs or warming packs need not equal the number of accommodations, although it may be convenient that they be equal. It is also possible that there may be more than one thermal storage member in each accommodation. It is not necessary that there be stitching penetrating all of the layers of the assembly, or that the laterally running connections be made with stitching. They could, for example, be made by being heat sealed together.

It is not necessary that all of accommodations 80 be the same size, or that all thermal storage elements 60 be the same size, or the same type. Nonetheless, it may be convenient that all of the thermal storage elements be the same so that they may be interchangeable.

The folding of wall structure 22 in the paper-bag style may occur in either of two modes. In a first mode, shown in FIG. 1e, the bottom panel is also folding, such that it folds along a transversely running central fold, 55, (seen in FIG. 2e) that folds upward and inward toward the side walls. This may occur where bottom wall panel 28 does not have an internal batten or floor stiffener; or does not have a single-slab rigid thermal storage element; or the thermal storage compartment is empty; or the bottom compartment does have a bi-folding thermal storage element or has two smaller thermal storage elements placed side-by-side to permit folding on central fold 55. In the alternate embodiment of folding, such as where there is a rigid floor batten, or there is a rigid single-piece thermal storage member that does not fold, the rear panel may fold as at crease 54 with the bottom margin 56 of rear wall panel 26 folding up behind the rest of rear wall panel 26. In this embodiment, bottom panel 28 more or less pivots such that half of bottom wall panel 28 lies generally parallel to and behind the bottom margin 56 of rear wall panel 26.

In a further alternative, accommodation 80 may be an internal liner, such as may have a generally cylindrical form, like a tube of fabric or plastic. The tube is flattened, and one end is closed by being sewn into the seam at the far end of the tube, as at piping or binding 124. The near end of the tube has one side sewn to external skin 72, and the other side sewn to internal the inside edge of at opening 82, as at the seam at piping or binding 122. The inside face of the liner may be open to breath, such as if made of netting, or may be an impermeable sheet forming a barrier to air and water. In this context, skin 76 may be the inside of the cylindrical liner, and skin 108 may be the outside. Either or both of skin 76 and liner 70 may be transparent or opaque. In the embodiment illustrated, skin 76 is opaque and liner 70 is transparent.

In the embodiment of FIGS. 4a-4e, there is a soft-sided insulated container assembly 150 having a wall structure 152 that includes a bottom wall panel 154, a front wall panel 156, a rear wall panel 158, and a top wall panel, identified as a lid, or cover 160. Container assembly 150 may be of the same, or substantially the same construction as container assemblies 20 and 120, but may tend to be smaller. In this embodiment, container assembly 150 may only have front wall and rear wall accommodations, 162, 164. It may also have a bottom wall accommodation 166, although this accommodation may smaller than accommodations 162, 164. Access to the various accommodations is governed by closure member 168 which may have the same construction as closure member 84, above. It may employ a single size flat, thin thermal storage member 170, which may be a rigid, i.e., non-folding member, is provided to seat in the pouch or pocket of the accommodation. Container assembly 150 may not necessarily be designed to fold flat in the manner of a paper bag. The fully expanded configuration of container assembly 150 is shown in FIGS. 4c, 4d, 4e, and 4f. As before, thermal storage member 170 may be of the same construction as described for thermal storage member 160, but it may be smaller, whether 5"×7" or 4"×6", or a similar ratio, and of the same thickness as before. The actual size will depend on the size of container assembly 150 more generally. In an alternate version as suggested by FIGS. 8a, 8b, and 8c, member 170 may not necessarily be a folding member, and it may not necessarily have the central welded depression 68.

Figure 5A:
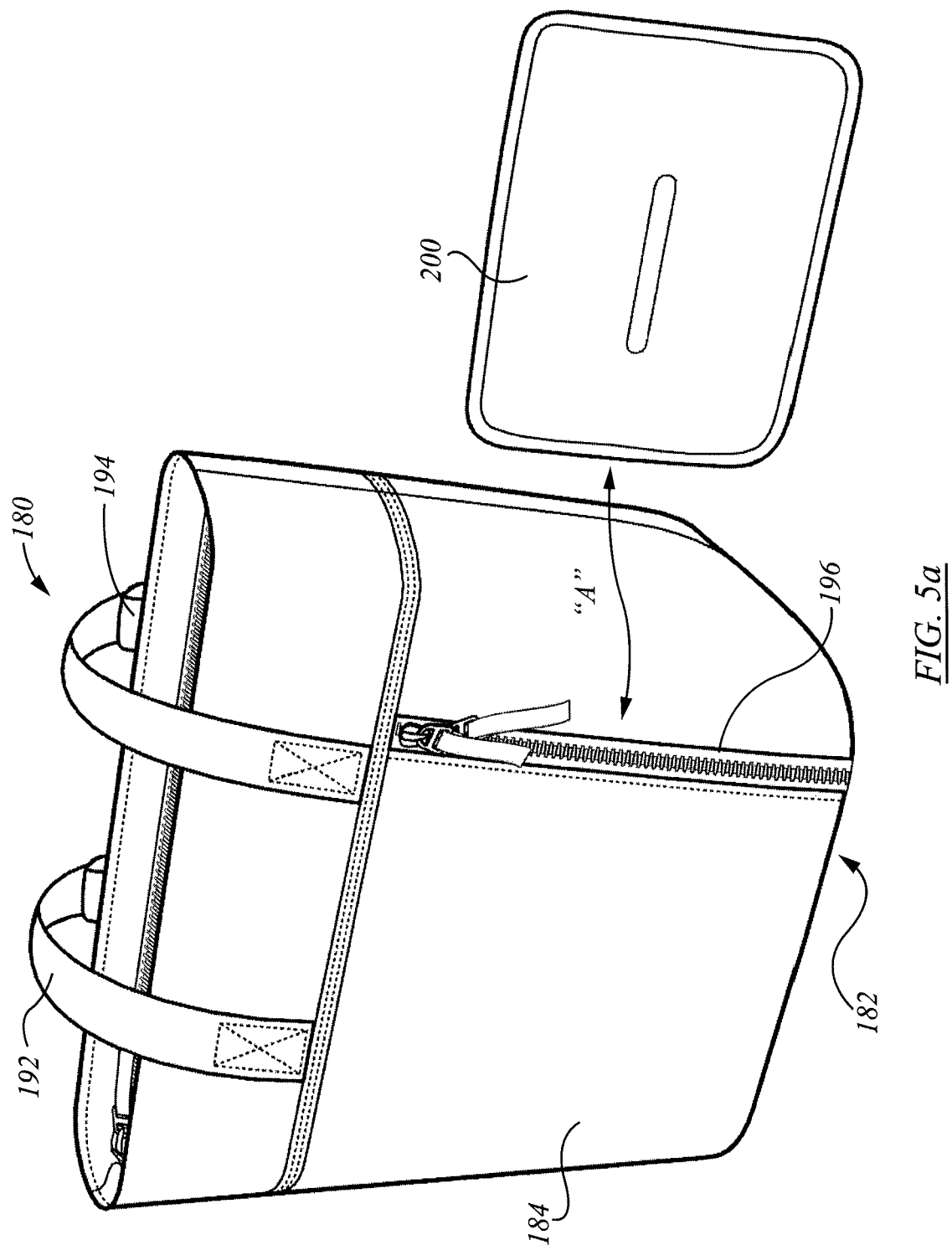

FIGS. 5a-5e pertain to another embodiment of soft-sided insulated container assembly 180 that has the form of a tote bag. That is, a tote bag has a base 182 that is rectangular, typically with an aspect ratio of length to depth of the order of 3:1 or lower, as seen in FIG. 5e. The top of the tote bag is of an higher aspect ratio than the base, such that although the periphery may be constant, or roughly constant, the bag tapers upwardly outward when seen in side view, as in the respective side views of front wall panel 184 and rear wall panel 186 of FIGS. 5b and 5c, yet has an inward taper when seen in the end view of FIG. 5d, such that at the level of the closure 188 the closure member 190 has a long thin aspect ratio, as suggested by FIG. 5f. As its name implies, the tote bag can be carried over the shoulder by means of handles or straps 192, 194. The side wall panels of the tote bag may not have a distinct transition to the end walls, where the margins of the side wall panels are brought together, on a rounded or pyramidal shape, and sewn on a common seam from bottom to top. Accordingly, container assembly 180 has a closure 196 that is mounted roughly square with an end margin 198 of the rectangular base 182, and that governs access to the thermal storage element accommodations. The through-thickness cross-section of the wall structure of container assembly 180 is substantially the same as that of container assembly 20 shown in FIG. 3b, and includes accommodations 80 as before, although of a different size. A large thermal storage member 200 slides sideways into the slot or accommodation defined within the wall structure, in the same manner as before. The tote bag may not necessarily be designed or intended to fold. In the case where the tote bag has a hard base wall, 202, it may be that an alternate access may be provided as at 204 in FIG. 5g, so that the thermal storage member may sit on top of the hard floor panel, beneath the inside skin of the liner of the inside of the tote bag more generally. In this configuration, the external access opening is defined not at the edge of the panel (i.e., at the seam) but in the body of the panel distant from the seam. When the access slot is in the midst of a panel, there could be accommodations 80 to either side of the access opening, governed by a single closure member. The approximate position of thermal storage member 200 as installed is suggested by the phantom outline in FIGS. 5b and 5c.

Figure 6F:
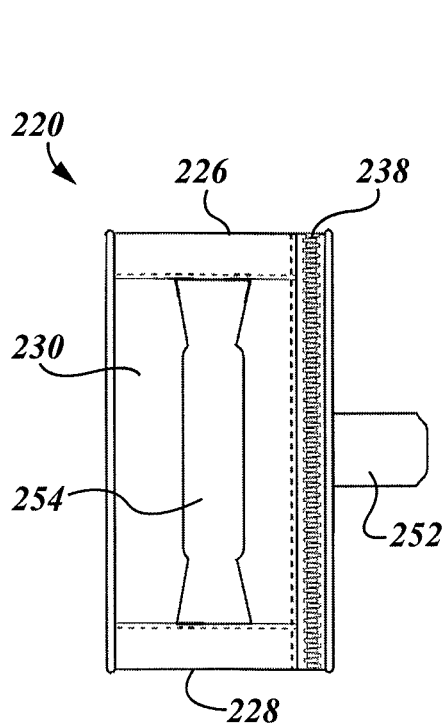
Figure 6C:
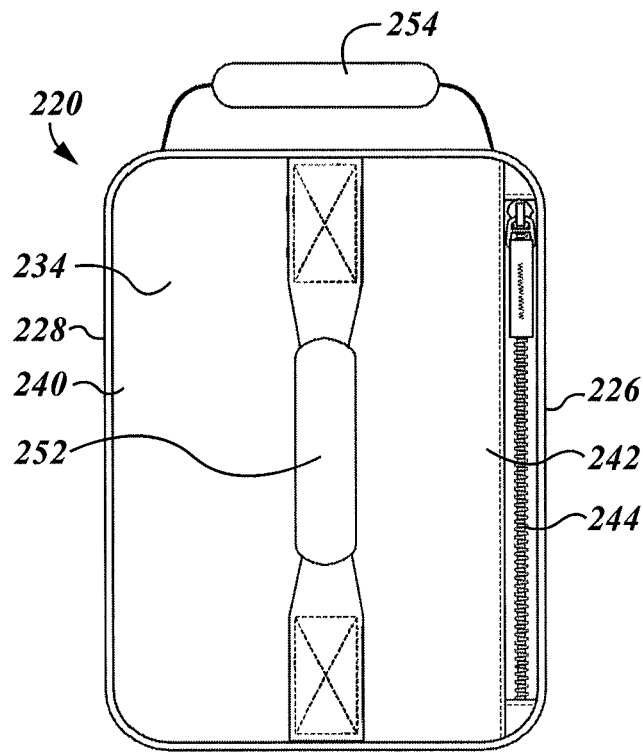
Figure 6E:
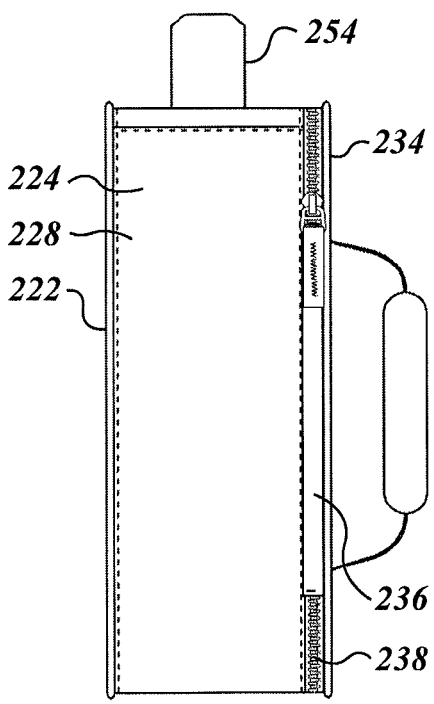
Figure 6D:
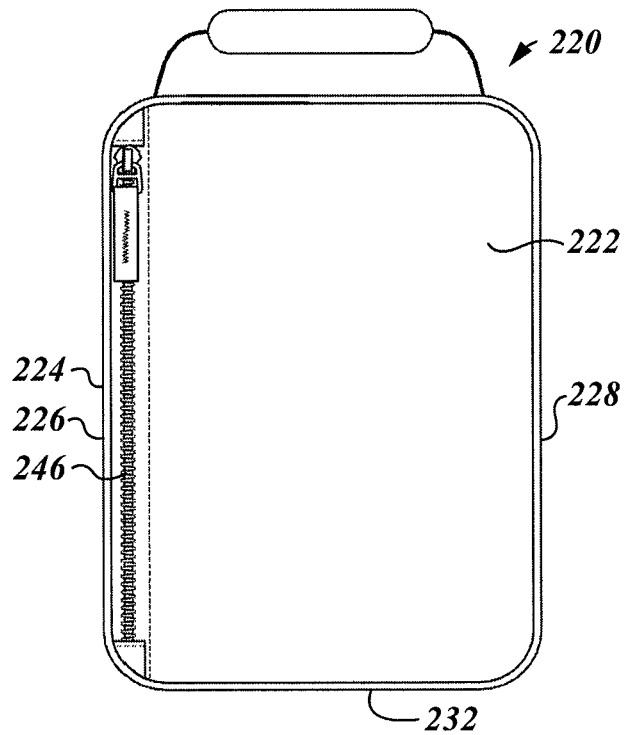
Figures 10A, 10I:
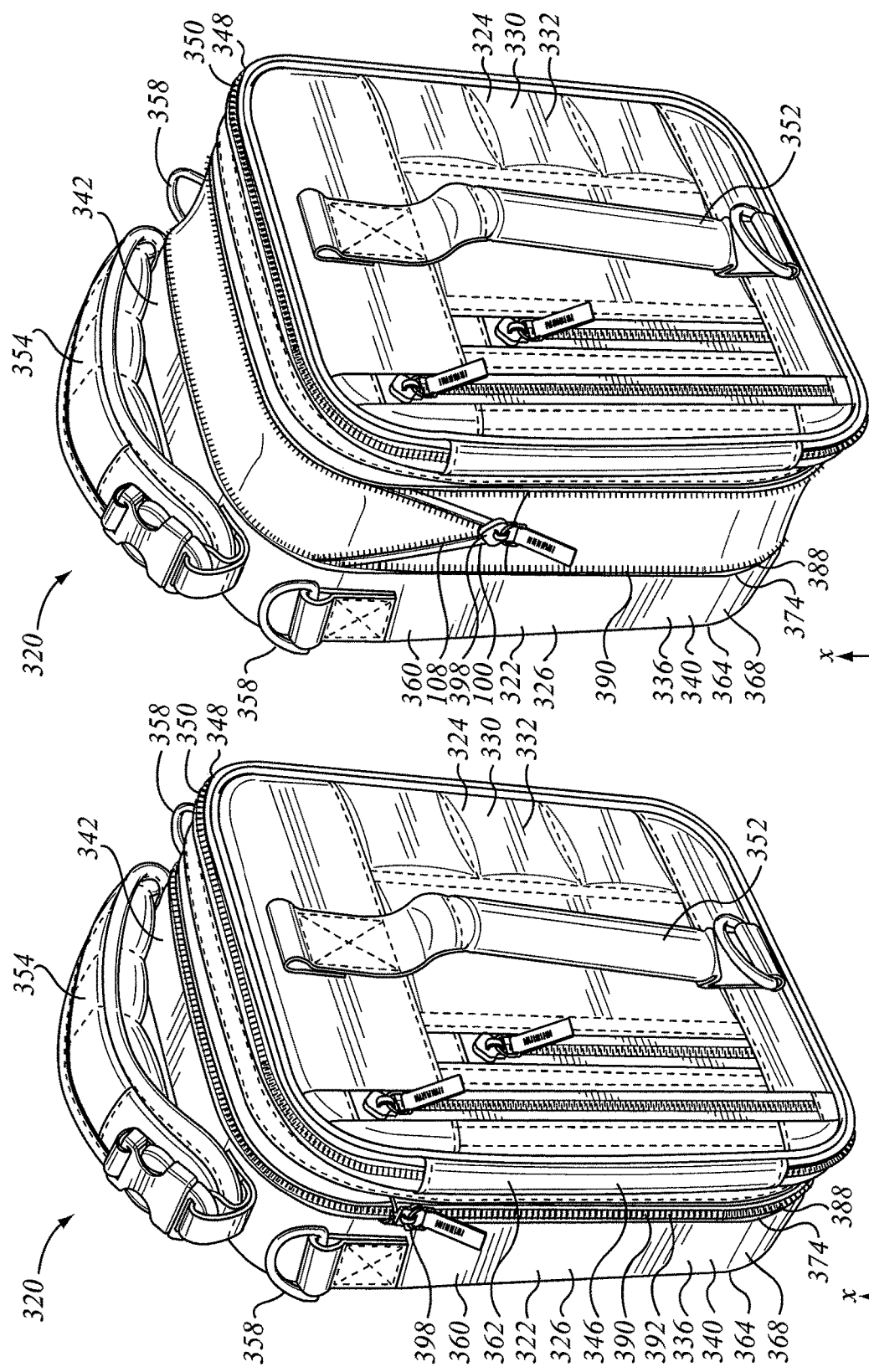
FIG. 10a is a perspective view of an alternate, expandable, embodiment of lunch box to that of FIG. 6a in collapsed form.
FIG. 10i is a perspective view of the lunch box of FIG. 10a in expanded form.
Figure 10B:
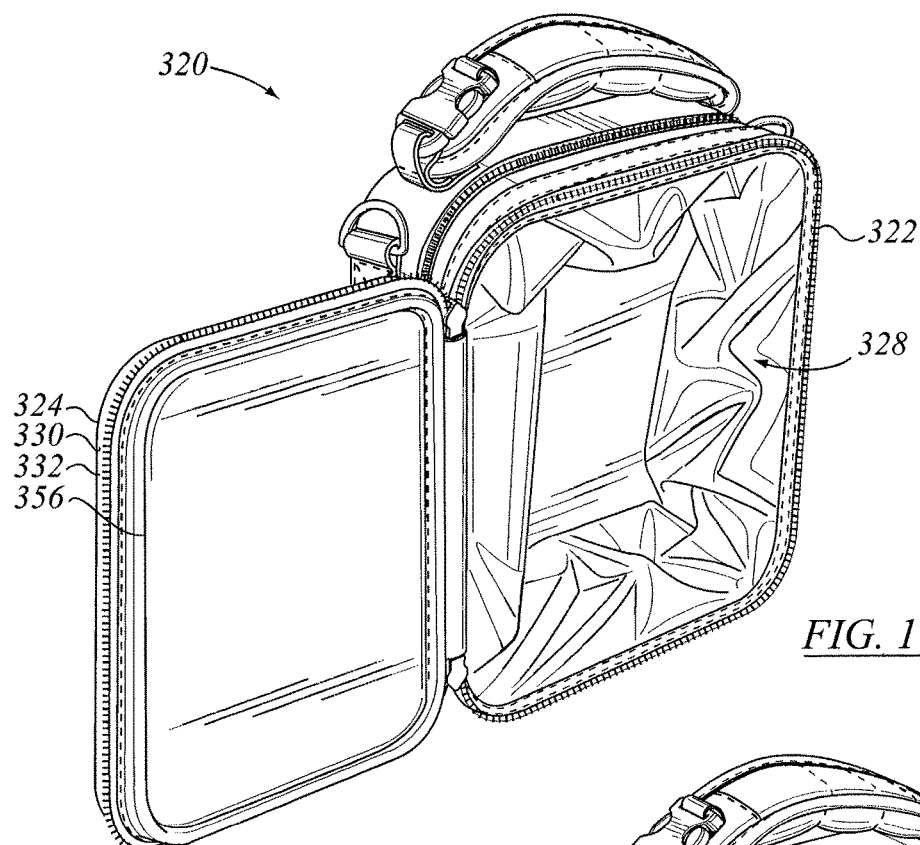
FIG. 10b is a perspective view of the lunch box of FIG. 10a as open.
Figure 10J:
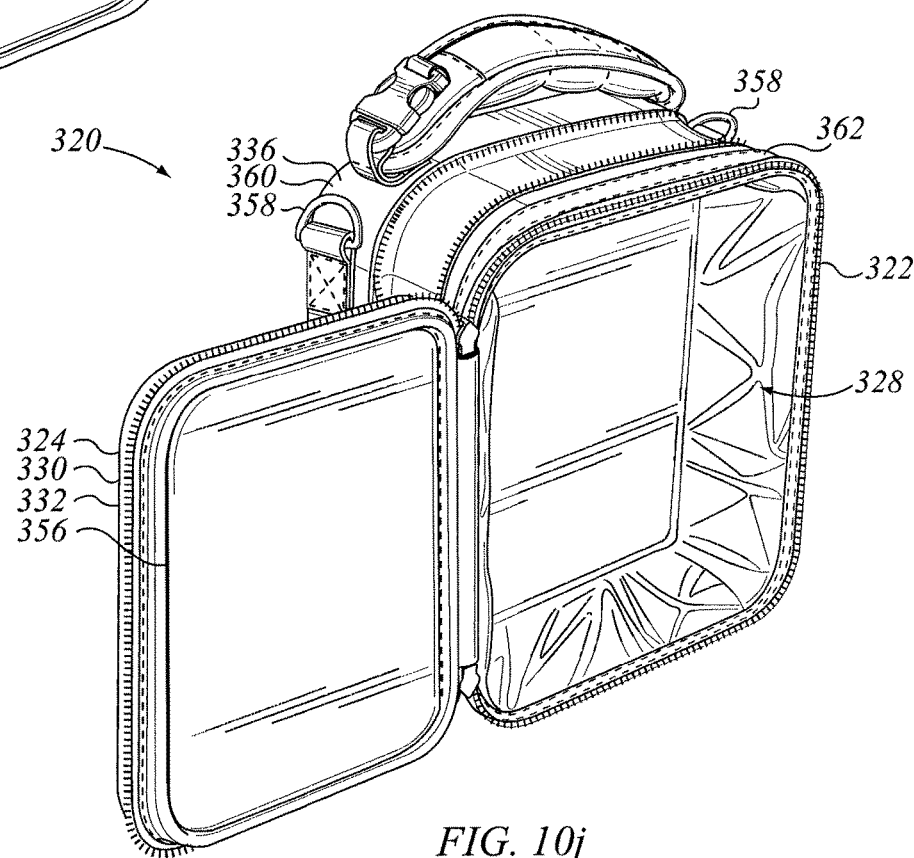
FIG. 10j is a perspective view of an alternate, expandable, embodiment of lunch box to that of FIG. 10b in expanded form.
Figures 10C, 10D:
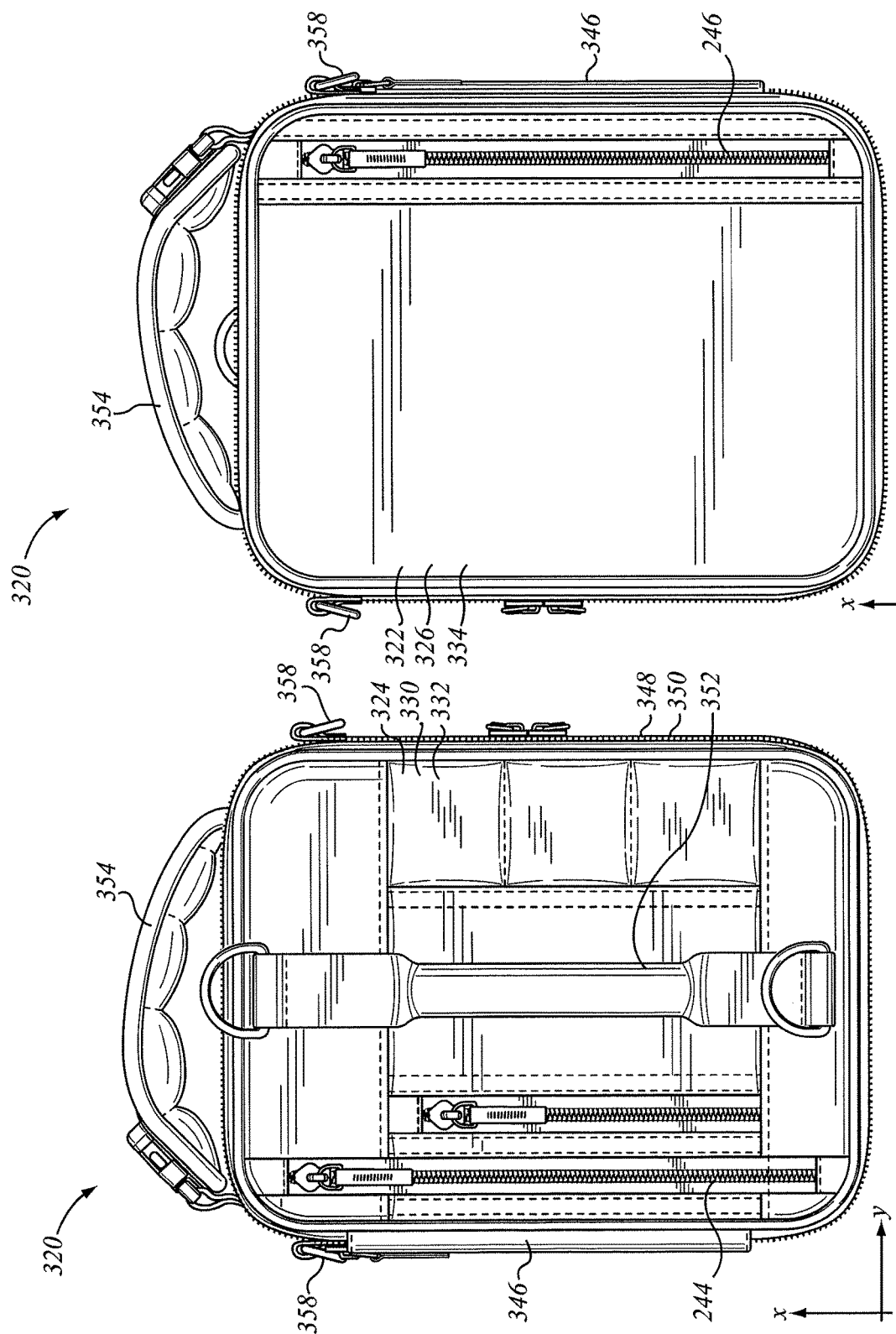
Figure 13F:
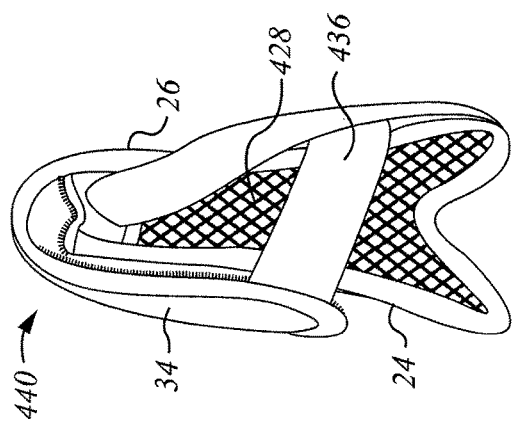
Figure 13K:
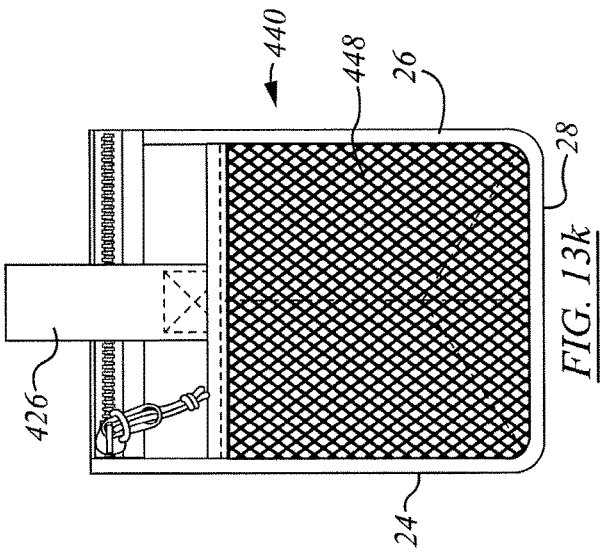
FIG. 13k is a side view of the container of FIG. 13g.
Figure 13D:
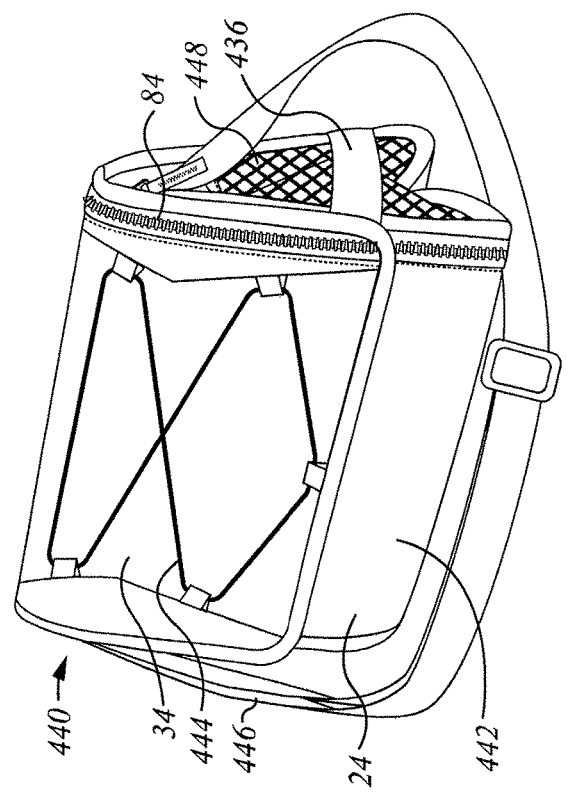
FIG. 13d is an isometric view of the container of FIG. 13a in a folded condition.
Figure 13E:
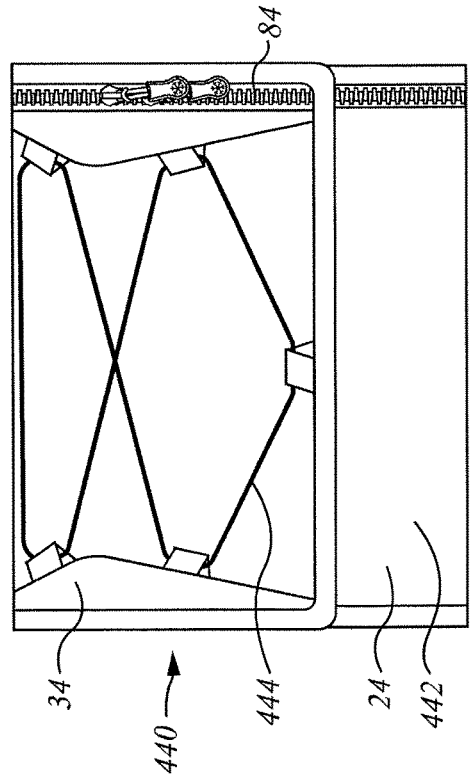
FIG. 13e is a front view of the folded container of FIG. 13d.
Figure 13G:
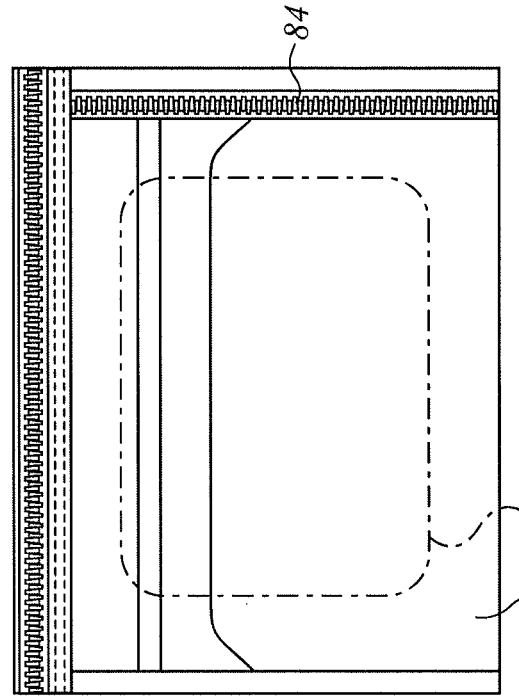
FIG. 13g is a front view of the container of FIG. 13a in expanded condition.
Figure 13I:
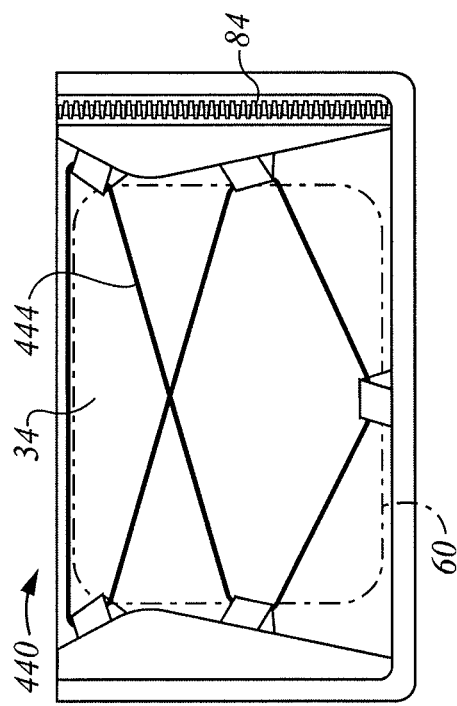
FIG. 13i is a top view of the container of FIG. 13g.
Figure 13H:
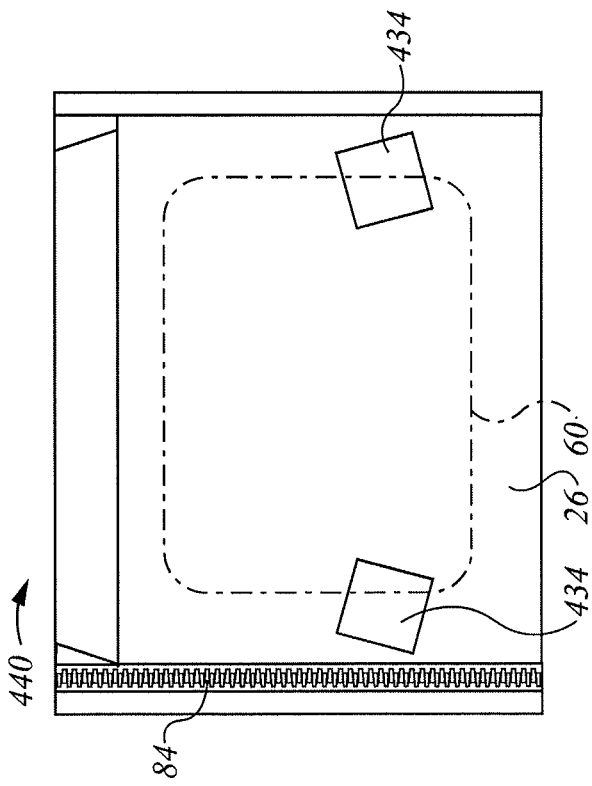
FIG. 13h is a rear view of the container of FIG. 13g.
Figure 13J:
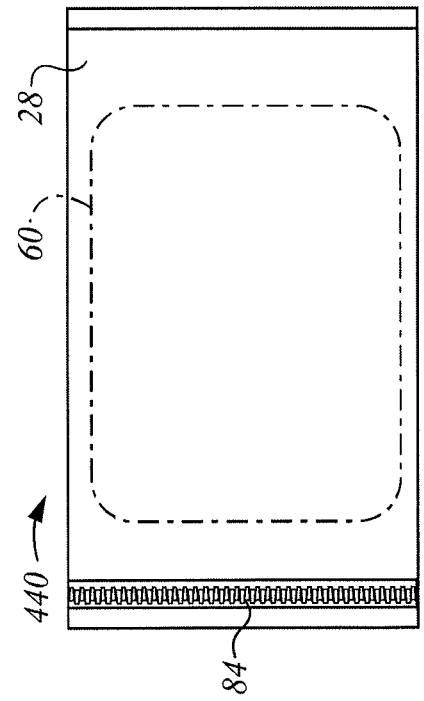
FIG. 13j is a bottom view of the container of FIG. 13g.
Figure 14B:
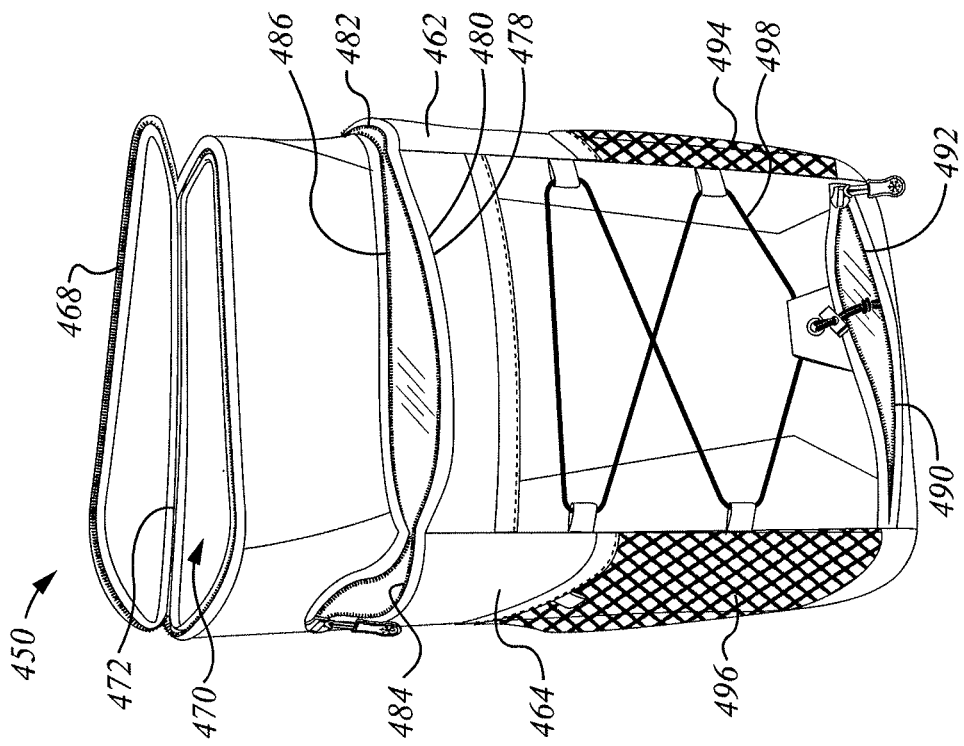
FIG. 14b is a perspective view of the container of FIG. 14a with thermal storage accommodations open.
Figure 14A:
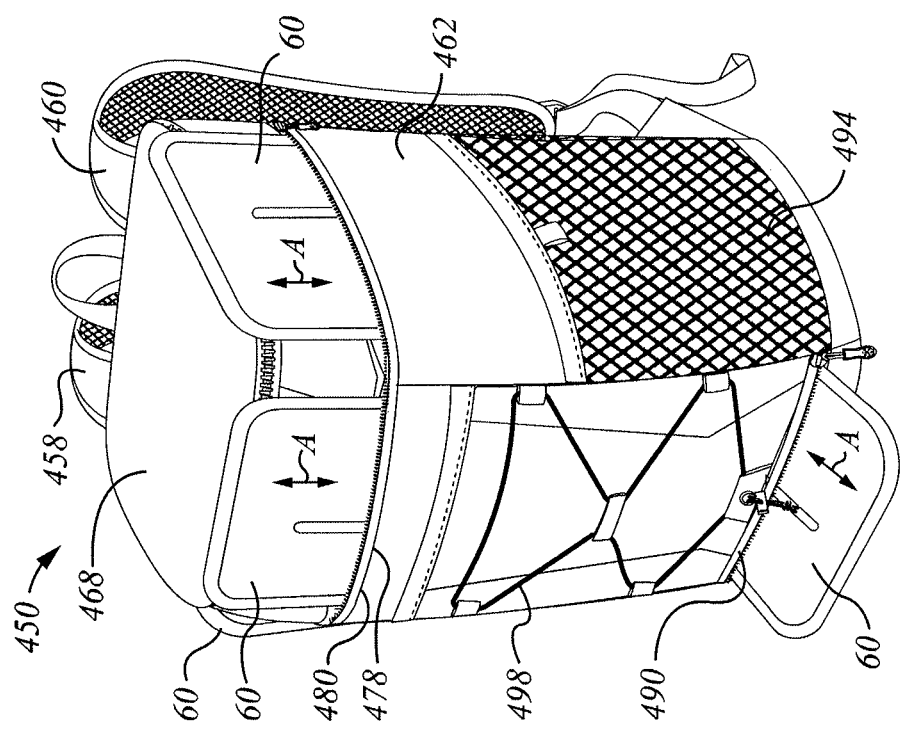
FIG. 14a is an isometric view of a further alternate embodiment of soft-sided insulated container to that of FIG. 1a showing thermal storage elements in a partially inserted condition.
Figure 14E:
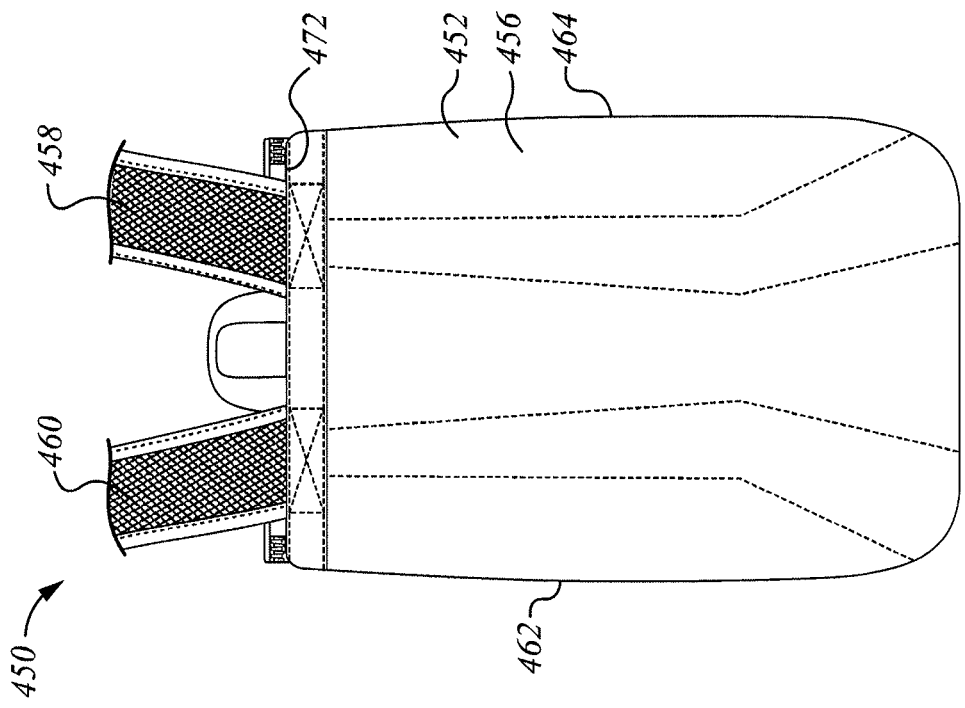
Figure 14C:
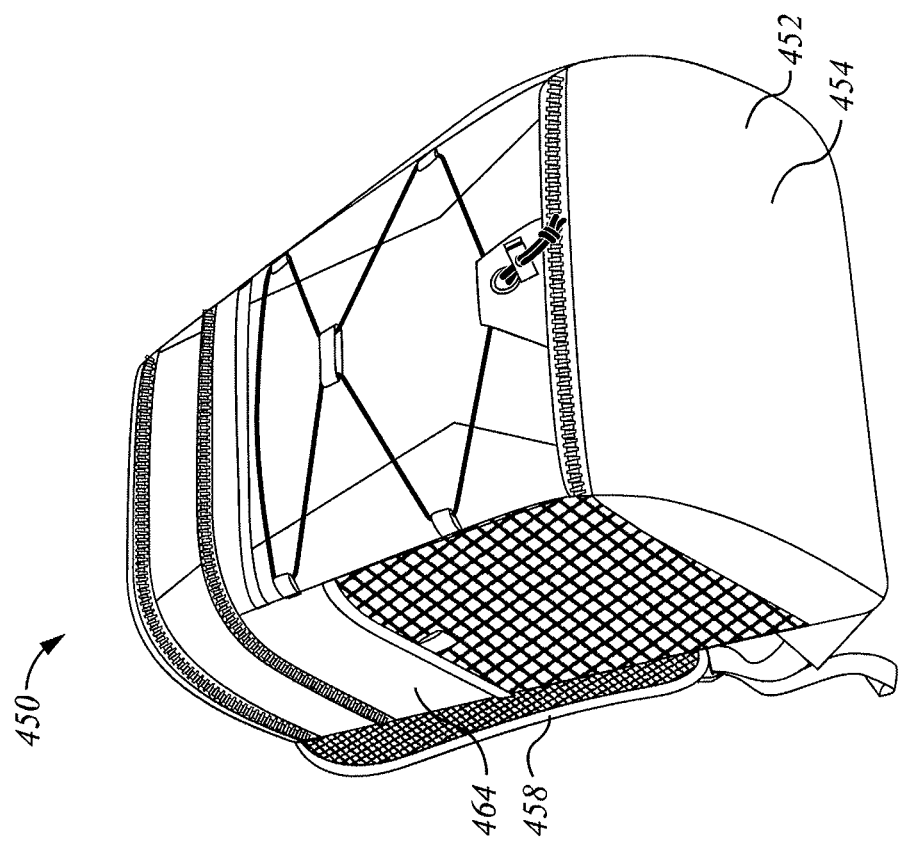
FIG. 14c is a perspective view of the container of FIG. 14a showing the bottom.
Figure 14F:
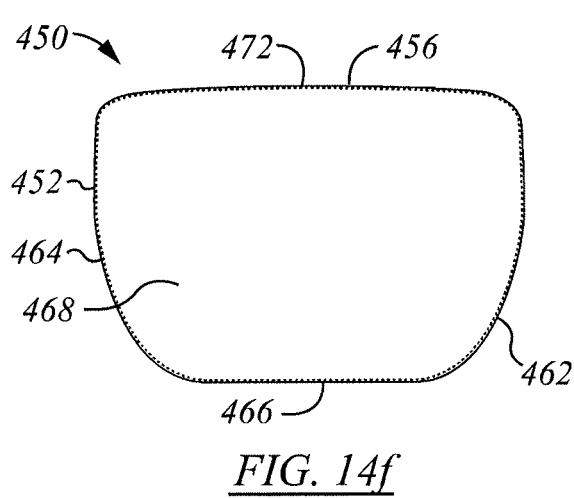
Figure 14G:
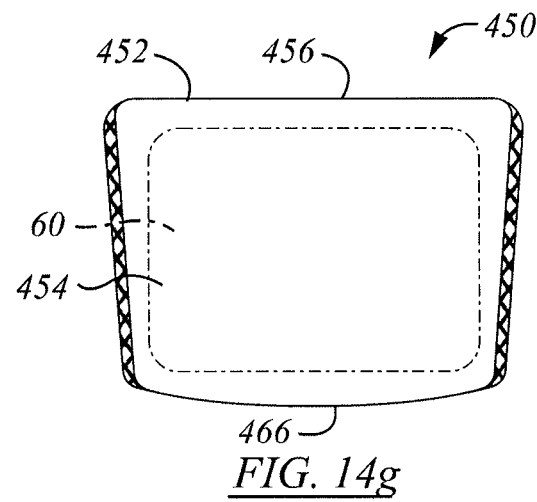
Figure 14D:
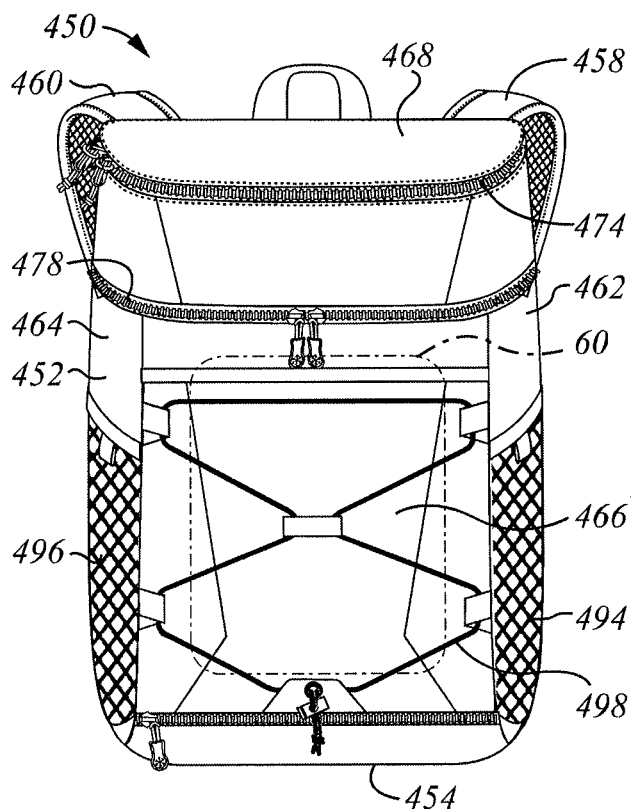
Figure 14H:
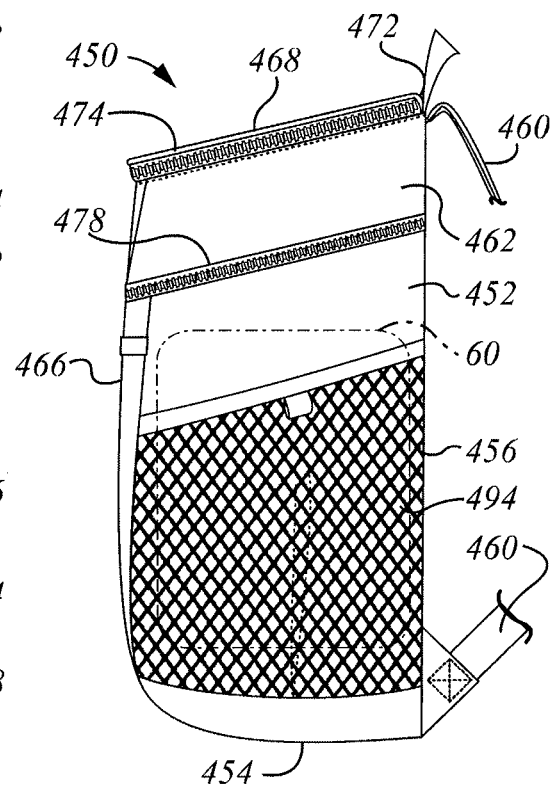
FIG. 14h is a left hand side view of the container of FIG. 14a, the right hand view being the same but of opposite hand.
Figures 15A, 15B:
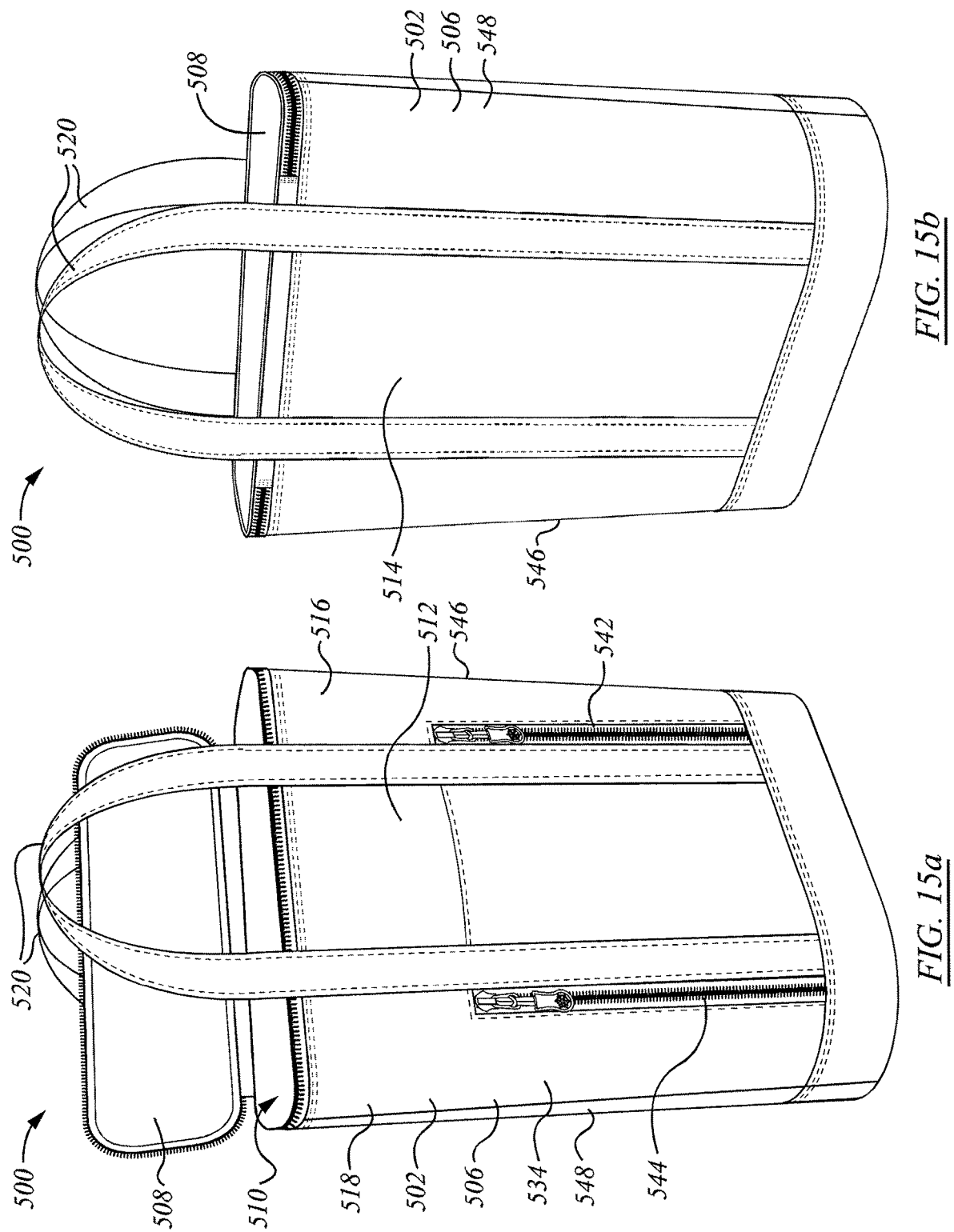
Figures 15D, 15E:
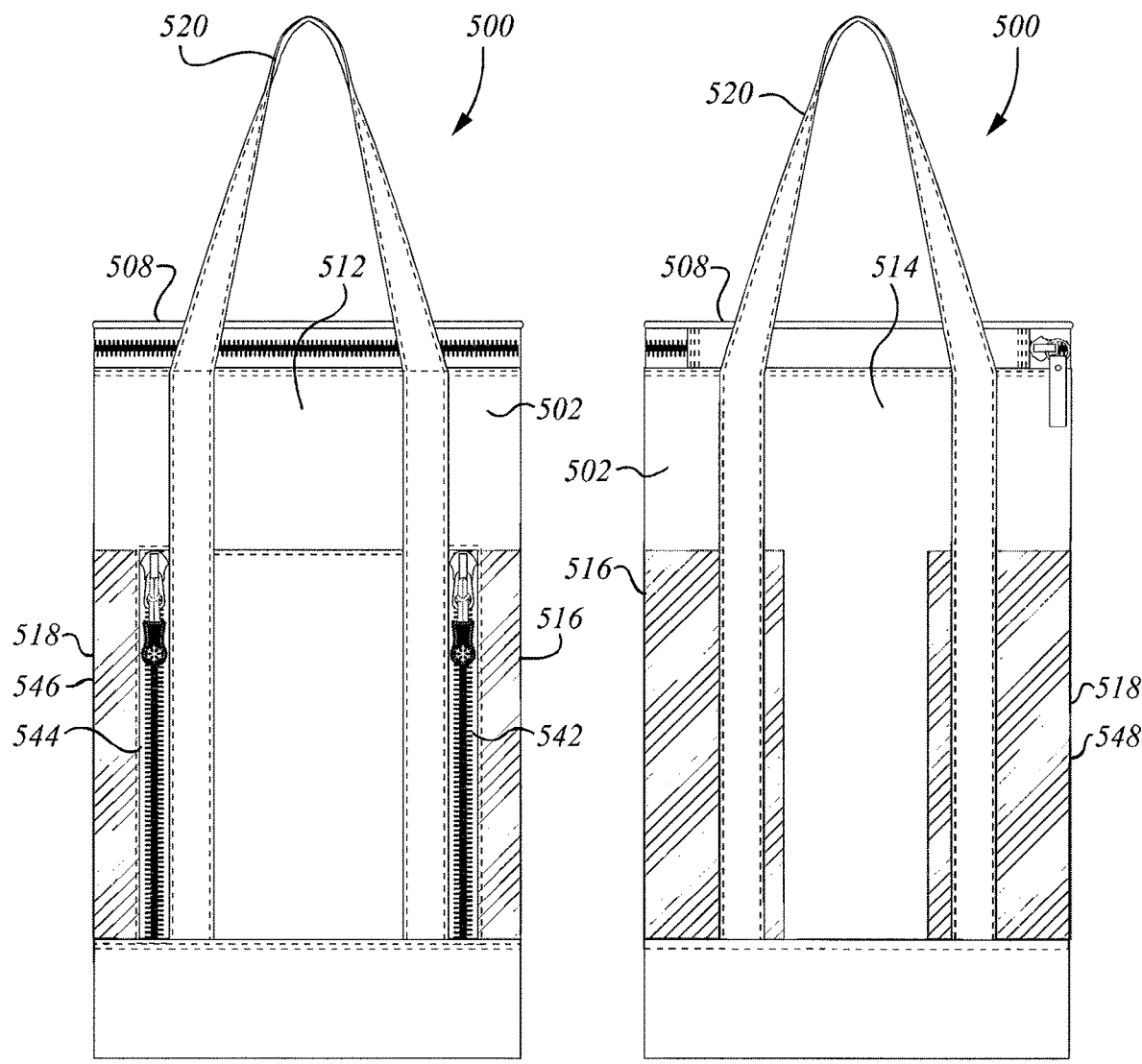
Figures 15F, 15G:
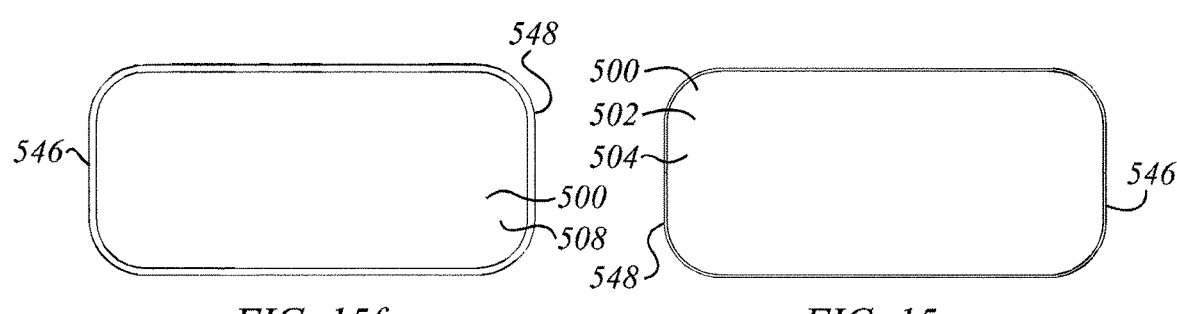
Figure 15H:
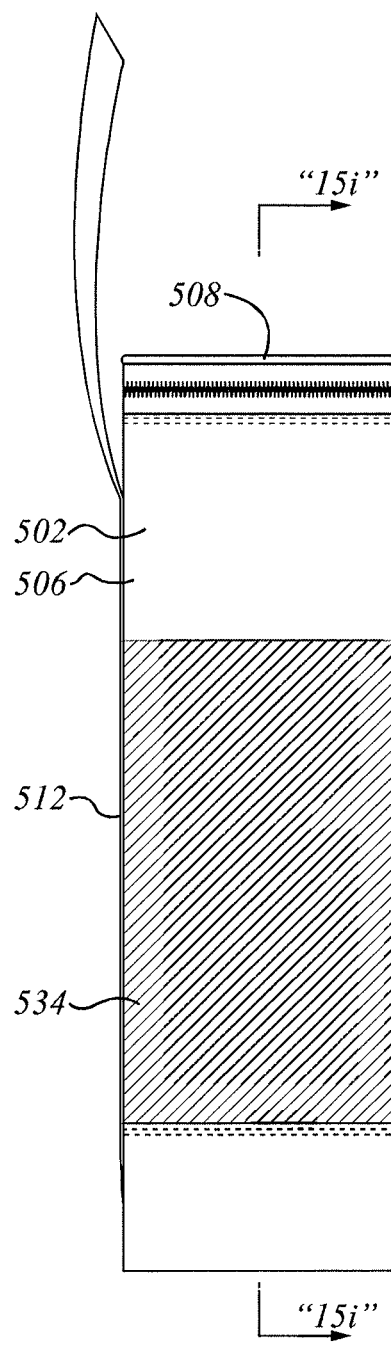
FIG. 15h is a left hand side view of the container of FIG. 15a, the right hand side view being the same but of opposite hand.
Figure 15I:
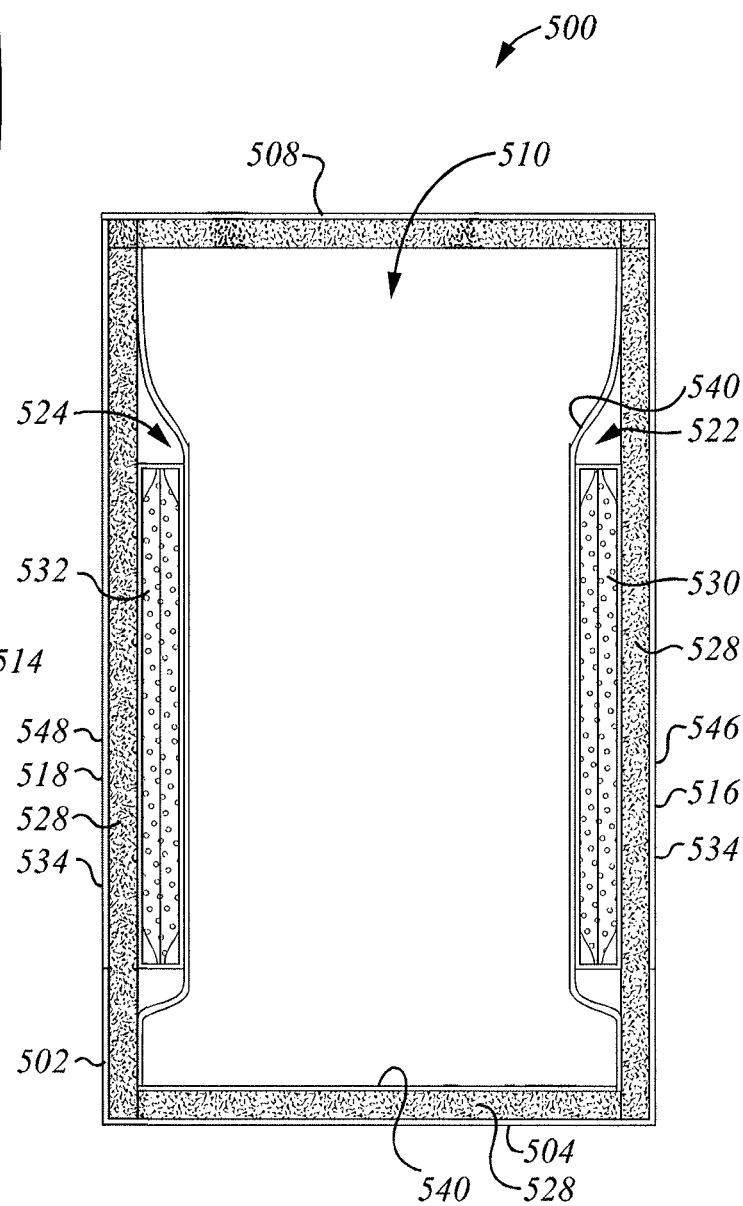
FIG. 15i is a cross-sectional view of the container of FIG. 15a taken on section 15i-15i of FIG. 15h.

In the embodiment of FIG. 6a, there is a soft-sided insulated container in the form of a lunch box, 220. It may not be intended to be collapsible, and, in some embodiments, may include a substantially rigid high density plastic internal tub or liner to prevent crushing of the lunch box. Lunch box 220 may be a generally rectangular, six-sided box having a bottom or back wall panel 222 however it may be called, an upstanding peripheral wall 224 that has a pair of long side portions 226, 228, and a pair of short side end portions 230, 232. The peripheral wall panel 224 and back wall panel 222 co-operate to define the body of a five-sided open topped box. Front wall panel 234 defines the top, lid, or closure of the box, however it may be called, and is connected to the main body of the box by a fabric hinge 236 mounted to the upper margin of long side wall portion 226. A peripheral tracked closure member, such as may have the form of zipper 238 provides releasable securement of the lid to the body of the box. The lid is movable between a closed position and an open position to govern access to the internal chamber. In this arrangement, while the proximal margin 240 of front wall 234 is mounted to the hinge, the distal margin 242 has an access opening governed by thermal storage access opening closure member 244, which, again, may be a zipper. Closure member 244 is movable to permit the introduction or extraction of thermal storage member 250 into the slot accommodation formed in the movable lid. Similarly, the rear or back wall panel 222 has a closure member 246 that governs access to a similar accommodation in the back wall panel. The wall construction of lunch box 220 is, once again, substantially the same, or the same, as shown in FIG. 3b, although either the front wall panel or the rear wall panel may include a stiffening batten mounted with or to the insulation outside of the thermal storage member accommodation. Thermal storage member 250 is a substantially planar, flat member of a size corresponding to the size of the major, or largest, walls of the container namely the front and back wall panels 234 and 222 respectively. Again, the thermal storage member is disk-like, and is inserted sideways into the slot mounted along a margin of the container that admits the small, narrow, end face of member, much like an LP sliding into its cover. The major heat transfer face is then the large face of member 250. Carrying handles 252 and 254 are provided on the front and end faces of the lunch box. As before with container assemblies 20, 120, 150 and 180, the thermal storage member is externally accessible, and can be installed or removed without opening the lunch box or disturbing its contents. Thermal storage member 250 is shown in FIGS. 7a, 7b and 7c, with the relative length, depth, and through thickness shown as $L_{250}$, $W_{250}$, and $t_{250}$. Member 250 need not be a foldable or bendable member.

FIGS. 10a-10e, 11a, 11b, and 12a-12e show alternate embodiments of lunch boxes to that of FIG. 6a. In FIGS. 10a-10e, 11a and 11b, a soft-sided insulated container in the form of a lunch box 320 is substantially the same as the lunch box of container assembly 220, except that assembly 320 is expandable, as by unzipping peripheral zipper, which allows a central section to expand. In FIGS. 12a-12e, container assembly 290 has a peripheral zipper 292 and an expanding central section 284, and is substantially the same as container assembly 320, except that the expandable section of container assembly 320 is immediately next to the movable lid of front wall panel 332, rather than base wall panel 334. By contrast, in FIGS. 12a-12e, container assembly 290 has an expanding central section 284 that is immediately next to base wall 222, and distant from front wall 234. Other than this difference, and the differences in construction necessarily flowing from it, the description of assembly 290 may be taken as being substantially the same as that of assembly 320. One may note that, as with the skin thicknesses in FIG. 3b, the thicknesses of the various skins in FIGS. 11a and 11b are shown disproportionately thick for the purpose of ease of illustration and understanding. They are of the thicknesses of Nylon and PVC membranes or cloths, as may be.

Referring to FIGS. 10a-10e, and by way of a general overview, a soft-sided insulated container assembly is indicated generally as 320. Container assembly 320 has a body that includes a first, or main, portion, 322, and a second part or portion, 324, that cooperates with first portion 322. Typically, the main portion or body 322 has a wall structure, or outer casing, 326 that defines an internal volume, or cavity or receptacle, identified as chamber, 328, however it may be termed, for receiving objects such as may be desired to be kept cool or warm. Second portion 324 may define a lid 330 that is hingedly mounted to first portion 322, lid 330 being movable between a closed position and an open position, thereby governing access to chamber 328. Container assembly 320 may be a lunch box, such as may frequently be used by children to take their lunches to school. Such a lunch box is not typically an overly large item like luggage for travelling abroad, but is rather a small, hand portable item. The largest dimension (in the x-direction) may be of the order of less than one foot (30 cm), the breadth (in the y-direction) may be of the order of 7 to 10 inches, and the depth in the through thickness (in the z-direction) may be less than the width.

Container assembly 320 may have insulated wall panels, namely a first panel identified as front panel 332, a second panel or rear panel identified as bottom panel 334, and a peripherally extending sidewall, or sidewall assembly 336. Front panel 332 may define lid 330. Typically, front panel 332 and rear panel 334 are substantially planar and may be square or rectangular (being longer in the x-direction than the y-direction). In the closed position of lid 330, front panel 332 and rear panel 334 may tend to lie in spaced-apart parallel planes.

Peripherally extending sidewall assembly 336 extends between, and joins, front panel 332 and rear panel 334. Peripherally extending sidewall assembly 336 may have four side wall portions such as may be identified as 338, 340, 342, and 344. These four sidewall portions may likewise be square, or rectangular, and stand away from panel 334, such that, in combination, items 332, 338, 340, 342 and 344 define five sides of an open topped box. Wall portions 338 and 340 may be designated as first and second opposed "long sides"; wall portions 342, 344 may be designated as first and second opposed "short sides". The choice of front and rear, left and right, is arbitrary.

For the purposes of this description the second long side wall portion 340 may be understood as the panel having an upper margin to which the lid defined by front panel 332 is attached, typically hingedly attached as by flexible fabric hinge 346, and first long side wall portion 338 is the panel opposed to, and distant therefrom. The lid defined by front panel 332 may be releasably secured to the upper margins of side wall portions 336, 340, 342 by a closure member 348, which may be in the nature of a tracked fastener, such as a zipper 350.

Although other embodiments can be made, container assembly 320 may have the general form of a six-sided box. A first lifting member, in the nature of a first carrying handle 352 may be mounted to the front face of the lid defined by front panel 332. A second lifting member, in the nature of a second carrying handle 354 may be mounted to the short end wall portion 344 of peripherally extending sidewall 336, which, in the context of being carried by handle may be designated the "top" of container assembly 320. Handle 354 may have a releasable clasp that permits handle 354 to be attached to other objects. Typically, when container assembly 320 is being carried by handle 352, or rested on its back as in use, front and rear (or bottom) panels 332, 334 may lie in x-y (i.e., horizontal) planes, and may lie in x-z (i.e., vertical) planes when container assembly 320 is carried by handle 354.

Side wall portions 338, 340, 342 and 344 may be made from a single piece of insulated material and may be formed of a continuous web, or webs, running around the side edges, or margins, of front panel 332 and rear panel 334, and may be fastened thereto by sewing, gluing or some other suitable fastening means.

In alternative embodiments, outer casing 326 may have either less than four, or more than four, predominantly upright panels (not shown). For example, outer casing 326 may be configured to have one continuous panel defining a round wall, thereby forming a right cylinder, or some other generally rounded shape.

Cross-sections of the structure are shown in FIGS. 11a and 11b in respective contracted or collapsed and expanded positions. The wall structure of rear or bottom wall or panel 334 and front panel 332 may include an outer covering 302, a layer of thermal insulation 304, and an inner skin or covering 306. Whether there is an inner skin or covering 306 or not, there may be an internal heat transfer barrier such as a radiation shield 308. Radiation shield 308 may be pliable, and may include a shiny, reflective material or coating. In one embodiment that flexible shiny material may be sold under the brand name "Thermaflect". Panels 332, 334 may have an externally accessible internal pouch, pocket, or retainer 356, which may have the form of netting or of a breathable fabric, or may be an impermeable sheet, like internal skin 76. Retainer 356 defines an accommodation 80 for receiving a thermal storage member 250. Container assembly 320 also has lifting fittings, such as D-rings 358 by which a shoulder strap may be attached such that container assembly 320 may be carried over the shoulder, or by which container assembly 320 may be attached to other objects. In addition, handle 352 may be mounted to the exterior face of the lid defined by front panel 332 as indicated.

As illustrated in FIGS. 10e and 10k, in moving between the expanded and contracted positions front wall panel 332 moves in linear translation in the z-direction relative to rear panel 334. Alternatively expressed, the z-direction is the direction normal to rear panel 334, where rear panel 334 and front panel 332 are both substantially planar and extend in respective x-y planes. The difference in overall height, or through-thickness, of the container compartment, chamber 328, is the difference between the overall through thickness of the unit expressed as $h_{20}$ in FIGS. 10k, and $h_{320}$ in FIG. 10e. The expanded thickness $h_{320}$ of container assembly 320 may be in the range of 3/2 to 5/2 $h_{320}$, and in one embodiment may be roughly double $h_{320}$, +/−20%.

Peripherally extending sidewall 336 may have a first portion 360 and a second portion 362. First portion 360 has a first margin 364 that is attached to the adjacent margin 366 of rear panel 334. First portion 360 extends away from margin 366 toward front panel 332, predominantly in the z-direction. First portion 360 may have an external skin 368, which may be made of a wear resistant material, such as nylon (t.m.) and may be a woven, wear-resistant nylon fabric. First portion 360 may also have an internal skin 370, and a layer of a thermal insulating material 372 such as a flexible foam. First portion 360 may terminate at a second margin 374, which may be an upper margin thereof distant from margin 366 of rear panel 334.

Second portion 362 has a first margin 376 that is attached to the adjacent margin 378 of front panel 332. Second portion 362 extends downwardly away from margin 378 toward rear panel 334, predominantly in the z-direction. Second portion 362 may have an external skin 380, which may be made of a wear resistant material, which may be nylon (t.m.) and which may be a woven, wear-resistant nylon fabric. Second portion 362 may also have an internal skin 382, and a layer of a heat flow resistant insulating material 384 such as a flexible foam mounted between external skin 380 and internal skin 382. Second portion 362 may terminate at a second margin 386, which may be a lower margin thereof distant from margin 378 of rear front panel 332. The joining of second portion 362 to front panel 332 may be by way of zipper 350 along three margins, and by hinge 346 along the fourth margin of front panel 332. The overall respective lengths of first portion 360 and second portion 362 in the z-direction may not be equal. In the embodiment illustrated, first portion 360 may be substantially longer in the z-direction than second portion 362.

Peripherally extending sidewall assembly 336 may include a securement 388 mounted releasably to retain second margin 386 of second portion 362 in its most proximate position to second margin 374 of first portion 360, as shown in FIGS. 10a-10h. Securement 388 may have the form of a tracked fastener 390 extending about the periphery of container assembly 320. In one embodiment the tracked fastener is a zipper 392. Tracked fastener 390 may include first and second mutually engaging fastener portions 394, 396. Fastener portions 394, 396 may be mating halves of a zipper. It may further include an engagement and disengagement actuator, such as zipper car 398 in the embodiment illustrated.

Tracked fastener first portion 394 may be mounted to second margin 374 of first portion 360, typically by being sewn thereto. Tracked fastener second portion 396 may be similarly mounted to second margin 386 of second portion 362. Tracked fastener 390 may have a first end 400 and a second end 402 distant therefrom. First end 400 may be designated as a permanently joined or permanently closed end. There is a transition section 408 commencing at first end 400, in which the zipper halves diverge from each other, transition section 408 ending where the zipper halves reach margins 374 and 386 respectively. There is then a full lap of zipper around the periphery after the end of transition section 408. First end 400 may be mounted to the expandable web portion of peripherally extending sidewall 336. When tracked fastener 390 is in the open condition, as in FIGS. 10i-10n, the actuator, zipper car 398, is closely adjacent to first end 400. When tracked fastener 390 is in the closed position of FIGS. 10a-10h, zipper car 398 is closely adjacent to second end 402. In the embodiment shown, tracked fastener 390 has a length that exceeds the total length of the periphery of container assembly 320 as measured around one lap, or cycle, or full turn, of peripheral sidewall 336. Thus in the process of closing the actuator, zipper car 398, moves through more than an entire lap of container assembly 420. When closed, tracked fastener 390 closes over itself, such that in the closed position first end 400 is concealed underneath, or inside of, that portion of tracked fastener 390 leading up to second end 402.

Peripherally extending sidewall assembly 336 also includes an intermediate portion, identified generally as 410. Intermediate portion 410 may be a continuous web, which may be a continuous nylon (t.m.) web that extends the full distance around the periphery of container assembly 320. A first margin 412 of portion 410 is permanently affixed to second margin 374 of first portion 360 of peripherally extending sidewall assembly 336, typically by sewing. Similarly, intermediate portion 410 has a second margin 414 attached permanently affixed to second margin 386 of second portion 362 of peripherally extending sidewall assembly 336. Portion 410 is flexible, such that it can fold or collapse from the extended, substantially straight and vertical position shown in FIG. 10b, to the folded or collapsed position shown in FIG. 10j.

Closed end 400 of tracked fastener 390 is mounted to intermediate portion 410 at a first location, indicated as 404, in the midst thereof. The branches of second end 402 are mounted, respectively, to margins 374 and 386 as indicated at locations 406 and 408 respectively. When the actuator follows tracked fastener 390 about container assembly 320, it draws portions 394 and 396 together, with intermediate portion 410 folded inwardly thereof.

Intermediate portion 410 may also include a heat transfer barrier 420, which may include a first heat transfer resistance or obstacle or layer 424 which may be a layer of insulative material, such as insulating foam layer 430; and a second heat transfer resistance or barrier in the form of a skin, or membrane or web (which may be applied to layer 424, or may be separate therefrom) with a radiative surface treatment such as may enhance its reflectivity, and hence its resistance to radiative heat transfer, identified as a radiation shield 422. Layer 430 is flexible, and can fold or collapse to permit container assembly 320 to move between the expanded and collapsed positions shown. Layer 430 may also be secured at the lip of the container assembly at 418, and may at the margin of rear panel 334 as well, as indicated at 416. The second wall defined by intermediate portion 410 lies inwardly of the wall defined by portion 336. Portion 410 is foldable, or collapsible such that when portion 336 folds, sidewall assembly 410 can also fold. Sidewall assembly 410 may be secured at the lip of the various sidewall portions, as indicated at 418.

Radiation shield 422 may also define the skin of the inner wall of container assembly 320, facing inwardly into chamber 328. Container assembly 320 may also have a further additional inner liner 432, lying inside of thermal barrier 420, such as a folded seamless liner, whether opaque or transparent. In the embodiment shown the radiation shield 422 surface of thermal barrier 420 is made of a metalicized plastic with a reflective surface, and performs both the function of a radiation shield and of the container inner wall surface layer or skin, and liner 432 is transparent. In some embodiments liner 432 may be removable, as for washing.

In either assembly 320 of FIGS. 10*a*-11*b*, or of assembly 290 of FIGS. 12*a*-12*e*, motion from the contracted position to the expanded position occurs in linear translation in the z-direction normal to the rear panel. As seen, there is a soft-sided insulated lunch box container having a front wall, an opposed back wall, and a peripheral sidewall wall extending between and connecting said front wall and said back wall. The front wall, back wall and peripheral sidewall cooperatively define a chamber within the container. The front wall is movable in a direction substantially normal to the back wall between a first position and a second position. The peripheral sidewall is expandable in the normal direction to permit the front wall to move between the first and second positions. The container has an expansion governor. The expansion governor has the form of a tracked fastener that extends more than a full cycle about the peripheral sidewall. A thermal barrier is mounted inwardly of the peripheral sidewall. The thermal barrier is deformable to accommodate movement of the front wall between the first and second positions.

The thermal barrier may include a radiation shield. The thermal barrier may include a pliable layer of thermal insulation. The thermal barrier may include both a radiation shield and a pliable layer of thermal insulation. The layer of thermal insulation may be located between the peripheral sidewall and the radiation shield, such that the radiation shield faces inwardly into the chamber. The tracked fastener may include a zipper. The zipper may have a first set of teeth mounted proximate to the first side wall, and a second set of teeth mounted more distant from the first side wall, such as to the margin adjoining the other side wall, and, when the zipper is zipped together, the peripheral sidewall is concealed from view by the zipper. The zipper has a first end and a second end. The zipper car moves away from the first end and toward the second end as the zipper is zipped up. When the zipper is zipped up, the first end of the zipper is concealed from view by the closure of the zipper itself. As noted, the zipper extends over more than the full periphery of the peripheral side wall such that, in closing, the zipper closes over itself. The layer of thermal insulation is located between the peripheral sidewall and the radiation shield, such that the radiation shield faces inwardly into the chamber.

In the embodiment of FIGS. 13*a*-13*k*, there is a soft-sided insulated container or container assembly, 440, that is substantially the same as soft-sided insulated container assembly 20, and has substantially the same features of construction, except insofar as container, or container assembly, 440 is a larger cooler, such as may be a "12-can" cooler as opposed to a lunch sack or lunch bag as in assembly 20. Accordingly, container assembly 440 may have different aspect ratios of height to width or length (i.e., z-dimension to x-dimension); and a different ratio of width (or length) to depth (i.e., x-dimension to y-dimension). Typical aspect ratios and dimensions may be roughly x:z:y of 12:10:6. Thermal storage elements 60 of assembly 440 may be correspondingly larger, too, and may also have a different aspect ratio reflecting a greater relative length for insertion into the longer internal slots of wall structure 442. Additionally, lid 34 may include an auxiliary retainer, such as an elastic strap 444. Handle 35 is replaced by a carrying strap or shoulder strap 446, and the end walls may include mesh pockets 448. As shown in the drawings, cooler assembly 440 is collapsible or foldable, and has retainers, or securements, in the form of straps 436 that engage mating members 434 located on rear wall panel 26.

In the embodiment of FIGS. 14*a*-14*h*, there is a soft-sided insulated container assembly that has the general form of a knapsack, or rucksack, or back-pack, or pack assembly 450. It is of substantially the same wall construction as described above. However, it has a wall structure 452 that has the form of a bag with a generally rounder-cornered form than the more rectangular containers described above. As with back packs generally, and unlike some of the embodiments described above, the major dimension of a knapsack tends to be its height, with a width that is typically ½ to ¾ of the height, and a depth in the direction perpendicular to the wearer's back that is typically ⅕ to ⅓ of the height of the pack. There is a base or bottom wall, or bottom panel 454. An upstanding wall structure is mounted about the periphery of bottom panel 454, and includes a back panel or back wall 456 that is worn against the user's back, there being associated left and right hand shoulder straps 458, 460 provided for this purpose. There are also left and right hand sidewalls or panels or members 462, 464, and a main or front panel 466, all of them being joined together at corner seams to define wall structure 452 more generally. The upper margins of walls or panels 456, 462, 464 and 466 define an opening 470 of the bag through which to place or retrieve objects held within the main internal cavity or chamber of pack assembly 450. As described above, the internal chamber may have a liner wall, such as may be water proof. Pack assembly 450 may have a closure member, or wing, or lid 468 connected at a hinge 472 to the upper margin of back panel 456, with the three remaining edges of the opening, and having a main closure, namely lid 468. Lid 468 is movable, and governs access to the interior of the bag. As indicated, the lid need not be flat, but could have a rearward (i.e., toward the rear as the wearer is walking forward) slope.

Pack assembly 450 also has a second access member, or members, 480. Although access member 480 could have individual segments corresponding to each of the sidewall panels 462, 464 and front wall panel 466, in the embodiment shown there is a closure member, that closure member being shown as a single tracked fastener, such as may be in the form of a zipper 478 that traverses sidewall panels 462, 464 and front wall panel 466. This tracked fastener may be spaced downwardly the main closure, i.e., zipper 474, of pack assembly 450. In the embodiment shown, it is spaced about ⅕ to ¼ of the way down the wall of the bag, and runs generally parallel to the zipper of the lid. It may bear a resemblance to a fish gill, and serve a similar purpose. That is, when open it gives access to accommodations such as internal slots 482, 484, 486 of the same general arrangement and construction as accommodations 80 in container assembly 20. However, as understood from the partially inserted condition of FIG. 14a, and from the phantom lines in FIGS. 14d and 14h, the direction of insertion is up-and-down, i.e., vertical rather than horizontal as in, for example, assemblies 20 and 440. That is, the thermal storage member 60 is still inserted side-ways in the slot, but the direction of insertion is up-and-down, rather than cross-wise. As in each of the foregoing examples, the slot is externally accessible, and when installed, the insulation of the wall lies outwardly of the largest face of thermal storage member 60. It may be noted that pack assembly need not have a thermal storage element in wall 456 that bears against the back of the wearer.

Pack assembly 450 may also have a bottom wall thermal storage accommodation, as indicated at 490, governed by a closure member such as laterally running zipper 492. The direction of insertion in this case is front-to-back. Finally, pack assembly 450 may include side mesh pockets 494, 496, and a main wall elastic strap 498.

A further alternate container assembly 500 is shown in FIGS. 15a-15j and 16a-16c. In this embodiment container assembly 500 has a wall structure 502 that includes base or bottom wall or wall panel 504 and an upstanding peripheral sidewall 506 that extends upwardly from bottom wall panel 504. An internal chamber 510 is defined inside wall structure 502. The assembly has top wall or top panel 508 that defines a closure member movable to govern access to internal chamber 510. The upstanding peripheral wall of wall structure 502 generally has a front wall panel 512, a rear wall panel 514, a left end portion 516 and a right end portion 518. It may be noted that end portions 516 and 518 are rounded, such that, in cross-section, the unit has an oval shape. In one embodiment that oval shape is cylindrical. The assembly may also have lifting straps or handles 520. Wall structure 502 may be a soft-sided insulated wall structure, of the same general construction as described above. The embodiment shown is not intended to be foldable or collapsible or expandable.

Wall structure 502 may be substantially the same as described above, in respect of having internal pockets, or pouches, or accommodations 522, 524, 526 in which to install removable thermal storage elements, shown as gel packs 530, 532. A layer of insulation 528 is mounted outboard of accommodations 522, 524, 526 and inside of the external covering fabric 534; or, alternatively expressed, when installed, gel packs 530, 532 (and such others as may be), lie inboard of insulation 528. As before, the inside liner, or wall, or membrane 540 lies between the gel packs and objects located in chamber 510. The internal liner segregates the objects in chamber 510 from contact by the gel packs, and permits food to be placed in chamber 510 beforehand, for assembly 500 to be kept in the refrigerator overnight (as may be) and for the frozen gel packs to be put in place just before setting out on an outing. As above, membrane 540 may be waterproof, and may be moderately robust to resists wear. In one embodiment, assembly 500 may include an internal partition, or divider or divider array, shown generally as 536. In one embodiment array 536 may include a wall of insulation 538.

As previously, access to internal thermal storage accommodations 522, 524, 526 is governed by external closure members, such as slots 542, 544 that are opened and closed with zippers (or other tracked fasteners or releasable strips, as may be). While accommodations 522 and 524 are located at the respective opposite rounded ends of assembly 500, it may be that accommodation 526 may be located in front wall panel 512 between the straps of handles 520.

A noted, unlike the accommodations described above, accommodations 522, 524 may not be substantially planar, but may instead be non-planar. They may be formed on a curve, or curved surface, such as to conform to the substantially circular end arcs of left and right hand end walls, as at 546, 548.

It may also be noted that accommodations 522, 524 are remote from each other, in that they are located at opposite ends of the enclosed area. It may be that internal partition array 536 may be movable within chamber 510 such that the relative proportions of the spaces 550, 552 between the ends to either side of insulated wall 538 may be changed. For example, they may be equal, or ⅓:⅔, or ¾:¼. The divider or partition array 536 may include a central space or sub-compartment 554. Divider or partition array 536 might also be held in fixed position, e.g., by being sewn into position at the upper seam of liner membrane 540. Alternatively there may be an adjustable releasable position securement along, or just below, that seam, such as in the form of hook-and-eye mating fabric strips.

Where wall of insulation 538 is used, sub-compartment spaces 550 and 552 may be kept at different temperatures or different thermal conditions. That is, one may wish to keep space 550 cool, or cold, perhaps as suitable for a bottle of white wine, or cheeses, or cold cuts, or fresh fruit. At the same time one may wish to keep space 552 warm, as suitable for a flask of warm soup. Sub-compartment 554 may contain bread, or crackers, such other items as may be. Alternatively, space 552 may be neither chilled nor warmed, as may be suitable for a red wine. The arrangement of container assembly 500 permits different temperature options to be considered by the user. The semi-cylindrical wall form may be well suited to liquid containers, such as, for example, wine bottles.

Figure 16C:
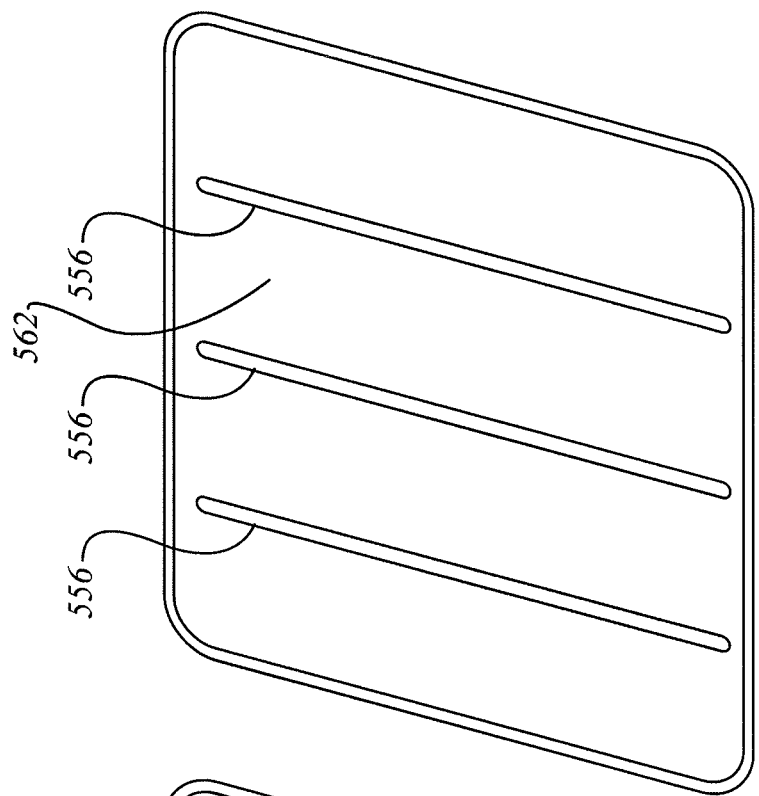
Figure 16B:
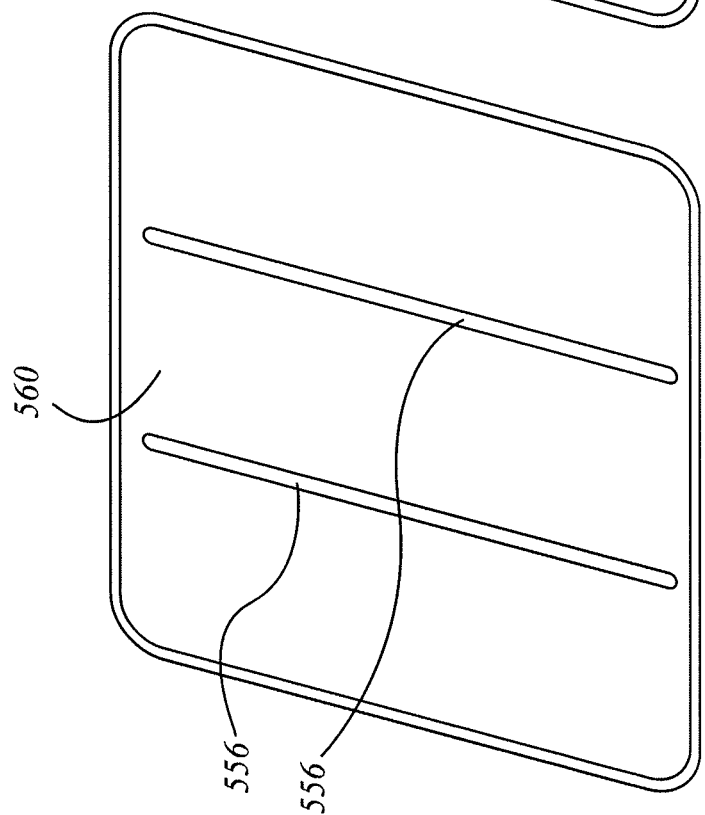

Considering then gel packs 530, 532 of FIG. 15c, and FIG. 16a, these packs may have a primary fold, or hinge, as at the relieved mid portion, at 556. It may also be that the gel in the packs is itself in an array of spherical balls, or pea packs, such that even when hard frozen, the overall assembly may retain an ability to flex and follow the contour of accommodation 522 or 524. Alternatively, three-segment gel packs 560 of FIG. 16b, or four-segment gel packs 562 of FIG. 16c may be used where a larger number of segments may be desired to approximate the curved accommodation. In each case the hinge elements at 556 provide articulation between the segments, such that the articulated unit can bend.

In FIGS. 15a-15j, the soft-sided insulated container has an internal chamber in which to place objects. It has a wall structure that has externally accessible accommodations in which to receive thermal storage elements. The accommodations are non-planar, and define a path or track into which the thermal storage members move by translation. The paths so defined are not straight, but rather are curved. The thermal storage members are flexible, or bendable, to permit them to bend to follow the path. In one form, that flexibility is provided by employing segmented thermal storage members that can bend as they follow the arcuate path. In the bendable thermal storage members the span of the element is not planar, but rather follows the arc-length of the path, measured across the various segments.

In FIGS. 17a to 19f, a soft-sided insulated container assembly is shown generally as 600. It has a first, front, or top wall, or top wall panel 602, a second, back, or bottom wall, or bottom wall panel 604, and an upstanding peripheral sidewall 606. The structure of walls 602, 604, and 606 may be substantially the same, or the same, as described above. That is to say, each may have an inner layer or web or membrane; an outer layer or web or membrane; and a layer of insulation located between the inner and outer layers in the manner of the structure shown in FIG. 3b, FIG. 11a, or FIG. 11b. As in the embodiments described above, the insulation is captured between the inner and outer layers or webs or membranes, and an accommodation for a thermal gel pack is defined between the insulation and the inner layer or web or membrane, as described above. Soft-sided insulated container assembly 600 may be generally box-shaped. That is, peripheral sidewall 606 may be four-sided, corresponding to a rectangular four sided box having a pair of short walls identified as left and right hand walls or wall panels 610, 612 and a pair of long walls identified as front and back walls or front and back wall panels 614, 616.

Figure 17A:
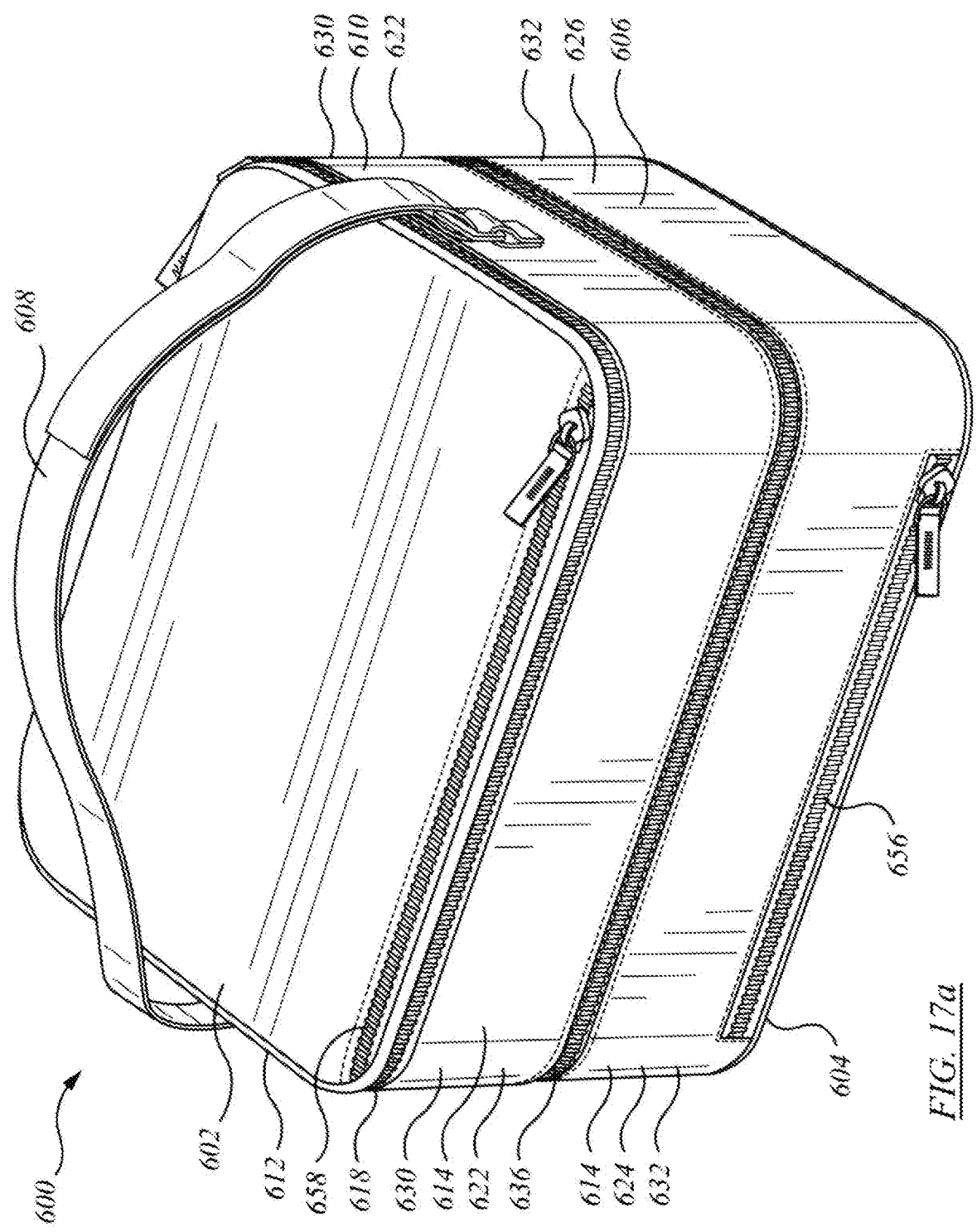
FIG. 17a shows a perspective view of an alternate embodiment of soft-sided insulated container to that of FIGS. 10a to 10n in a closed position.
Figure 17B:
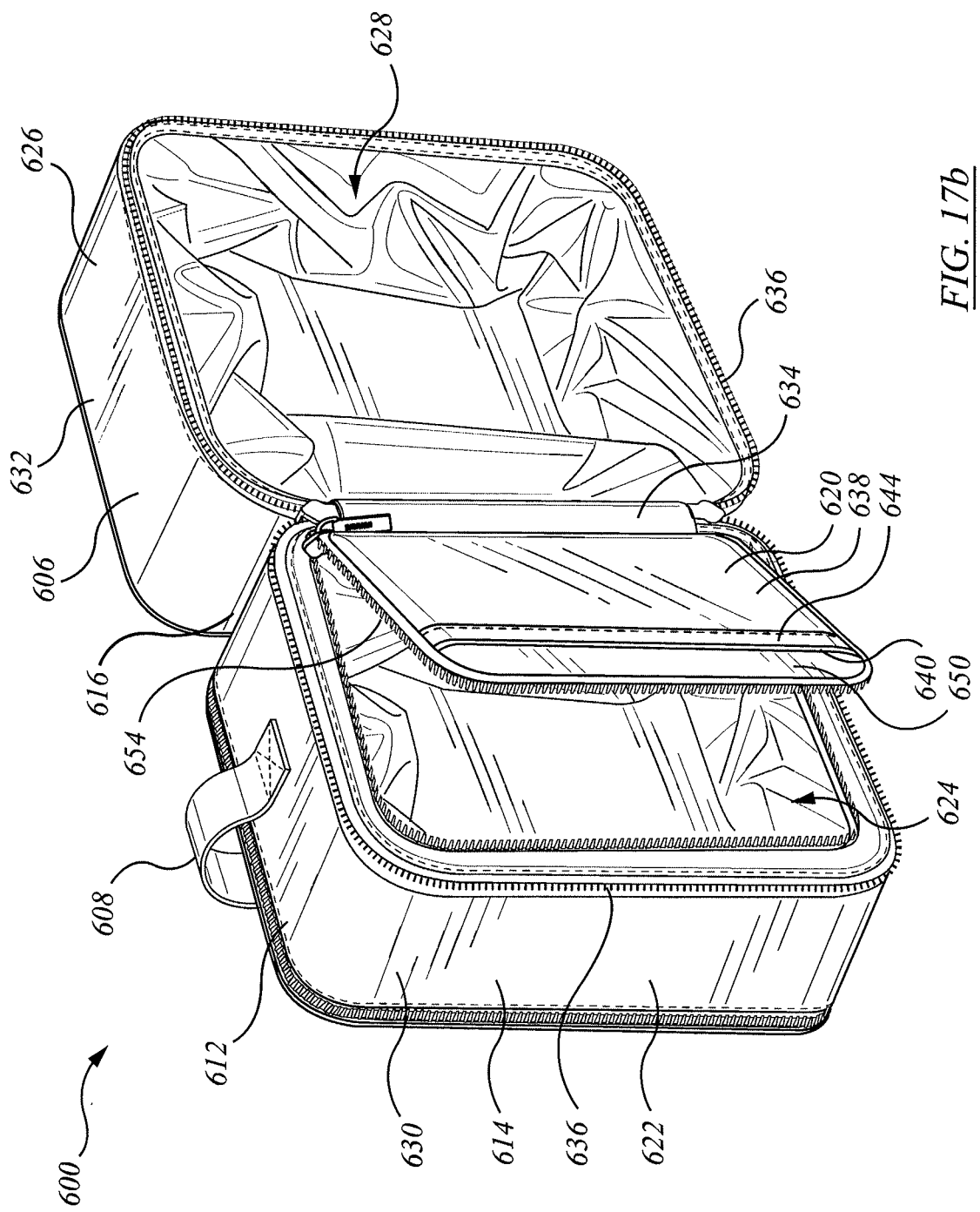
FIG. 17b shows a perspective view of the container of FIG. 17a in a partially open condition.
Figure 17C:
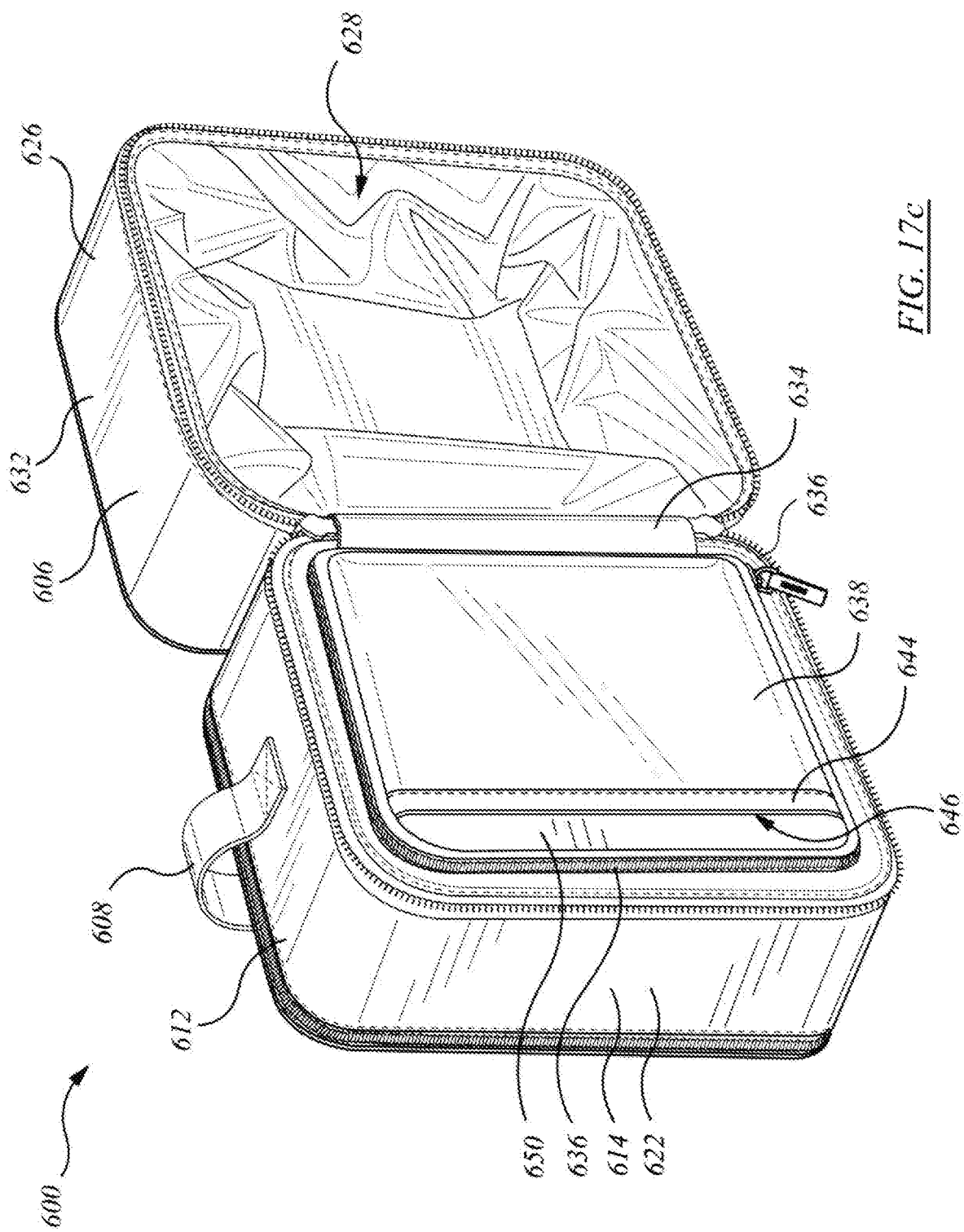
FIG. 17c shows a perspective view of the container of FIG. 17a in a fully open condition in which a first container portion and a second container portion are side by side.

Soft-sided insulated container assembly 600 may also have an internal partition 620, as seen in FIGS. 17b and 17c. Internal partition 620 may be generally planar and may be located spaced apart from and intermediate to top wall panel 602 and bottom wall panel 604, which may also be generally planar, such that the internal volume of container assembly 600 is divided into a first container portion 622 having a first internal chamber 624; and a second container portion 626 having a second internal chamber 628. In the orientation of FIG. 17a, first internal chamber 624 sits above second internal chamber 628, the one chamber being stacked upon the other.

Peripheral sidewall 606 has a first or upper portion 630 and a second or lower portion 632. Upper portion 630 is hingedly connected to lower portion 632 along a hinge 634 in one of the long portions of peripheral sidewall 606, such as in long wall 616. A closure, or closure member, 636 is releasable to permit first container portion 622 to move between a first position and a second position relative to second container portion 626. Closure 636 may be a tracked fastener such as a zipper that runs around the three remaining sides of peripheral side wall 606 opposite hinge 634. Hinge 634 effectively divides the rear wall, or rear long side 616 of peripheral insulated side wall 606 into upper and lower portions. Similarly, closure 636 divides the short side walls 610, 612 and front wall panel 614 into upper and lower portions as seen in FIG. 17a.

In this configuration, the first panel, identified as top wall panel 602 may also include or define or function as the lid of upper portion 622, being movable between open and closed positions to govern access to upper chamber 624. Top wall panel 602 is hinged along its margin with rear or back wall panel 616, and has a tracked closure member, such as a zipper 618, that runs along the remaining three edges of peripheral side wall 606, as seen in FIG. 17c.

The internal wall, or divider, or panel, identified as internal partition 620 cooperates with upper portion 630 of peripheral side wall 606, and with top wall panel 602 to define the soft-sided insulated wall structure of first container portion 622. Lower portion 632 of peripheral sidewall 606 and bottom wall panel, 604 cooperate to define the soft-sided insulated wall structure of second container portion 626. In this example, the lid of second container portion 626 may be defined by internal partition 620, or in a larger sense, by first container portion 622, to the extent that movement of first container portion 622 between a first, or closed, position, (as shown in FIG. 17a) and a second or open position (as shown in FIG. 17c) governs access to second chamber 628.

Figure 18A:
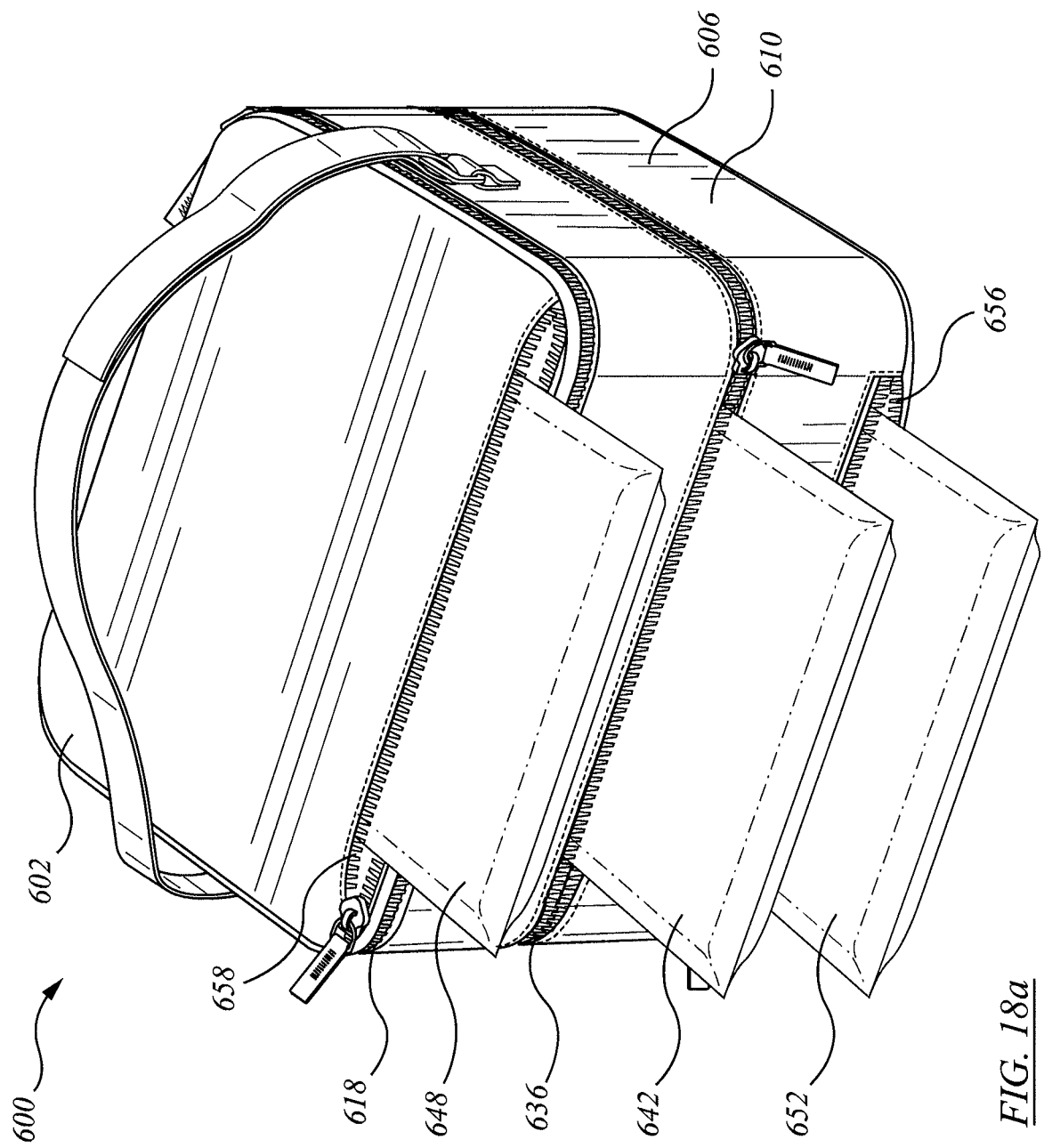
Figure 18B:
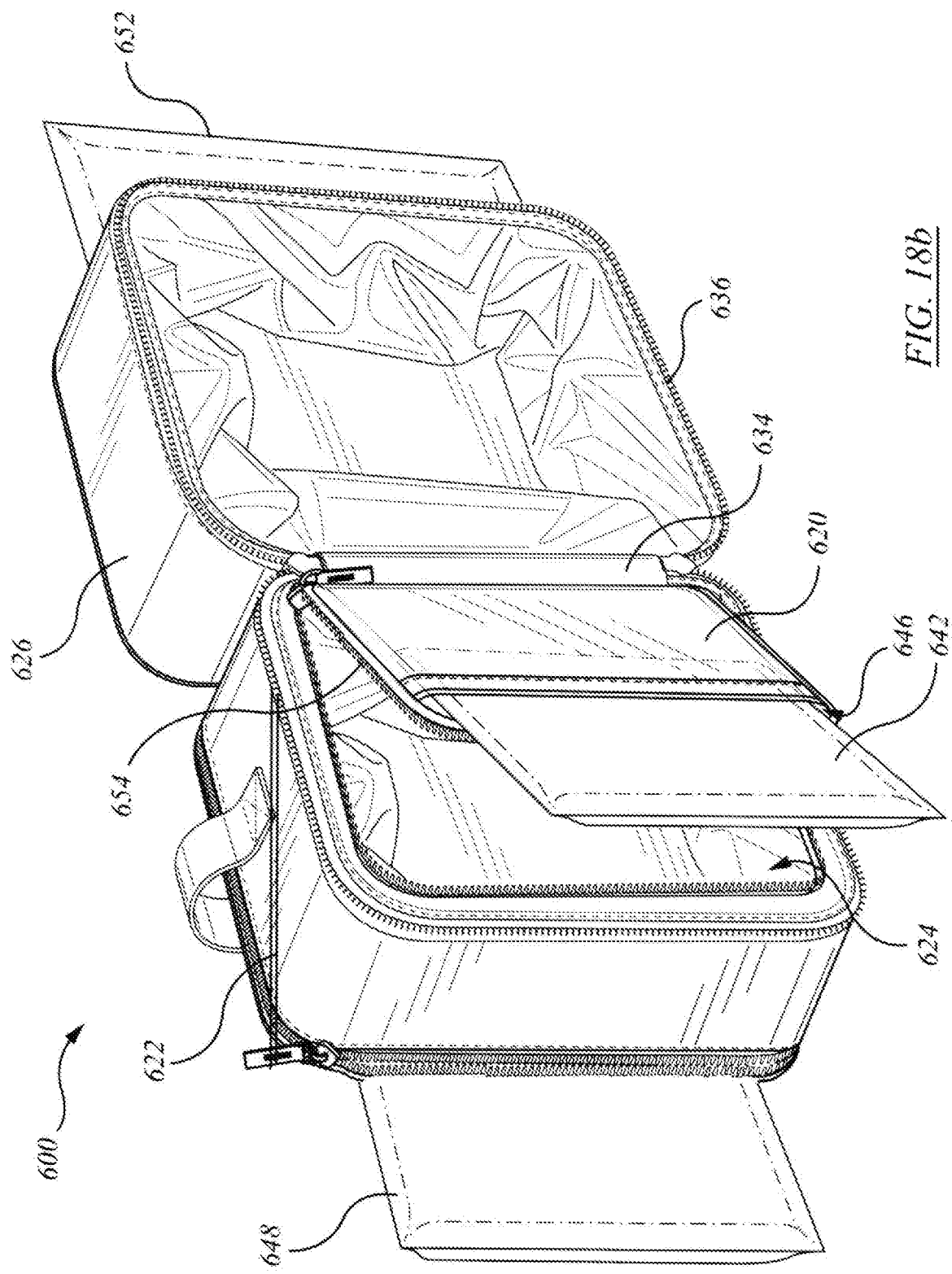
FIG. 18b shows sideways insertion of a thermal storage gel pack member into a slot in a partition of the container of FIG. 17b.
Figure 18C:
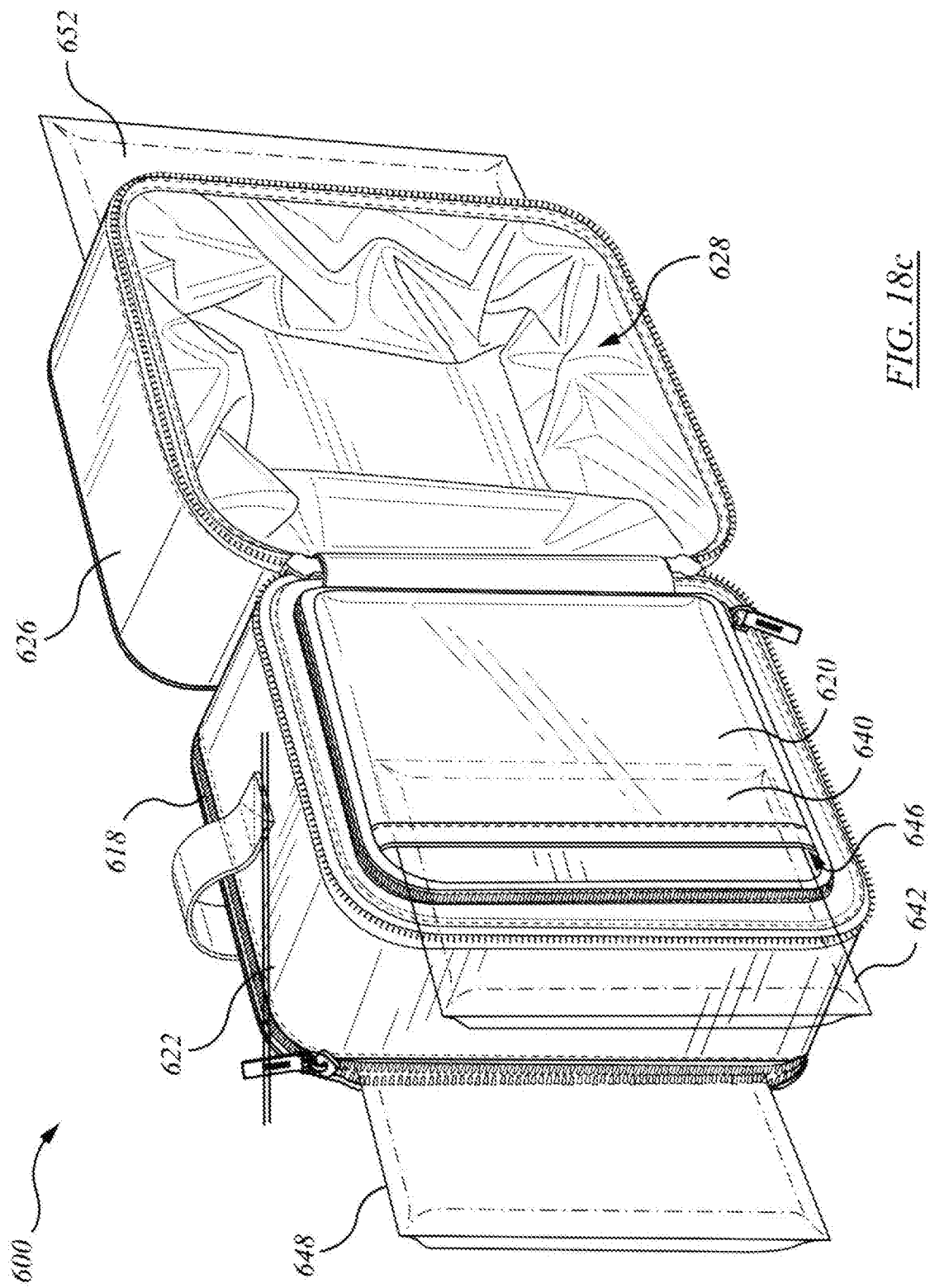
FIG. 18c shows sideways insertion of a thermal storage gel pack into an externally accessible slot in the bottom wall panel of the container of FIG. 17c.
Figure 19D:
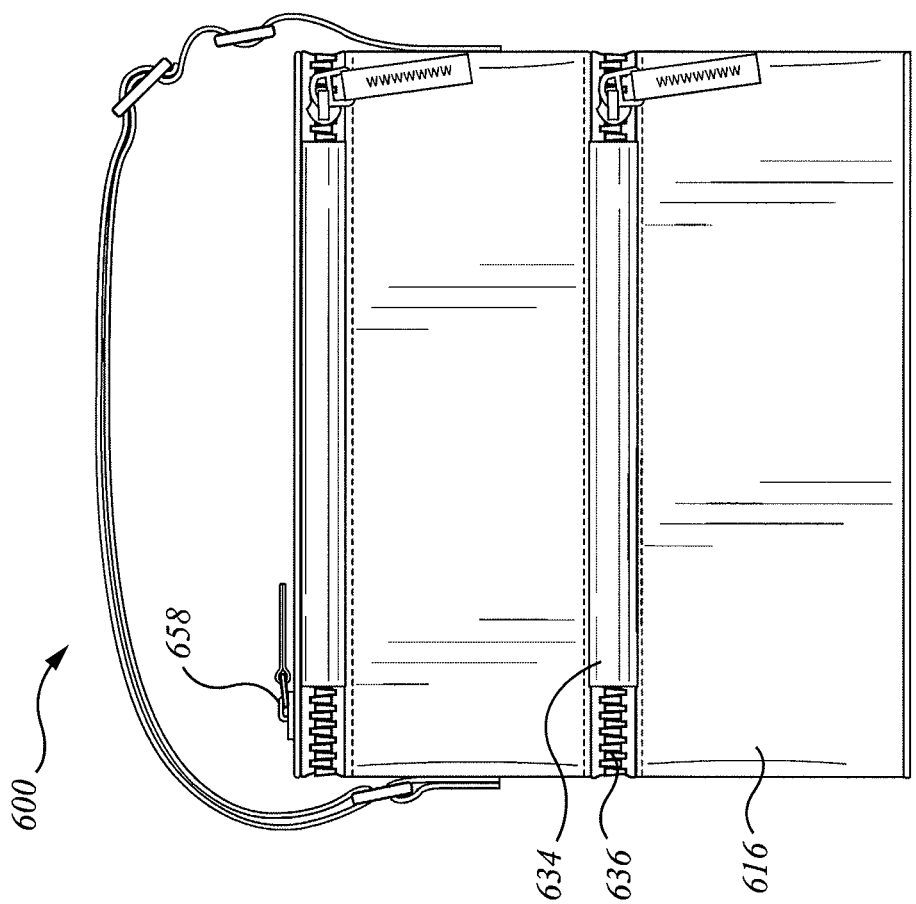
Figure 19C:
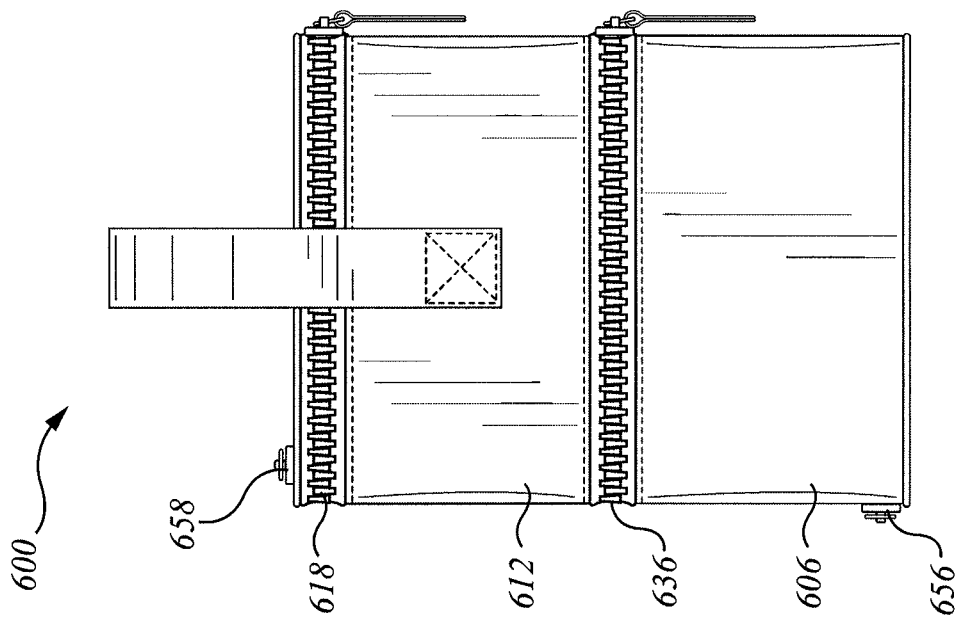
Figure 19E:
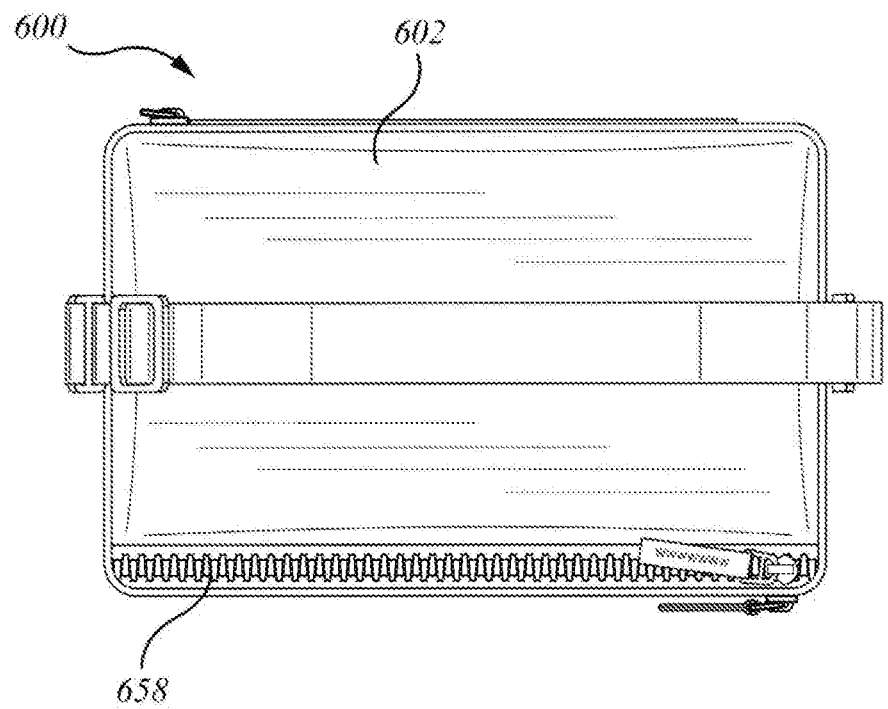
Figure 19F:
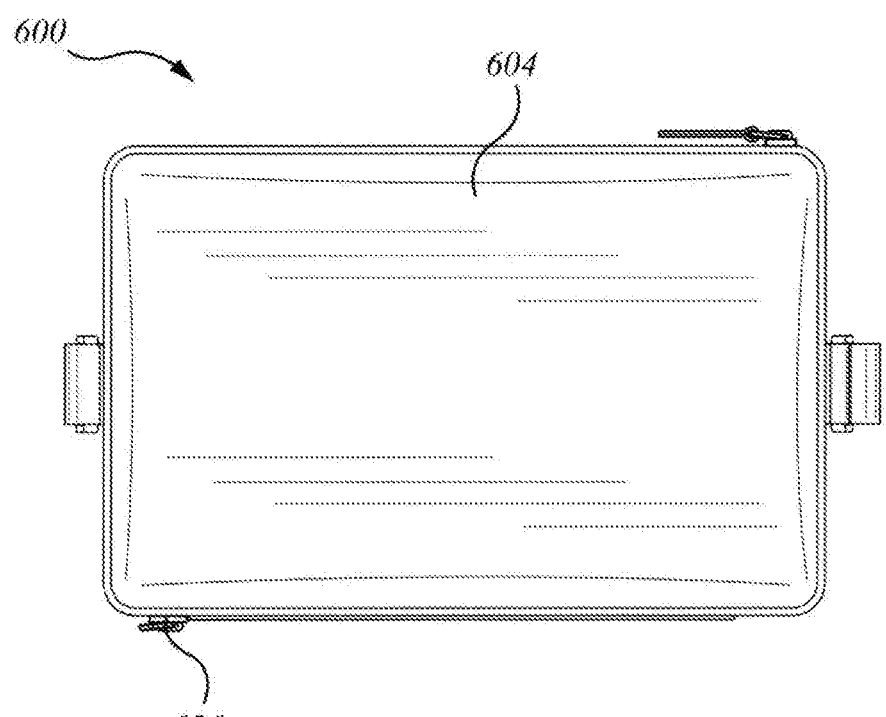

As seen in FIGS. 17b and 17c, when the first container portion 622 is moved to the open position relative to second container portion 626 the underside of internal partition 620 is exposed. A web 638 is attached to the underside of partition 620 to form a pocket or pouch or accommodation 640. Accommodation 640 is sized to receive a thermal storage member such as gel pack 642 (As shown in FIG. 18a). The opening of accommodation 640 may be at a free edge or lip 644 that runs along a margin or edge of partition 620 that is distant from hinge 634. Thus when closure 636 is opened along the front edge of container assembly 600, access is provided slidingly to introduce gel pack 642 into the slot 646 defined between lip 644 and partition 620. Internal partition 620 need not be an insulated panel. In an embodiment in which partition 620 is not insulated, a gel pack lodged in the slot of accommodation 640 will serve to provide cooling in both the first, or upper, internal chamber 624 and the lower chamber 628. In the embodiment shown gel pack 642 can be installed without opening upper chamber 624. Internal partition 620 has a layer, or web, or membrane 650 that bounds the upper side of the slot of accommodation 640 and that separates upper chamber 624 from accommodation 640.

As in the embodiment of FIGS. 10a to 10i, the first, front, top wall, or top panel 602 has an accommodation, like accommodation 80, formed therein for a thermal storage member such as gel pack 648. Access to the accommodation is governed by a first thermal storage accommodation access slot closure 658 (shown in FIGS. 17a and 18a) which may be substantially the same as slot closure 244. Similarly the second, back, or bottom wall, or bottom wall panel 604 has an accommodation for a thermal storage member, such as gel pack 652. Access to this accommodation may be governed by a second thermal storage accommodation access slot closure 656 formed in front wall panel 614 as seen in FIGS. 17a and 18a. In an alternate embodiment, the accommodation access may be provided in bottom wall panel 604 in the manner of closure member 246 of lunch box 220 of FIGS. 10a-10i. These accommodations and slot closures may have the same structure and arrangement as the embodiments of FIGS. 10a, 11a, 11b and 12a, as described above. Thus, soft-sided container assembly 600 has (a) a first gel pack slot in the first wall panel, 602, governed by slot closure 658; (b) a second gel pack slot in the second, or bottom, wall panel 604, governed by slot closure 656; and (c) a third gel pack slot 646 in internal partition 620, by which access is obtained to accommodation 640, that access to accommodation 640 being governed by the position of closure 636. As described above in the context of other embodiments, the first and second gel pack slots in panels 602 and 604 are externally accessible, independently of whether the main closure members (i.e., closure members 618 and 636) of the respective upper chamber 624 and lower chamber 628 are open or closed.

Partition 620 may be secured along a first edge to upstanding peripheral sidewall 606 on the inside of hinge 634. Partition 620 may also be secured along an opposite edge to the lower distal margin of first or upper portion 630 of upstanding peripheral sidewall 606, such that partition 620 over spans second internal chamber 628. Alternatively or additionally partition 620 may be secured along the lower margins of the short sides of first or upper portion 630 of upstanding peripheral sidewall 606, again so that it is suspended over internal chamber 628. Where partition 620 is secured along all four sides, it forms a continuous and closing bottom panel of first or upper container portion 622. As noted above, closure member 636 runs along the edges where upper partition 620 meets the lowermost margin of first or upper portion 630 of upstanding peripheral sidewall 606 away from hinge 634, such that second internal chamber 628 can be opened and closed without changing the relationship of partition 620 to upper chamber 624. That is, the opening and closing of second internal chamber 628 is independent of the opening and closing of first internal chamber 624.

As shown in FIG. 17c, container assembly 600 is movable to a fully open position in which the lid, or top wall panel 602 of first container portion 622 lies flat on the ground next to bottom wall panel 604 with hinge 634 having been folded 180°. In this orientation, what had formerly been the bottom of partition 620 now faces upward. It may be that a person using container assembly 600 may then wish to obtain access not only to second internal chamber 628, but also to first internal chamber 624. To that end, partition 620 includes a further closure member 654. Closure member 654 may have the form of a three-sided tracked fastener such as a zipper that runs around the margins of membrane 650 of partition 620 inside closure member 636 with the fourth side of partition 620 remaining attached to hinge 634. In the inverted position of first internal chamber 624, closure member 654 may be released to permit the inset portion of partition 620 to be opened relative to first internal chamber 624. The pouch or pocket of accommodation 640 remains attached to the inset portion of membrane 650 that is then movable between open and closed positions. The third gel pack, 652, may be inserted or removed whether partition 620 is in the open or closed position relative to first internal chamber 624.

As can be seen, first internal chamber 624 can then be opened whether it is in the orientation of FIG. 17a, as by opening the lid defined by top panel 602; or in the inverted orientation of FIG. 17c, as by opening the inset portion of partition 620, which by the process of inverting first internal chamber 624 has been become the lid in place of top wall panel 602. In some instances, as where a larger object is to be placed within container assembly 600, closure member 654 may be opened and partition 620 positioned in a non-obstructing condition or position, without a gel pack disk installed in accommodation 640. Thus, with closure 636 in the closed position, securing first chamber portion 624 to second chamber portion 628 thereby forms a larger combined internal volume.

Various thermal storage elements 60, 170, 250, are shown in FIGS. 7a-7c, 8a-8c, 9a-9c, 16a-16c, and 19a-19f whether folding or rigid, which may be used in the several embodiments described above, as may be suitable. In each case the thermal storage element may have a welded plastic hinge folding line, or lines, or not, as may be suitable. Typically, when the gel is not frozen, the ice pack itself may tend to be amorphous, or floppy. In some embodiments the outside wall of the ice pack (or warming element, as may be) may itself be made of a thicker, stiffer plastic sheet that is substantially rigid, whatever the state of the cooling or heating composition may be, so that the ice pack (or warming pack) may tend to retain its substantially planar, predominantly disk-like shape. Of course, where a substantially rigid panel is used to establish the general shape of the element, that rigid panel need not necessarily be planar, but could be formed as a non-planar surface, such as, for example, a cylindrical arc.

This specification incorporates by reference the specification and drawings of U.S. patent application Ser. No. 15/091,189 filed Apr. 5, 2016. The features of the various embodiments herein may be mixed and matched as may be appropriate without the need for further description of all possible variations, combinations, and permutations of those features, including any permutations or combinations of claim features, or portion of claim features, found in any claim.

The principles of the present invention are not limited to these specific examples which are given by way of illustration. It is possible to make other embodiments that employ the principles of the invention and that fall within its spirit and scope of the invention. Since changes in and or additions to the above-described embodiments may be made without departing from the nature, spirit or scope of the invention, the invention is not to be limited to those details, but only by the appended claims.

We claim:

1. A soft-sided insulated container assembly comprising:
a soft-sided insulated wall structure having a top wall panel, a bottom wall panel, and a peripheral sidewall extending between said bottom wall panel and said top wall panel;
said soft-sided insulated wall structure having an internal chamber in which to place objects, said top wall panel and said bottom wall panel defining respective sides of said internal chamber;
said peripheral sidewall having a first margin attached to said bottom wall panel;
said peripheral sidewall having a second margin distant from said first margin;
said top wall panel being to said second margin of said peripheral sidewall;
said top wall panel defining a lid that is movable between a closed position and an open position to govern access to said chamber and having a releasable closure by which said top wall is secured in said closed position;
said top wall panel having an inner membrane and insulation of said top wall panel outside said inner membrane of said top wall panel;
said bottom wall panel having an inner membrane and insulation of said bottom wall panel outside said inner membrane of said bottom wall panel;
a partition located intermediate said top wall panel and said bottom wall panel, said partition being located within said internal chamber of said soft-sided insulated container assembly;
said top wall panel having a first slot formed within said top wall panel between said inner membrane and said insulation of said top wall panel, said first slot defining a first accommodation between said inner membrane and said insulation that is segregated from said internal chamber by said inner membrane, said first slot being externally accessible through an outside face of said top wall when said top wall is secured in said closed position thereof and said internal chamber of said insulated container assembly is closed;
said bottom wall panel having a second slot formed within said bottom wall panel between said inner membrane and said insulation of said bottom wall panel, said second slot defining a second accommodation between said inner membrane and said insulation that is segregated from said internal chamber by said inner membrane, said second slot being externally accessible when said internal chamber of said insulated container assembly is closed;

said partition having a third slot formed therein; and at least a first thermal storage member, said first thermal storage member being sideways slidable into at least one said first slot, said second slot, and said third slot.

2. The soft-sided insulated container assembly of claim 1, wherein:

said internal chamber of said container assembly includes a first chamber portion and a second chamber portion, said partition dividing said first chamber portion from said second chamber portion;

said top wall panel defines a top wall panel of said first chamber portion;

said partition defines a bottom wall panel of said first chamber portion; and said first slot of said top wall panel is externally accessible when said first chamber portion is closed.

3. The soft-sided insulated container assembly of claim 1 wherein:

said internal chamber of said container assembly includes a first chamber portion and a second chamber portion, said partition dividing said first chamber portion from said second chamber portion;

said top wall panel defines a top wall panel of said first chamber portion;

said bottom wall panel defines a bottom wall panel of said second chamber portion;

said partition defines a bottom wall panel of said first chamber portion and a top wall panel of said second chamber portion;

said first slot of said top wall panel is externally accessible when said first chamber portion is closed; and said second slot of said second chamber portion is externally accessible when said second chamber portion is closed.

4. The soft-sided insulated container assembly of claim 1 wherein:

said internal chamber of said container assembly includes a first chamber portion and a second chamber portion, said partition dividing said first chamber portion from said second chamber portion;

said peripheral wall has a closure intermediate said top wall panel and said bottom wall panel, and said peripheral wall is hinged;

when said peripheral wall closure is open said first chamber portion is movable relative to said second chamber portion between a first position and a second position;

in said first position of said first chamber portion access to said second chamber portion is obstructed;

in said second position of said first chamber portion access to said second chamber portion is open;

in said second position of said first chamber portion said third slot is accessible.

5. The soft-sided insulated container assembly of claim 1 wherein:

said internal chamber of said container assembly includes a first chamber portion and a second chamber portion, said partition dividing said first chamber portion from said second chamber portion;

said soft-sided insulated peripheral wall has an upper portion and a lower portion;

said partition defines a bottom wall panel of said first chamber portion;

said partition, said upper portion of said soft-sided insulated peripheral wall and said top panel cooperated to define a first six sided box;

said top wall panel defines a lid of said first six sided box, said lid being movable between an open position and a closed position relative to said upper portion of said soft-sided insulated peripheral wall to govern access to said first chamber portion;

said first six sided box being movable between an open position and a closed position relative to said lower portion of said soft-sided insulated peripheral wall to govern access to said second chamber portion.

6. The soft-sided insulated container assembly of claim 5 wherein said third slot is defined on an underside of said partition.

7. The soft-sided insulated container assembly of claim 5 wherein said upper portion of said soft-sided insulated peripheral wall is hingedly mounted to said lower portion of said soft-sided insulated peripheral wall.

8. The soft-sided insulated container assembly of claim 5 wherein said first thermal storage member is sideways slidable into said first slot; and said soft-sided insulated container assembly includes a second thermal storage member that is sideways slidable into said second slot of said bottom wall panel, and a third thermal storage member that is sideways slidable into said third slot.

9. The soft-sided insulated container assembly of claim 1 wherein said first thermal storage member is a rectangular sided gel pack.

10. The soft-sided insulated container assembly of claim 5 wherein said first chamber portion and said second chamber portion are the same size.

11. The soft-sided insulated container assembly of claim 1 wherein:

said soft-sided insulated peripheral wall has an upper portion and a lower portion, said upper portion being hingedly movable relative to said lower portion;

said container assembly includes a first chamber portion and a second chamber portion, said partition dividing said first chamber portion from said second chamber portion;

said partition, said upper portion of said soft-sided insulated peripheral wall and said top wall panel cooperating to define said first chamber portion;

said lower portion of said soft-sided insulated peripheral wall and said bottom wall panel cooperating to define said second chamber portion;

said first chamber portion being movable to govern access to said second chamber portion;

said partition being movable between an open position and a closed position relative to said first chamber portion.

12. The soft-sided insulated container assembly of claim 11 wherein:

said top wall of said first chamber portion is movable between an open position and a closed position relative to said first chamber portion;

when said first chamber portion is in a closed position relative to said second chamber portion said first chamber portion is accessible by opening said top wall; and when said first chamber portion is moved to an open position relative to said second chamber portion said first chamber portion is accessible by opening said partition.

13. A soft-sided insulated container assembly comprising:
a soft-sided insulated wall structure having a top wall panel, a bottom wall panel and a peripheral side-wall extending between said top wall panel and said bottom wall panel, said top wall panel, said bottom wall panel and said peripheral side-wall cooperating to define an insulated chamber therewithin in which to place objects;
said peripheral sidewall having a first margin attached to said bottom wall panel;
said peripheral sidewall having a second margin distant from said first margin;
said top wall panel being to said second margin of said peripheral sidewall;
said top wall panel defining a lid that is movable between a closed position and an open position to govern access to said insulated chamber and having a releasable closure by which said top wall is secured in said closed position;
each of said top wall panel, bottom wall panel and peripheral sidewall having a respective outer membrane, inner membrane and layer of insulation trapped between said inner and outer membranes;
an internal partition located within said soft-sided insulated wall structure intermediate said top wall panel and said bottom wall panel, said internal partition dividing said chamber into a first chamber portion and a second chamber portion;
said first chamber portion being located between said top wall panel and said internal partition, and said second chamber portion being located between said bottom wall panel and said partition;
said top wall panel being hingedly mounted to said peripheral side-wall at a chamber closure, said top wall panel being movable when said chamber closure moves between a closed position and an open position to govern access to said insulated chamber;
at least one of said top wall panel and said bottom wall panel of said container assembly having at least a first accommodation located therewithin between said respective inner membrane and layer of insulation, said first accommodation being segregated from said insulated chamber by said respective inner membrane; and said first accommodation having and at least an externally-accessible first gel pack slot through which to seat a removable first gel pack into said first accommodation in a position to exchange heat with a respective one of (a) said first chamber portion and (b) said second chamber portion of said insulated chamber, external access to said first gel pack slot being independent of access to said respective one of (a) said first chamber portion and (b) said second chamber portion of said insulated chamber.

14. The soft-sided insulated container assembly of claim 13 wherein said soft-sided insulated wall structure has an inner layer and an outer layer, said inner layer being a membrane, and said outer layer including a layer of thermal insulation; and said first accommodation being located between said inner layer and said layer of thermal insulation.

15. The soft-sided insulated container assembly of claim 13 wherein when said first gel pack is in said first accommodation of said wall structure, said first gel pack exchanges heat with said chamber through said inner membrane.

16. The soft-sided insulated container assembly of claim 13 wherein said wall structure includes a heat transfer interface member defining a common wall of said chamber and said first accommodation; and said first accommodation is segregated from said chamber by said common wall.

17. The soft-sided insulated container assembly of claim 13 wherein said soft-sided insulated container assembly includes at least the first gel pack and said first gel pack slot; said first gel pack has a large face that faces the chamber; and said first gel pack has a small face that permits said first gel pack to slip through said first gel pack slot into said first accommodation.

18. The soft-sided insulated container assembly of claim 13 wherein:
said first gel pack has a span, a width, and a through-thickness, said through-thickness being smaller than each of said span and said width;
said first gel pack has a heat transfer interface defined by said span and said width; said accommodation having a face against which said heat transfer interface is opposed, thereby to engage in heat transfer with said chamber; and
said first gel pack slot, when open, defines an opening in an outside surface of said insulated wall structure to accommodate a face of said first gel pack defined by said through-thickness and one of (a) said span and (b) said width of said first gel pack; and
said first gel pack being slidable through said first gel pack slot to seat in said first accommodation.

19. The soft-sided insulated container assembly of claim 13 wherein at least one of said top wall panel and aid bottom wall panel of said soft-sided insulated container assembly is a first, substantially flat panel; said first gel pack slot is formed in said substantially flat panel; and said first gel pack slot has an opening running along an edge of said substantially flat panel to permit said first gel pack to be moved through said first gel pack slot in a transverse manner relative to said substantially flat panel, whereby said gel pack slot is a side-entry gel pack slot; said soft-sided insulated container assembly includes at least the first thermal storage gel pack; said first gel pack has a large face that, when installed in said first accommodation, faces the insulated chamber; and said first gel pack has a small face that permits said first gel pack to slip through said first gel pack slot.

20. The soft-sided insulated container assembly of claim 13 wherein said first accommodation is formed in said bottom wall panel.

21. The soft-sided insulated container assembly of claim 13 wherein: said soft-sided insulated container assembly includes at least a second accommodation; and said first accommodation and said second accommodation are located in (a) said bottom wall panel; and (b) said top wall panel.

22. The soft-sided insulated container assembly of claim 13 wherein said first gel pack slot defines a first external access, and said soft-sided insulated container assembly has at least a second gel pack slot having a second external access.

23. The soft-sided insulated container assembly of claim 13 wherein:
said container assembly is a non-collapsible lunch box;
said lunch box has a length and a width and a through-thickness, said length and said width each being greater than said through thickness;
said lunch box has a top wall that is hingedly mounted to one of a plurality of side walls, said top wall defining a chamber closure;
said through-thickness is measured between said top wall and said bottom wall; and said first accommodation is located in said top wall between an inner skin thereof and an insulation layer thereof.

\* \* \* \* \*